(12) United States Patent
Kato

(10) Patent No.: US 7,244,142 B2
(45) Date of Patent: Jul. 17, 2007

(54) CONNECTION STRUCTURE OR FASTENING STRUCTURE WITH RESONANT CIRCUIT

(75) Inventor: Tsutomu Kato, Kanagawa (JP)

(73) Assignee: Piolax Inc., Yokohama-shi, Kanagawa (JP)

( * ) Notice: Subject to any disclaimer, the term of this patent is extended or adjusted under 35 U.S.C. 154(b) by 0 days.

(21) Appl. No.: 10/913,500

(22) Filed: Aug. 9, 2004

(65) Prior Publication Data

US 2005/0063125 A1 Mar. 24, 2005

(30) Foreign Application Priority Data

Aug. 7, 2003 (JP) ............................. 2003-288872
Oct. 16, 2003 (JP) ............................. 2003-356051
Oct. 21, 2003 (JP) ............................. 2003-361156

(51) Int. Cl.
*G08B 13/14* (2006.01)

(52) U.S. Cl. ................. 439/489; 340/568.4; 340/572.8

(58) Field of Classification Search ................. 439/489, 439/490; 340/568.4, 572.8, 572.1, 568.1, 340/571

See application file for complete search history.

(56) References Cited

U.S. PATENT DOCUMENTS

| | | | |
|---|---|---|---|
| 3,602,009 A * | 8/1971 | Powell | 464/52 |
| 4,151,506 A * | 4/1979 | Schoenmetz | 340/427 |
| 4,812,811 A * | 3/1989 | Asbrink et al. | 340/571 |
| 5,158,473 A * | 10/1992 | Takahashi et al. | 439/353 |
| 5,767,773 A * | 6/1998 | Fujiuchi et al. | 340/571 |
| 6,262,664 B1 * | 7/2001 | Maloney | 340/572.8 |
| 6,265,973 B1 * | 7/2001 | Brammall et al. | 340/568.1 |
| 6,407,666 B1 * | 6/2002 | Debrody et al. | 340/568.4 |
| 6,755,675 B2 * | 6/2004 | Szabo et al. | 439/191 |
| 6,835,412 B2 * | 12/2004 | Burke | 427/116 |
| 6,882,282 B1 * | 4/2005 | Lie-Nielsen et al. | 340/686.1 |

FOREIGN PATENT DOCUMENTS

| | | |
|---|---|---|
| JP | 8-185584 | 7/1996 |
| JP | 8-210576 | 8/1996 |
| JP | 2853965 | 11/1998 |
| JP | 2001-291080 | 10/2001 |
| JP | 2003-90314 | 3/2003 |

* cited by examiner

*Primary Examiner*—Neil Abrams
(74) *Attorney, Agent, or Firm*—McGinn IP Law Group, PLLC

(57) ABSTRACT

A connection structure or a fastening structure including a circuit which functions as a resonant circuit whose connection or fastening is confirmed by resonance of radio waves, the connection structure or a fastening structure has a connector for connecting a member to be connected or a clip for fastening a member to be fastened; a first circuit having first contacts on respective ends thereof; and a closed circuit functioning as a resonance circuit supported on the retainer or clip when in contact with the first contacts. Alternatively, the connection structure of fastening structure has a second circuit which disables a function of a resonance circuit upon contacting the first contact, and the first contacts and the second circuit are brought into contact simultaneously with connection of the connector or fastening of the clip.

12 Claims, 43 Drawing Sheets

CONNECTION STRUCTURE OR FASTENING STRUCTURE WITH RESONANT CIRCUIT

BACKGROUND OF THE INVENTION

1. Field of the Invention

The present invention relates to a connection structure or a fastening structure wherein, for example, in the case of connection by a connector or fastening by a clip, completion of the fastening or the connection can be confirmed.

2. Description of the Related Art

For example, incomplete fastening of a clip used for fixing a component of an automobile or incomplete connection of a connector used for connecting piping of fuel or coolant may cause a serious accident or a serious defect, depending on the section to which connection or fastening is applied. Accordingly, means for confirming fastening of the fasteners or connection of connectors has been desired, along with connection tools of good workability.

For this reason, JP-A-2003-90314 discloses a clip which can be fitted in one operation, and detect any incomplete fitting in advance. When an engagement section is in contact with the outside diameter of a large-diameter section when a clip is fitted to a shaft member, a predetermined gap is formed between a fitting claw and an engagement projection.

Also, JP-A-8-210576 discloses a connector for a small-diameter pipeline wherein when a pipe is inserted to complete connection, a confirmation member is caused to slip off or fall off so that completion of the connection can be confirmed.

Meanwhile, an anti-theft device, including that disclosed in JP-A-8-185584, is known. The device intends to prevent theft by attaching a seal, a so-called LC resonance tag in which a resonance circuit including a coil and a capacitor is formed on an item of merchandise, and oscillating radio waves of a predetermined frequency from a transmitter. When the LC resonance tag is caused to resonate by the radio waves, the resonance radio waves (echo waves) are received by a receiver, thereby ascertaining the item. In the case where a thief attempts to take the article away, the anti-theft device outputs an alarm signal so as to prevent theft.

Japanese Patent No. 2,853,965 discloses a tableware identifying apparatus including: tableware on which LC resonance tags are attached, the resonance frequencies of the tableware LC resonance tags varying from one kind of tableware to another; a transmitter which sweeps by changing a transmitting frequency continuously or stepwise, and a receiver which receives radio waves transmitted from the transmitter; a memory which stores respective ID data of a plurality of kinds of LC resonance tags; and a data processor, which uses information included in the ID data of the detected LC resonance tag to display and register information. The tableware identifying apparatus specifies the kind of the LC resonance tag on the basis of reflected waves included in the received wave forms and thereby identifies the kind of the tableware.

Further, JP-A-2001-291080 discloses a technology of making a resonating function effective or ineffective by opening and closing a switch provided in parallel with a capacitor in a circuit providing the resonating function by connecting the capacitor and a coil in series with each other.

Conventionally, confirmation of fastening or connection of a clip, a pipe connector, or the like has relied on visual observation, a clicking sound at connection, or a manual check. Therefore, a fastening or connection site hidden in a shadow, or covered by a cover or the like, may fail to be observed by an operator. Even in a case where there is provided connection confirmation means for confirming connection as shown in the Patent Documents 1 and 2, it cannot be said that there is no possibility of an operator overlooking connection or fastening because of carelessness of the operator. Furthermore, because all the conventional methods require confirmation of connections by visual check, in the case where a number of fastenings or connections are included, the confirmation has been quite demanding work.

Meanwhile, as shown in Patent Documents 3 and 4, a detection apparatus utilizing an LC resonance tag has been proposed; however, utilizing such an LC resonance tag for fasteners or connecting tools has not yet been attempted.

SUMMARY OF THE INVENTION

Therefore, an object of the present invention is to provide a connection structure or a fastening structure which allows easy confirmation of connection by a connector or fastening by a clip.

In order to solve the above problem, a first aspect of the present invention provides a connection structure or a fastening structure whose connection or fastening is confirmed by resonance of radio waves, including: a connector for connecting members to be connected, or a clip for fastening a member to be fastened; a first circuit having first contacts at both ends thereof; and a second circuit which forms a closed circuit functioning as a resonance circuit upon contacting the first contacts, wherein, the first contacts and the second circuit contact each other simultaneously with connection of the connector or fastening of the clip.

According to the invention, the first contacts and the second contacts contact each other simultaneously with connection of the connector or fastening of the clip, thereby forming a closed circuit which functions as a resonance circuit. Therefore, when the resonance circuit is utilized, for example, to generate echo waves or generate unique radio waves by driving a control circuit, completion of connection or fastening can be detected with radio waves. That is, completion of connection or fastening can be confirmed reliably in a short time in a non-contacting manner even when a shielding, such as a cover, exists.

A second aspect of the invention provides a connection structure or a fastening structure whose connection or fastening is confirmed by resonance of radio waves, the connection structure or a fastening structure including: a connector for connecting members to be connected, or a clip for fastening a member to be fastened; a first circuit which has a coil and a capacitor disposed in series with the coil, functions as a resonance circuit, and has first contacts at both ends of the capacitor; and a second circuit which disables a function of a resonance circuit upon contacting the first contacts, wherein the first contacts and the second circuit contact each other simultaneously with connection of the connector or fastening of the clip.

According to the invention, the first contacts and the second contacts are brought into contact and are disabled to function as a resonance circuit simultaneously with connection of the connector or fastening of the clip. Therefore, for example, by detecting disappearance of echo waves or disappearance of unique radio waves generated from a control circuit which fluctuate due to a resonance circuit, completion of connection or fastening can be detected with radio waves. That is, completion of connection or fastening can be confirmed reliably, in a short time, and without manual checking even when a shielding such as a cover exists.

A third aspect of the invention provides the connection structure or the fastening structure of the first or second invention, wherein connection or fastening is confirmed by the presence or absence of echo waves generated by resonance.

According to the invention, transmission radio waves having approximately the same frequency as the resonance frequency of the resonance circuit are transmitted from a transmitter, and whether or not a receiver receives the echo waves is detected. In the case where a closed circuit functioning as a resonance circuit is formed when the first contacts and the second contacts are brought into contact, the echo waves can be received when connection or fastening is achieved. In the case where a function as a resonance circuit is disabled when the first contacts and the second contacts are brought into contact, the echo waves cannot be received when connection or fastening is achieved. Accordingly, connection or fastening can be confirmed by the presence of echo waves. Therefore, connection or fastening can be detected with a simple means using a resonance tag or the like.

The fourth aspect of the invention provides the connection structure or the fastening structure of any one of the first through third inventions, wherein the first circuit is a resonance tag, and the second circuit is a shortcircuit line or a conductive member.

According to the above invention, at the time the second circuit is brought into contact with the first contacts, the first contacts are closed by use of a shortcircuit line or a conductive member. Thereby, a closed circuit which functions as a resonance circuit is formed, or a function as a resonance circuit is disabled. The only requirement for the second circuit is that the second circuit be a shortcircuit line or a conductive member. Hence, so long as a member to be connected or a member to be fastened is made of a conductive material, it can be used as a second circuit as is.

A fifth aspect of the invention provides the connection structure or the fastening structure according to any one of the first through fourth inventions, the second circuit has second contacts at both ends thereof; and the first contacts is to come into contact with the second contacts.

According to the invention, the first circuit and the second circuit are linked such that the first contacts and the second contacts are brought into contact, thereby constituting a closed circuit which functions as a resonance circuit, or disabling a function as a resonance circuit. Further, for example, even when a member to be connected or a member to be fastened is made of an insulating member, a closed circuit can be constituted by forming a second circuit on such a member.

A sixth aspect of the invention provides the connection structure or fastening structure according to the first or second invention, wherein the connector or the clip has at least one of the first circuit and the second circuit.

According to the above invention, by providing at least one of the first circuit and the second circuit on the connector or the clip, and by providing a member to be connected or a member to be fastened with the other one of the first circuit and the second circuit, a closed circuit can be constituted or a function as a resonance circuit can be disabled when connection or fastening is achieved. Further, restrictions on the connector or the clip, such as space limitations, can be used to determine which of the first circuit and the second circuit is to provided on the respective members.

A seventh aspect of the invention provides a connection structure or a fastening structure whose connection or fastening is confirmed by resonance of radio waves, including: a connector for connecting members to be connected, or a clip for fastening a member to be fastened; and a first circuit which has first contacts at both ends thereof and which functions as a resonance circuit when the first contacts come into contact with each other, wherein the first contacts come into contact with each other simultaneously with connection of the connector or fastening of the clip.

According to the invention, when the first contacts are brought into contact with each other simultaneously with connection of the connector or fastening of the clip, the first circuit is closed and functions as a resonance circuit. Therefore, when the resonance circuit is utilized in order to, for example, generate echo waves or generate unique radio waves by driving a control circuit, completion of connection or fastening can be detected with radio waves. That is, completion of connection or fastening can be confirmed reliably, in a short time, and without manual checking even when a shielding such as a cover exists. In addition, the present aspect can eliminate a second circuit; for example, even in the case where a member to be connected or a member to be fastened is made of an insulating material, forming a conductive pattern becomes unnecessary.

An eighth aspect of the invention provides a connection structure or a fastening structure whose connection or fastening is confirmed by resonance of radio waves, including: a connector for connecting members to be connected, or a clip for fastening a member to be fastened; and a first circuit which has a coil and a capacitor disposed in series with the coil, functions as a resonance circuit, and has first contacts at both ends of the capacitor, wherein the first contacts contact each other simultaneously with connection of the connector or fastening of the clip, to thus disable a function of a resonance circuit.

According to the invention, the first contacts are brought into contact with each other and their function as a resonance circuit is disabled simultaneously with connection of the connector or fastening of the clip. Therefore, for example, by detecting interruption of echo waves or interruption of unique radio waves generated from a control circuit which fluctuates due to a resonance circuit, completion of connection or fastening can be detected with radio waves. That is, completion of connection or fastening can be confirmed reliably, in a short time, and without manual checking even when a shielding such as a cover exists. In addition, the embodiment can eliminate a second circuit; for example, even in the case where a member to be connected or a member to be fastened is made of an insulating material, forming a conductive pattern becomes unnecessary.

A ninth aspect of the invention provides the connection structure or the fastening structure according to any one of the first through eighth inventions, further including a plurality of connectors or a plurality of clips; and closed circuits which are equal in number to the connectors or clips, wherein the respective closed circuits have different resonance frequencies.

According to the above invention, a user can identify points where connection or fastening is completed and points where connection or fastening has not been completed by means of: using a connector or a clip having a resonance circuit whose resonance frequency differs depending on a kind or an application site of the connector or the clip; and transmitting radio waves of different frequencies and receiving the echo waves reflected by the respective resonance circuits with a receiver to detect the presence of the echo waves. Thereby, workability of confirming connections or fastening of a plurality of connection or fastening points can be improved.

According to a tenth aspect of the invention, there is provided a connecting structure or a fastening structure whose connection or fastening is confirmed by resonance of radio waves, including: a connector for connecting a connected member or a clip for fastening a fastened member; a closed circuit including a coil and a capacitor arranged in series with the coil; and a shortcircuiting circuit for shortcircuiting both ends of the capacitor, wherein the shortcircuiting circuit is cut simultaneously with the connection of the connector or the fastening of the clip and the closed circuit functions as a resonating circuit.

According to the invention, when the fastening of the fastened member or the connection of the connected member is precisely carried out, the shortcircuiting circuit is cut, the closed circuit functioning as the resonating circuit is constituted and therefore, when, for example, an echo wave is generated or a characteristic radio wave is generated by driving a control circuit by utilizing the resonating circuit, the connection or the fastening can be detected to finish by the radio wave. Therefore, the connection or the fastening can be confirmed to finish firmly and in a short period of time, and in noncontact even when there is a shielding object of a cover or the like.

According to a eleventh aspect of the invention, there is provided a connecting structure or a fastening structure whose connection or fastening is confirmed by resonance of radio waves, including: a connector for connecting a connected member or a clip for fastening a fastened member; and a closed circuit functioning as a resonating circuit, wherein the closed circuit is cut simultaneously with the connection of the connector or the fastening of the clip to make a function as the resonating circuit ineffective.

According to the invention, when the fastening of the fastened member or the connection of the connected member is carried out precisely, the closed circuit functioning as the resonating circuit is cut and therefore, when, for example, an echo wave is generated from the resonating circuit, the generation is stopped and when a characteristic radio wave is generated by driving a control circuit, the generation is stopped and therefore, the connection or the fastening can be detected to finish by the radio wave. Therefore, the connection or the fastening can be confirmed to finish firmly and in a short period of time and in noncontact even when there is a shielding object of a cover or the like.

According to a twelfth aspect of the invention, there is provided the connecting structure or the fastening structure characterized in that the connection of the connector or the fastening of the clip is confirmed by presence or absence of an echo wave generated by resonating the resonating circuit in the first or the second aspect of the invention.

According to the invention, the radio wave having a frequency substantially the same as a resonating frequency of the resonating circuit is transmitted from a transmitter and it can be confirmed whether the connection or the fastening is carried out by presence or absence of reception of the echo wave by a receiver. Therefore, detection by the radio wave can be carried out by simple means utilizing a resonance tag or the like.

According to a thirteenth aspect of the invention, there is provided the connecting structure or the fastening structure characterized in that the closed circuit is a resonance tag in the first or the second aspect of the invention.

According to the invention, the closed circuit can be formed by only pasting the resonance tag and therefore, the structure is facilitated to fabricate and a reduction in cost can be achieved.

According to a fourteenth aspect of the invention, there is provided the connecting structure or the fastening structure characterized in that the connector or the clip includes the closed circuit in the first or the second aspect of the invention.

According to the invention, the connector or the like is smaller and lighter than the connected member or the like and therefore, handling performance in attaching the closed circuit to the connector or the like is promoted more than in connecting the closed circuit to the connected member or the like.

According to a fifteenth aspect of the invention, there is provided the connecting structure or the fastening structure characterized in that the connecting structure or the fastening structure including a plurality of the connectors or a plurality of the clips, and the closed circuits of a number the same as a number of the plurality of connectors or the plurality of clips, wherein resonating frequencies of the respective closed circuits differ from each other in any one of the first through the sixth aspects of the invention.

According to the invention, by using the structures having the resonating circuits having different resonating frequencies depending on a kind of the connector or the clip and portions of applying the structures, transmitting the radio waves by changing the frequencies from the transmitter and receiving the echo waves reflected by the respective resonating circuits by the receiver, it can be specified where is the portion finished with the connection or the fastening and where is the portion which is not finished with the connection or the fastening and operability in simultaneously confirming a plurality of connecting or fastening portions can be promoted.

According to the invention, simultaneously with completion of fastening by a fastener or connection by a connecting tool, electrical conduction is brought about between first contacts to constitute a closed circuit which functions as a resonance circuit, or to disable a function as a resonance circuit. Accordingly, for example, by detecting the presence of echo waves or the presence of unique radio waves from a control circuit driven by the resonance circuit, completion of connection or fastening can be confirmed reliably, in a short time, and without manual checking even when a shielding such as a cover exists.

BRIEF DESCRIPTION OF THE DRAWINGS

These and other objects and advantages of this invention will become more fully apparent from the following detailed description taken with the accompanying drawings in which:

FIG. 1 shows an example of an LC resonance tag used in the invention, wherein

FIG. 2 shows another example of the LC resonance tag used in the invention, wherein

FIG. 5 shows a retainer section of the fuel connector with retainer, wherein

FIG. 12 shows still another embodiment where the invention is applied to the 3-piece pipe connector, wherein

FIG. 22 is a cross-sectional view showing still another embodiment where the invention is applied to a 2-piece clip, of a state before a pin member is pressed in;

FIG. 23 is a cross-sectional view showing the embodiment where the invention is applied to a 2-piece clip, in a state after a pin member has been pressed in;

FIGS. 26A and 26B are schematic views of a surface and a rear face, FIGS. 26C and 26D are explanatory views showing a method of connecting patterns of the surface and the rear face and FIG. 26E is an equivalent circuit diagram;

FIGS. 27A and 27B are schematic views of a surface and a rear face, and FIG. 26C is an equivalent circuit diagram;

FIG. 28A is a partial plane view, and FIG. 28B is a partial perspective view;

FIG. 29A is a partial plane view, and FIG. 29B is a partial perspective view;

FIG. 30A is a perspective view showing a connecting state, and FIG. 30B is a perspective view showing a cutting state;

FIGS. 35A and 35B are schematic views of a surface and a rear face and FIG. 35C is an equivalent circuit diagram;

FIGS. 38A and 38B are schematic views of a surface and a rear face and FIG. 38C is an equivalent circuit diagram;

FIG. 39A is a sectional view, FIG. 39B is a view of an end face of a connector main body, FIG. 39C is a partial perspective view of the connector main body and FIG. 39D is a partial sectional view of the connector main body;

FIGS. 45A and 45B are schematic views of a surface and a rear face and FIG. 45C is an equivalent circuit diagram;

FIG. 48A shows a partial sectional view before cutting and FIG. 48B shows a partial sectional view in cutting;

FIG. 51A is a front view of applying the invention to a clip similar to that of FIG. 49, FIG. 51B is a perspective view of applying the invention to a two pieces clip, and FIG. 51C is a front view of applying the invention to a pipe clip;

FIG. 56A is a partial perspective view showing a state of connecting a wiring and FIG. 56B is a partial sectional view showing a state of cutting the wiring.

DETAILED DESCRIPTION OF THE PREFERRED EMBODIMENTS

An embodiment of the invention will be described hereinafter with reference to the drawings.

FIG. 1 shows an example of an LC resonance tag used in the present invention.

Figure 1A:
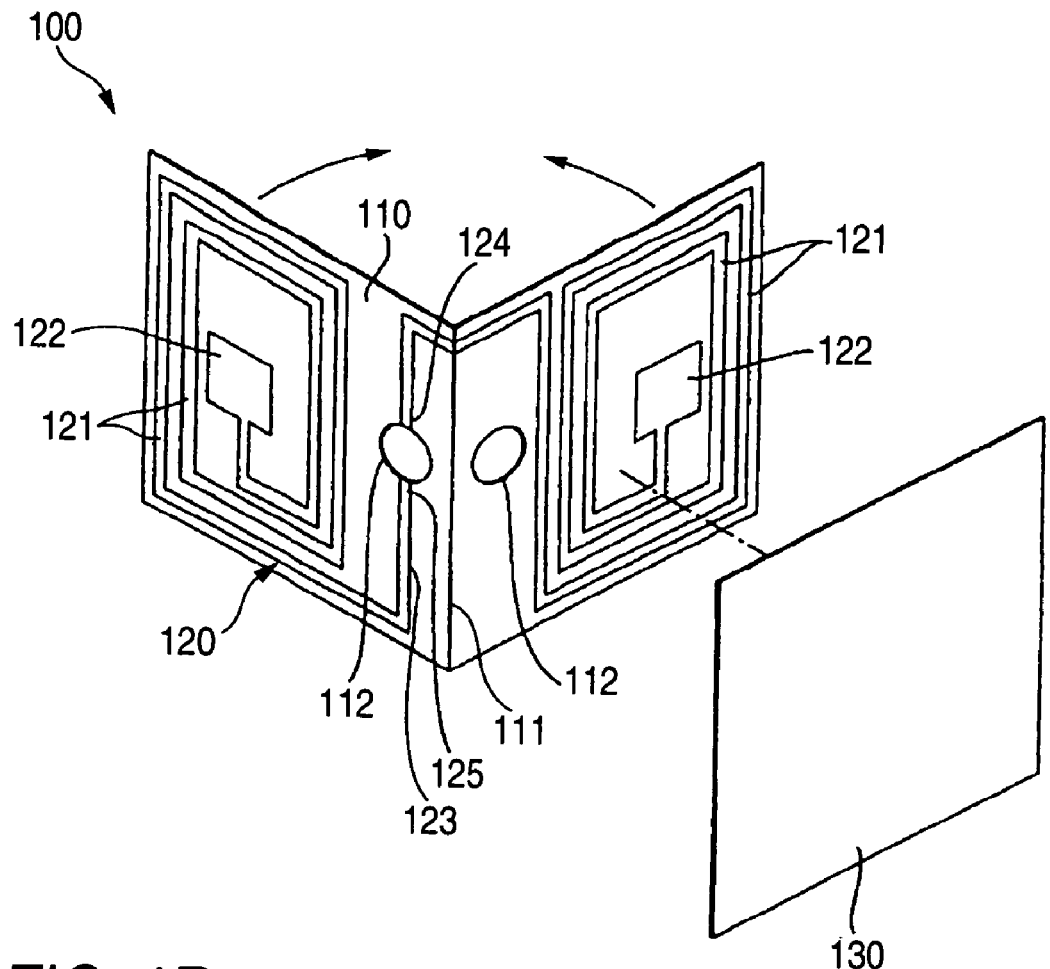
FIG. 1A is an exploded perspective view.

As shown in FIG. 1A, the LC resonance tag 100 is composed of a sheet 110 made of a synthetic resin film of an insulating material, a conductive pattern 120 formed on one side of the sheet 110, and release paper 130 adhering to the sheet 110.

The sheet 110 can be folded in two at a center score section 111. The conductive pattern 120, which is composed of conductive metal film of Cu or the like, is disposed on the sheet 110. The conductive pattern 110 has coils 121, which are formed in an approximately symmetric shape about the score section 111, and a capacitor electrode plate section 122.

The conductive pattern 120 is composed of the coils 121 which are disposed on the centers of both sides of resin film whereon the rectangular capacitor electrode plate section 122 is folded in two. Each of the coils 121, extending from one end of the respective capacitor electrode plate sections 122, forms a spiral which surrounds each capacitor electrode plate 122 in numerous layers. The respective coils 121 are connected at a connection pattern section 123 which is divided by a punched through hole 112 formed in the vicinity of the score 111. Terminal points of the respective coils 121 are disposed opposite each other with the punched through hole 112 therebetween in the vicinity of the score 111.

The sheet 110 is folded at the score 111 with the conductive pattern 120 facing outside, and affixed to a sheet by way of an unillustrated adhesive layer, which is formed on the inner side. As a result, the capacitor electrode plate sections 122 are provided opposite each other with the insulation sheet 110 therebetween to thereby compose a capacitor 126 (see FIG. 1B).

Further, the sheet 110 is folded at the score 111 and affixed to the connection pattern section 123 which connects the left conductive pattern with that the right conductive pattern. Thereafter, a portion of a circuit is removed by the punched through hole 112 of the sheet 110, and contacts 124 and 125 are formed on opposing edges of the punched through hole 112.

Consequently, the coils 121 extending from respective sides of the capacitor 126 are constituted to have the contacts 124 and 125 on their respective ends. In other words, the circuit of the LC resonance tag 100 is configured such that the capacitor 126 and the two coils 121 are provided in series with the capacitor 126 being sandwiched between the coils 121; such that the circuit of the LC resonance tag 100 has at both ends thereof contact points 124, 125; and such that the circuit is closed by means of short-circuiting the contact points 124, 125.

Figure 1B:
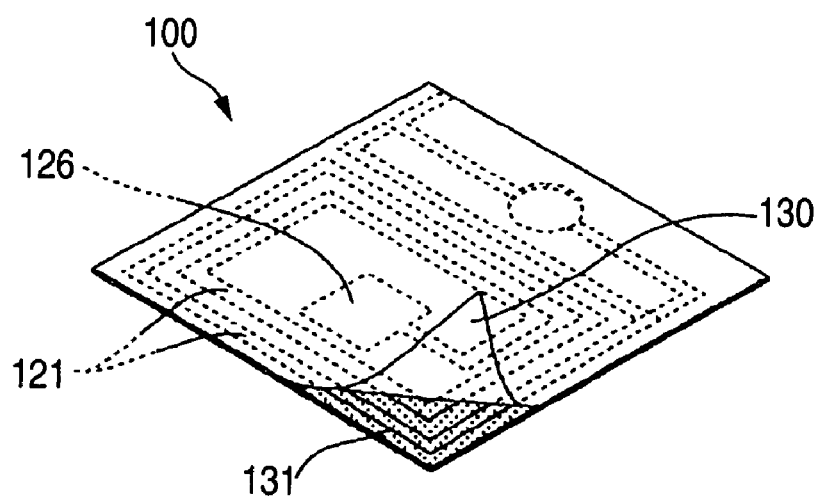
FIG. 1B is a perspective view as completed.

As shown in FIG. 1B, a face, which is one of the faces of the sheet 110 after the sheet is folded at the score 111 and affixed; specifically, the face on which the contacts 124 and 125 are not disposed, is coated with an adhesive layer to form an adhesive face 131. The release paper 130 is affixed to the adhesive face 131. When the adhesive face 131 is exposed by removal of the release paper 130, the LC resonance tag 100 can be affixed on a desired point.

When the contacts 124 and 125 of the LC resonance tag 100 are brought into conduction by fastening of the fastener or connection of the connecting tool which will be described later, the circuit of the LC resonance tag is closed so as to form a resonance circuit.

Figure 3:
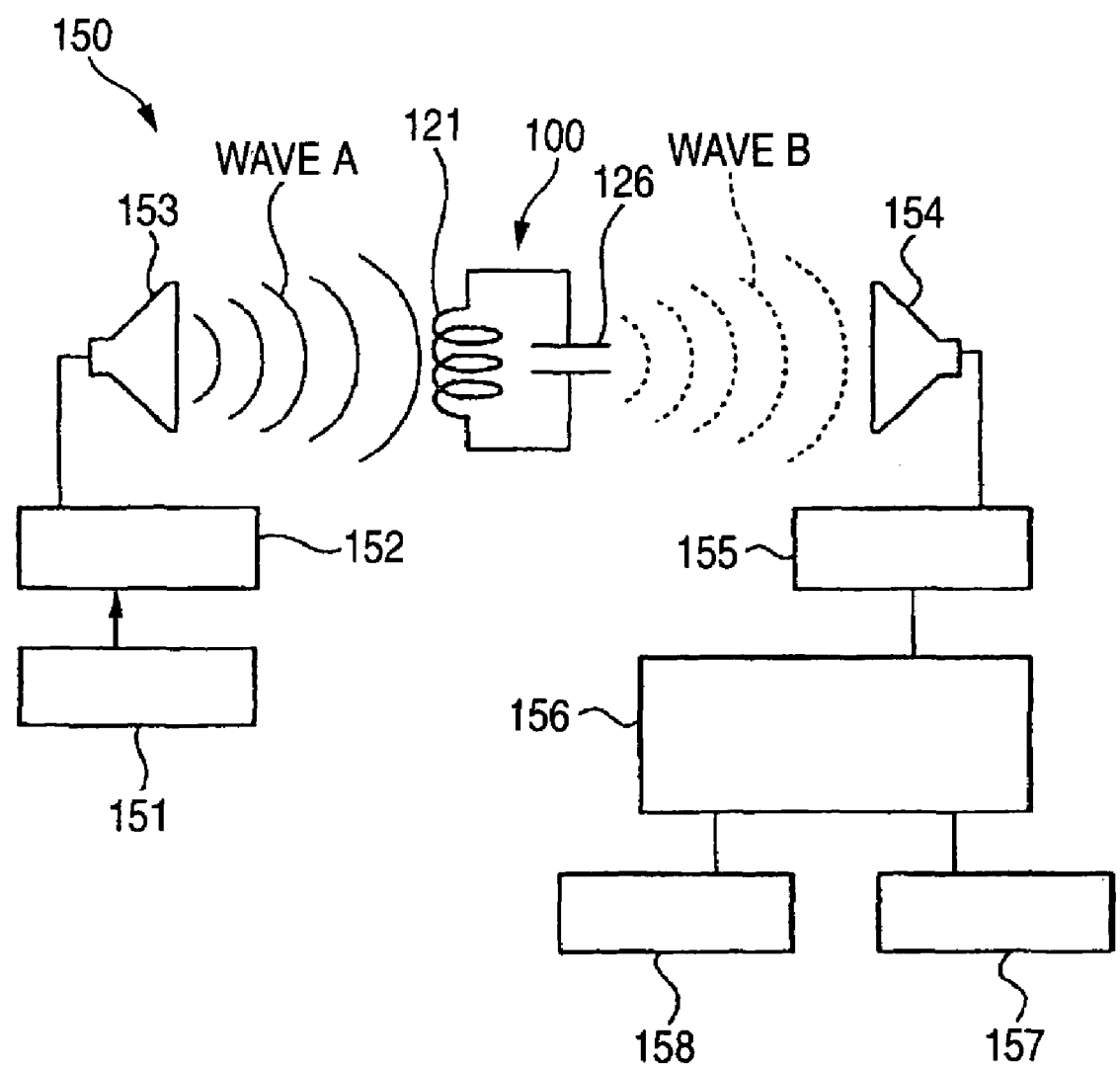
FIG. 3 is a schematic structural view showing an example of an apparatus for detecting the LC resonance tag.

When the contacts 124 and 125 of the LC resonance tag 100 are short-circuited, the circuit of the LC resonance tag 100 forms a loop constituting a closed circuit. As shown in FIG. 3, when transmission radio waves A of a predetermined frequency are transmitted to the LC resonance tag 100 constituting a closed circuit, echo waves B, whose amplitude is widened due to resonance with the transmission radio waves A, are generated. The term "predetermined frequency" referred to here means a frequency at which the circuit of the LC resonance tag 100 resonates and a frequency which is determined by the size of the capacitor 126 or the shape of the coil 121.

Under the condition where the contacts 124 and 125 are open, the circuit of the LC resonance tag 100 is not closed and does not function as a resonance circuit.

By forming the circuit of the LC resonance tag 100, wherein the capacitor 126 and the coils 121 are provided in series, in a closed circuit, the circuit functions as a resonance circuit.

Detecting the presence of the echo waves B enables determination of whether or not the circuit of the LC resonance tag 100 is functioning as a resonance circuit, whether or not the circuit of the LC resonance tag 100 forms a closed circuit, and whether the contacts 124 and 125 of the LC resonance tag 100 are short-circuited or opened.

Accordingly, completion of and failure to complete fastening by a fastener or connection by a connecting tool can be identified when the LC resonance tag 100 is attached onto the fastener or a member to be fastened, or onto the connecting tool or a member to be connected in such a manner that the contacts 124 and 125 are physically short-circuited at the time of completion of fastening by the fastener or connection by a connecting tool. Methods or means for physically short-circuiting the contacts 124 and 125 by use of a fastener or a connecting tool will be described in detail later.

The LC resonance tag 100 may be located in the vicinity of a connecting section or a fastening section via the connection pattern section 123 in such a manner that a luggage tag is tied to a luggage with a wire, while only the contacts 124 and 125 of the LC resonance tag 100 are affixed to the fastener or a member to be fastened, or to the connecting tool or a member to be connected.

As required, the contacts 124 and 125 may be extended to the engaging face or the like of a pipe connector or a clip by way of a lead wire or another conductive pattern.

Furthermore, the invention does not necessarily require such a LC resonance tag 100; a resonance circuit can also be composed by forming a conductive pattern directly on the fastener or on the connecting tool.

For the conductive pattern of such a case, a similar effect can also be obtained not only from a constitution where two members of the capacitor 126 and the coil 121 are disposed in such a manner as in the previously-described LC resonance tag 100, but also from a constitution where two members constituting the capacitor 126 and the coil 121 are disposed in series. A configuration where two members constituting the capacitor 126 and the coil 121 are provided in series with contacts on respective ends is the simplest and least expensive.

In order to manufacture the LC resonance tag 100 effectively, the conductive pattern 120 of a two-folding constitution wherein the capacitor 126 and the two coils 121 are disposed in series with the capacitor 126 sandwiched between the coils 121 is employed. However, as is apparent, a similar effect can be obtained from a LC resonance tag 100 where two members constituting the capacitor 126 and the coil 121 are disposed in series.

In the case where an LC resonance tag is manufactured independently of a fastener or a member to be fastened, or independently of a connecting tool or a member to be connected, and the fastener or the member to be fastened are affixed, or the connecting tool and the member to be connected are affixed, versatility of the LC resonance tag 100 is secured, thereby enabling common use of members, leading to cost reduction.

On the other hand, in the case where a conductive pattern is formed directly on a fastener or a connecting tool, there is yielded an advantage in that the conductive pattern can be designed in accordance with respective cases including a forming point, and arrangement of a capacitor or a coil. In addition, there is yielded an advantage that when a fastener or a connection tool on which a conductive pattern is formed is supplied, an operator at an assembly site can confirm completion of the fastening or connection by merely performing conventional fastening or connection work. Furthermore, forming a conductive pattern on a fastener or a connection tool offers greater versatility and is more likely to reduce cost as compared with the case where the LC resonance tag is affixed on a member to be fastened or connected, which varies in shape and size, or the case where the LC resonance tag is affixed on each of such members, the members being manufactured in a small volume and in a wide variety.

In relation to a case of, e.g., a fastener made up of two members, the term "arrangement of a capacitor or a coil" used herein signifies a case where only a short-circuit line is formed on one of the two members, and the principal members constituting, i.e., a capacitor and a coil, are formed and arranged in series; and where both ends of the two members are taken as contacts and the contacts are brought into contact with each other simultaneously with fastening or connection of the contacts. The term "arrangement" also signifies a case where a capacitor is located on one of the members while both ends thereof are formed as contacts; where a coil is located on the other member while both ends thereof are formed as contacts; and where the contacts contact each other simultaneously with the fastening or connection thereof.

In the case where the two members constituting the connecting tool or the fastener differ in shape or size from each other, such a configuration makes it possible to place only a short-circuit line on the member where only a small space is available and another member for forming a resonance circuit on the remaining member.

In the case where a restriction is imposed on the shape of a capacitor in order to obtain a predetermined resonance frequency, there can be employed a configuration where a coil is disposed on a member suitable for the coil shape and a capacitor or the like is disposed on the other member.

Even in the case where the two members are too small to the extent that a space for disposing cannot be secured thereon, disposing only a short-circuit line or a lead line on each of the two members enables disposal of other members constituting a resonance circuit on a member to be fastened or connected, the configuration can be applied to various fasteners or connecting tools.

Figure 2A:
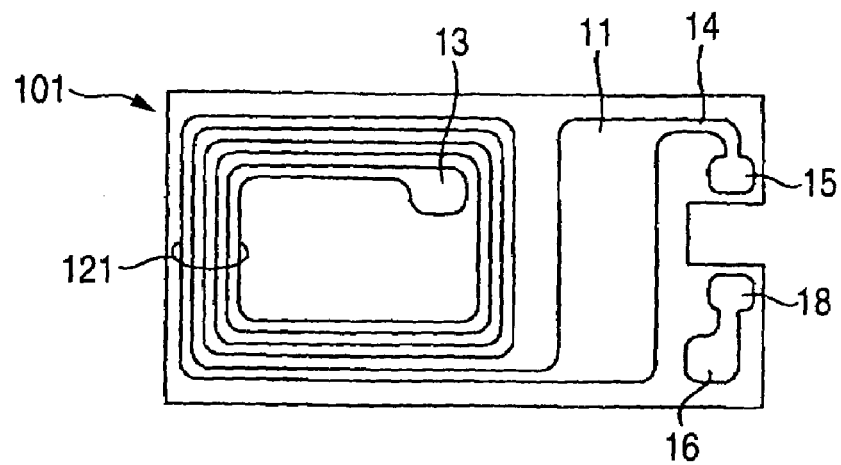
FIGS. 2A and 2B are schematic diagrams of the surface and back sides, respectively.
Figure 2B:
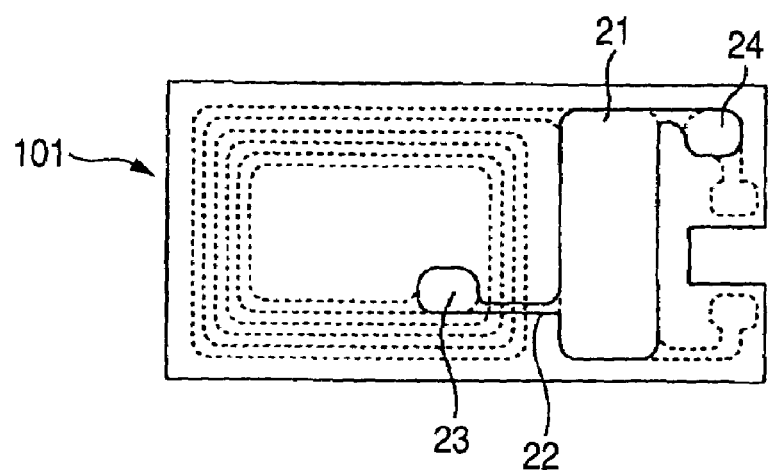
Figure 2C:
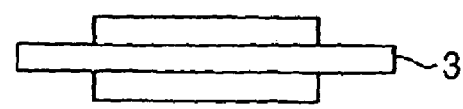
FIGS. 2C and 2D are explanatory diagrams of connecting patterns of the surface and back sides, respectively.
Figure 2D:
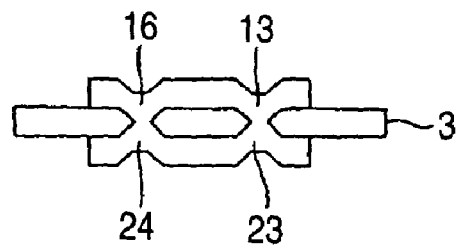
Figure 2E:
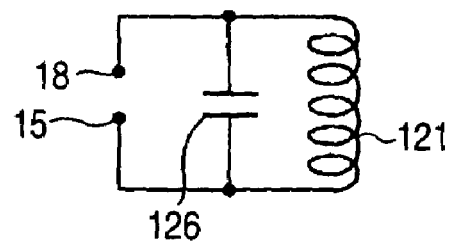
FIG. 2E is an equivalent circuit diagram.

FIGS. 2A and 2B are schematic diagrams of the surface and back sides of another example of the LC resonance tag used in the invention. FIGS. 2C and 2D are explanatory diagrams of connecting patterns of the surface and back sides. FIG. 2E is an equivalent circuit diagram of the above LC resonance tag.

The LC resonance tag 101 shown in FIG. 2 is composed of an insulation sheet 3 on which a strip-shaped pattern of copper, aluminum, or other conductive material is formed by means of, for example, adhesion, sputtering, or etching. As shown in FIG. 2A, the strip-shaped pattern formed on the LC resonance tag includes a relatively wide first capacitor electrode plate section 11 for forming a capacitor (conductance) 126, a small-diameter spiral coil 121 extending from one end of the first capacitor electrode plate section 11, a first conductive section 13 disposed on the tip of the coil 121, a wiring 14 extending from the other end of the first capacitor electrode plate section 11, and a contact 15 disposed on the tip of the wiring 14.

Meanwhile, as shown in FIG. 2B, a conductive strip-shaped pattern of copper, aluminum or the like is also formed on the back side of the LC resonance tag 101. The strip-shaped pattern has approximately the same shape as the first capacitor electrode plate section 11, and includes a second capacitor electrode plate section 21 for forming a capacitor (conductance) 126 together with the first capacitor electrode plate section 11, a second conductive section 23 connected to the first conducive section 13 of the coil 121, a connecting section 22 connecting the second capacitor electrode plate section 21 and the second conductive section 23 with a minimum distance along a straight line, and a third conductive section 24 extending from the second capacitor electrode plate section 21.

The third conductive section 24 is connected to a fourth conductive section 16 provided on the surface side of the LC resonance tag 101. Further, a contact 18 is provided on the fourth conductive section 16. The contacts 15 and 18 provided on the surface of the LC resonance tag 101 are located opposite each other with a predetermined gap therebetween.

The first conductive section 13 and the second conductive section 23, and the third conductive section 24 and the fourth conductive section 16 can be connected, for example, as follows. As shown in FIG. 2C, the strip-shaped pattern is formed on the surface and back sides of the insulation sheet 3. The first conductive section 13 and the fourth conductive section 16, and the second conductive section 23 and the third conductive section 24, are located at respective corresponding areas on the front and back surfaces of the insulation sheet 3. When the insulation sheet 3 is sandwiched by crimping (or pressing) or the like, as shown in FIG. 2D, the first conductive section 13 and the second conductive section 23 are brought into conduction, as are the third conductive section 24 and the fourth conductive section 16.

Accordingly, as shown in FIG. 2E, the capacitor 126 and the coil 121 are connected in parallel, and the pair of contacts 15 and 18, extending from the respective ends of the capacitor 126, are provided opposite each other with a predetermined gap therebetween. When the pair of contacts 15 and 18 of above are brought into conduction simultaneously with connection of a connector or fastening of a clip, the ends of the capacitor 126 are short-circuited, whereby the LC resonance tag 101 is disabled from functioning as a resonance circuit.

FIG. 3 shows an example of an apparatus for detecting the LC resonance tag 100 as shown in FIGS. 1A and 1B. The detecting apparatus 150 is provided with a transmitting controller 151, a transmitting amplifier 152, and a transmitting antenna 153 which transmits radio waves of a predetermined frequency. The detecting apparatus 150 is also provided with a receiving antenna 154 for receiving radio waves from the transmitting antenna 153, a receiving amplifier 155, and a data processor 156, and is linked to data storage means 157 and alert display means 158, both of which are connected to the data processor 156.

In the above-described apparatus, the transmitting controller 151 and the transmitting amplifier 153 compose a transmitter, and the receiving antenna 154 and the receiving amplifier 155 compose a receiver. However, the transmitting antenna 152 and the receiving antenna 154, or the transmitter and the receiver, can be shared to constitute a transmit/receiving antenna or a transmitter/receiver.

In order to confirm fastening of a fastener or connection of a connecting tool, the transmitting antenna 153 of the detecting apparatus 150 is brought near the LC resonance tag 100 which is attached thereon.

When transmission radio waves A having approximately the same frequency as the resonance frequency of the LC resonance tag 100 are transmitted from the transmitting antenna 153 by way of the transmitting controller 151 and the transmitting amplifier 152, the LC resonance tag 100 resonates and generates echo waves B. The echo waves B are received by the receiving antenna 154, and are transmitted to the data processor 156 via the receiving amplifier 155.

The transmission radio waves A and the echo waves B can be distinguished because the echo waves B, which are generated due to resonance, have a higher amplitude and a higher level than the transmission radio waves A.

The data processor 156 compares the thus-transmitted echo waves B with the receiving level at a specified frequency stored in the data storage means 157. In the case where the receiving level is drastically higher, the circuit of the LC resonance tag 100 is confirmed to be closed and functioning as a resonance circuit. When the circuit of the LC resonance tag 100 is thus confirmed to be functioning as a resonance circuit, the alert display apparatus 158 displays a message to this effect or issues a notice to this effect. Therefore, an operator can be informed instantaneously of whether or not fastening of a fastener or connection of a connecting tool on which the LC resonance tag 100 is attached has been completed.

Since the propagation range of the transmission radio waves A or the echo waves B is limited, the transmitting antenna 153 and the receiving antenna 154, or a detecting apparatus 150 in which these antennas are integrated, must be placed near the LC resonance tag 100 so as to fall within the propagation range.

Meanwhile, even in the case where a plurality of resonance tags 100 functioning as resonance circuits upon completion of fastening or connection are provided, when the plurality of resonance tags fall outside the propagation range of the transmission radio waves A or the echo waves B, completion of fastening or connection of plurality of points can be confirmed in turns by bringing the antenna or the detection apparatus near their respective LC resonance tag 100.

The detection apparatus 150 can also be applied to the LC resonance tag 101 shown in FIG. 2. In this case, when fastening of a fastener or connection of a connecting tool is completed, the pair of contacts 15 and 18 are brought into conduction, and both ends of the capacitor 126 are short-circuited, whereby the LC resonance tag 101 is disabled from functioning as a resonance circuit. Accordingly, as the receiving antenna 154 becomes unable to detect the echo waves B, completion of fastening or connection can be confirmed.

Furthermore, when an induced magnetic field is brought near the circuit, where two members constituting the capacitor 126 and the coil 121 are disposed in series, instead of radio waves be transmitted thereto, an alternating current can be generated in resonance with the induction electromagnetic waves The control circuit can be driven by: adding to the circuit a control circuit composed of a memory, a computing section, a transmitter, a receiver, a rectifier, and a power source; and rectifying into a power source the alternating current generated in resonance with the induction electromagnetic waves.

The method confirming connection or fastening by use of a circuit composed of the coil 121 and the capacitor 126 serving as a resonance circuit is an LC resonance method. The method confirming connection or fastening by use of a circuit composed of the coil 121, the capacitor 126, and a control circuit serving as a resonance circuit is an IC resonance method.

Here, an LC resonance tag on which a control circuit composed of a memory, a computing section, a transmitter, a receiver, a rectifier, and a power source is added is referred to as an IC resonance tag.

An IC resonance tag, which is fabricated by forming a conductive pattern on a flexible film or sheet made of an insulating material, is attached to a connecting tool or a fastener, or to a member to be connected or fastened. An IC resonance tag has advantages similar to those of the aforementioned LC resonance tag 100, and such advantages are shared by a "resonance tag," which is a representative name for the IC resonance tag and the LC resonance tag.

The detection apparatus 150 is provided with an induction magnetic field generator. An induction magnetic field is transmitted from the detection apparatus 150 to the IC resonance tag which has been closed upon completion of fastening or connecting operation and acts as a resonance circuit, thereby controlling the control circuit. As a result, exchange of data between the detection apparatus 150 and the control circuit and computation of the data are enabled, and storage of data in both a connection section or a fastening section and the detection apparatus 150 is enabled as well.

According to the constitution, not only can fastening of a fastener or a connection of a connecting tool be confirmed, but these data can be utilized on the shop floor or for quality control, by means of recording, in the form of data, histories of connection or fastening work, inspection histories thereof, and specifications of the connecting tool or the fastener; and storing the data in both the connecting section and the fastening section. The data can also be stored on a product itself. A portable detection apparatus allows confirmation of those data at a site after shipping from the factory where a product is used. Thus, the apparatus can be utilized for a maintenance check or for troubleshooting.

In the case where an IC resonance tag is used instead of an LC resonance tag, or in the case where a conductive pattern composed of the capacitor 126, a coil 121, and a control circuit is formed directly on a connecting tool or a fastener, not only can fastening of a fastener or connection of a connecting tool be confirmed by virtue of resonance with radio waves including electromagnetic waves in similar fashion with the LC resonance tag 100, but the apparatus can also be utilized for a maintenance check or for troubleshooting.

By means of changing a volume of the capacitor 126 or a shape of the coil 121, a predetermined frequency at which the echo waves B arise can be changed. Accordingly, even in the case where a plurality of LC resonance tags 100 must be placed within a propagation range of the transmission radio waves A or the echo waves B, LC resonance tags 100 having capacitors 126 of different sizes or coils 121 of different shapes induce different resonance frequencies. Consequently, whether or not each of the plurality of LC resonance tags 100 is functioning as a resonance circuit can be identified.

Alternatively, different resonance frequencies have been allocated to the respective LC resonance tags in advance. LC resonance tags of different resonance frequencies are affixed on fasteners or connectors provided at the respective points. Transmission radio waves A are transmitted from the transmitting antenna 153 while the frequency is intermittently or continuously changed gradually through use of the transmission controller 151. The echo waves generated in resonance with the unique resonance frequency of the respective LC resonance tags 100 are taken into the data processor 156 by way of the receiving antenna 154 and the receiving amplifier 155. The thus-acquired data are compared with the receiving level of the corresponding frequencies stored in the storing means 157. When comparison shows that the receiving level has been drastically increased, the circuit of the LC resonance tag 100 of the corresponding frequency can be confirmed to be closed and functioning as a resonance circuit. This constitution enables identification of where fastening or connection is completed, and where fastening or connection has not been completed, thereby improving workability of simultaneously confirming connections or fastening of a plurality of connection or fastening points.

Examples of a fastener to which the invention can be applied include a clip, a zipper, a screw, a rivet, a turn clip, a screw grommet, a push-on fix, and a hose band.

Examples of a connecting tool to which the invention can be applied include a pipe connector, a one-touch coupler, a snap ring, a wiring (harness) connector, and an optical fiber connector.

Figure 4:
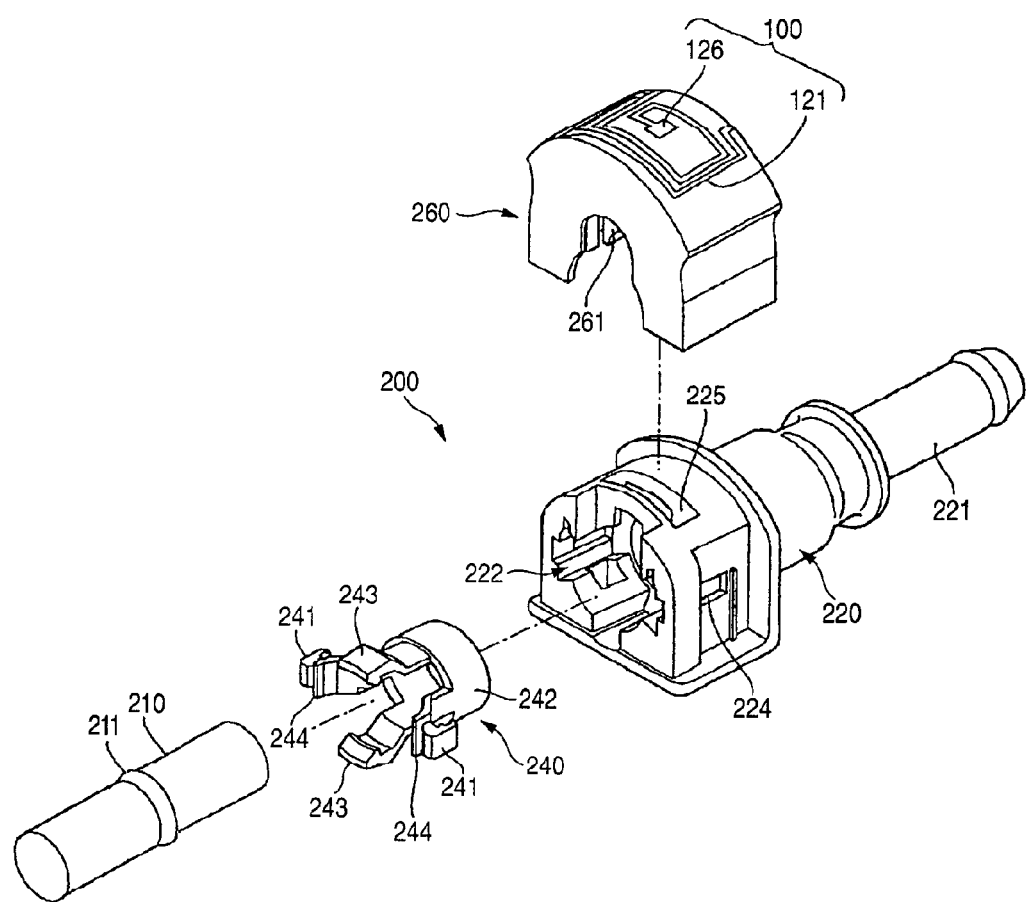
FIG. 4 is an exploded perspective view showing an embodiment where the invention is applied to a fuel connector with retainer.
Figure 5A:
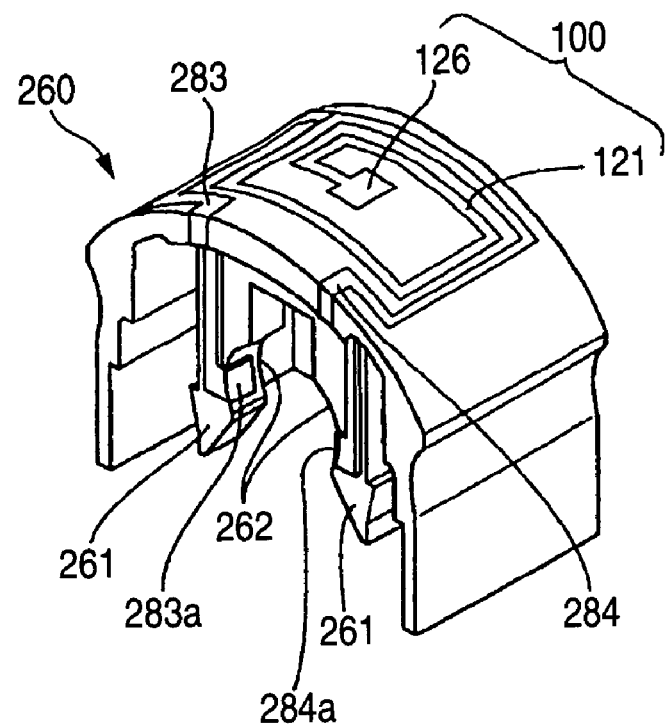
FIG. 5A is a perspective view.
Figure 5B:
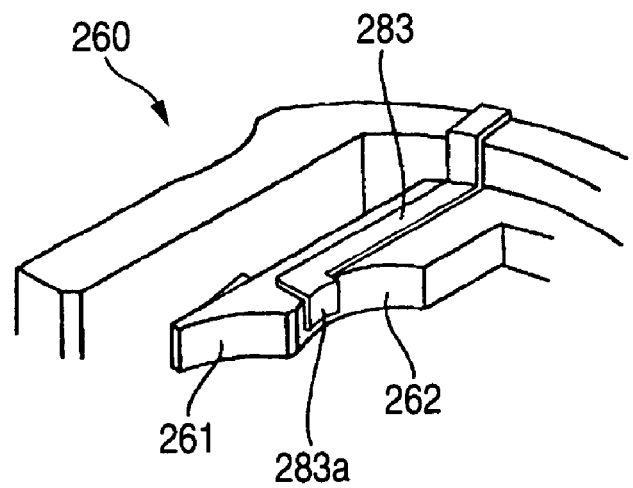
FIG. 5B is a partially enlarged perspective view.
Figure 6:
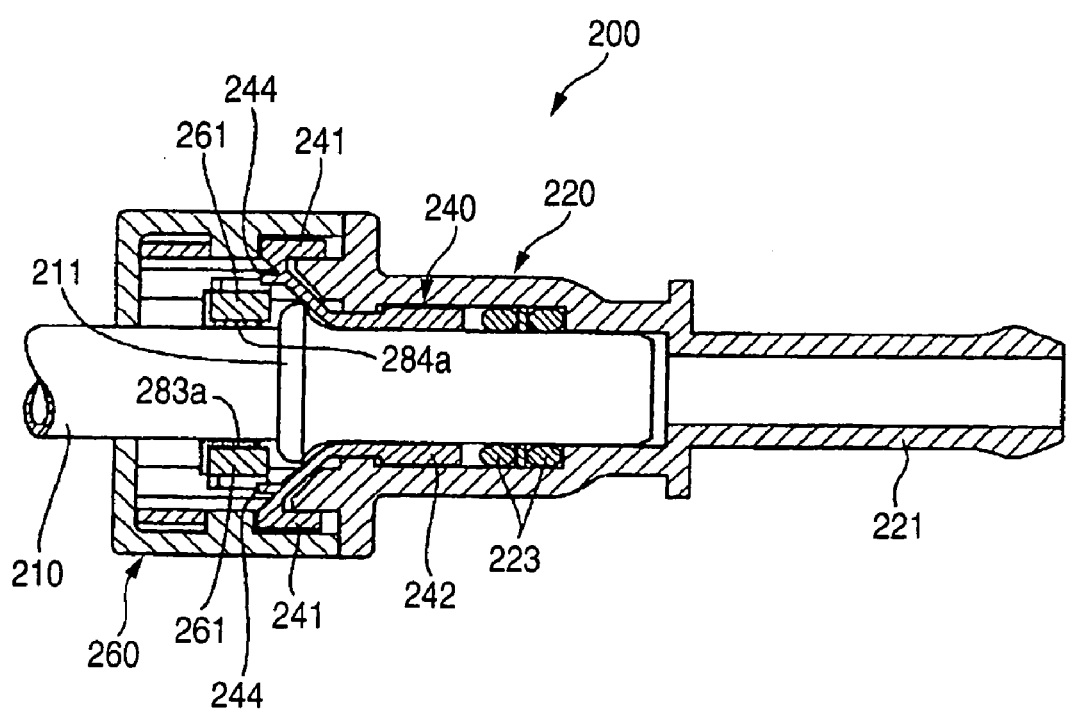
FIG. 6 is a cross-sectional view showing a state of connection of the fuel connector with retainer.

FIGS. 4 through 6 show an embodiment in which the invention is applied to a fuel pipe connector.

The fuel connector with retainer 200 made of an insulating member is for the use in connecting pipe 210 made of a conductive metal and a hose, a tube, for or the like. The pipe 210 has an annular projection 211 on the outer end of its circumference. An unillustrated hose, tube, or the like is connected to a housing 220. Further, the fuel connector with retainer 200 is provided with the housing 220, a stopper 240 which is disposed in the housing 220 in advance, and a retainer 260 which is to be assembled to the housing 220. By inserting the end portion of the pipe 210 into the housing 220 and inserting the retainer 260 into the housing 220, the retainer 260 can be engaged with the annular projection 211, and caused to be latched to complete the connection. See FIG. 6. The housing 220 is provided with a through hole for fuel flow in the axial direction.

The housing 220 is provided on one end thereof with a nipple 221. The nipple 221 is connected with an unillustrated hose or tube by being inserted over the same. The other end of the housing 220 forms an opening section 222 into which an end portion of the pipe 210 is inserted. The housing 220 has two seal rings 223 on its inner circumference.

On both side walls of the housing 220, respective side wall openings 224 are formed, and a pair of protruding pieces 241 which will be described later are fitted thereon, respectively. Between the sidewall openings 224 and the nipple 221, protrusions which are in contact with tips of protruding pieces 241 provided on the stopper 240 which will be described later are provided. When the pipe 210 is fully inserted into the housing 220, the protruding pieces 241 get over the protrusions and are engagingly stopped, whereby the stopper 240 is positioned, and insertion of the retainer 260, as will be described later, is enabled. On a top wall of the housing 220, a top wall opening 225 for inserting a locking piece 261 of the retainer 260 is also formed.

The stopper 240 has an annular section 242 which is inserted in the housing 220. Engaging pieces 243 which elastically engage with the annular protrusion 211 of the pipe 210, and the pair of protruded pieces 241 which are fitted on both of the side wall openings 224 of the housing 220 extend from the annular section 242 toward an opening 222 of the housing 220.

The pair of protruding pieces 241 extending from the annular section 242 are, after extending in the axial direction for a predetermined length, expanded in diameter toward the respective side walls of the housing 220, in the diagonal direction, and then fitted in the side wall openings 224 of the housing 220 with their tips folded back. Protrusions 224 radially extending outwards are formed at the end portions of the respective protruding pieces 241 nearer the housing opening 222.

The protrusions 244 are engaged in the retainer 260 at their initial positions before insertion of the pipe 210, in order to prevent insertion of the retainer 260. When the pipe 210 is inserted into the housing 220, the annular protrusion 211 of the pipe 210 is engaged on the engaging pieces 243, and along with the movement of the pipe, the stopper 240 slides in the axial direction. When the pipe 210 is fully inserted, the protrusions 244 are released from engagement, and the retainer 260 can be inserted. In other words, the stopper 240 serves to prevent insertion of the retainer until the pipe 210 is fully inserted into the housing 200.

The locking piece 261 to be inserted into the top wall opening 225 of the housing 220 extends on an inner circumferential center of the top wall of the retainer 260. The locking piece 261 extends in a plate shape at a position slightly away from the respective side walls of the retainer 260. The locking piece 261 has pipe-contact faces 262 which are notched in an arc-shape on their bottom edges. The pipe-contact face 262 has an inner diameter matching an outer circumference of the pipe 210. When right and left contact faces 262 are fitted on the outer circumference of the pipe, the locking pieces 261 are engaged on the annular protrusion 211. Thereby, the pipe 210 is integrated with the housing 220 so as to prevent slip-off.

An LC resonance tag 100 such as that shown in FIGS. 1A and 1B is attached on the top wall of the retainer 260. The coil 121 and the capacitor 126 are disposed in series on the circuit of the LC resonance tag. Conductive patterns 283 and 284 extend from the respective ends of the circuit to the respective pipe-contact faces 262 of the locking pieces 261. Contacts 283a and 284a are formed on the end portions of the conductive patterns 283 and 284.

Therefore, in relation to the fuel connector with retainer 200, when the pipe 210 is inserted from the opening 222 of the housing 220, the annular protrusion 211 of the pipe 210 is elastically engaged on the engaging pieces 243 of the stopper 240. When the pipe 210 is fully pushed into the housing 220, the stopper 240 is slid in the axial direction, and engagement between the protrusions 244 and the retainer 260 is released. Consequently, the retainer 260 can be inserted into the housing 220.

Here, when the retainer 260 is inserted into the housing 220, the locking pieces 261 are fitted in the pipe 210, and engaged on the annular protrusion 211. Then, the pipe 210 is prevented from slip-off, and the pipe 210 is connected to the fuel connector with retainer 200.

At this time, the contacts 283a and 284a are formed on the end portions of the pair of conductive patterns 283 and 284 extending from both ends of the circuit of the LC resonance tag 100. Thereby, the contacts 283a and 284a contact the pipe 210 on the pipe-contact face 262 of the respective sides of the locking piece 261, and are brought into conduction via the pipe 220 made of a conductive metal. As a result, the circuit of the LC resonance tag 100 is closed, and functions as a resonance circuit.

Therefore, under the above-mentioned condition, when the transmission radio waves A having approximately the same frequency as the resonance frequency of the resonance circuit are transmitted from the transmitter, the resonance circuit reflects the transmission radio waves and generates the echo waves B. By receiving the echo waves B, completion of a connection can be confirmed.

Before completion of connection, because the contacts 283a and 283a which are to be connected to the respective ends of the circuit of the LC resonance tag 100 are open, the circuit of the LC resonance tag 100 is not closed. So long as the pipe 210 is not fully inserted into the housing 220, the retainer 260 is unable to be inserted in the housing 220. For this reason, the contacts 283a and 284a do not contact with the pipe 210, which establishes a short-circuit and is a conductive member. Because the circuit of the LC resonance tag 100 does not function as a closed circuit, even when the transmission radio waves A are transmitted from the transmitter, the circuit does not function as a resonance circuit. Accordingly, the echo waves B are not generated. Because the receiver does not receive the echo waves B, completion of a connection of the fuel connector with retainer 200 cannot be confirmed.

Figure 7:
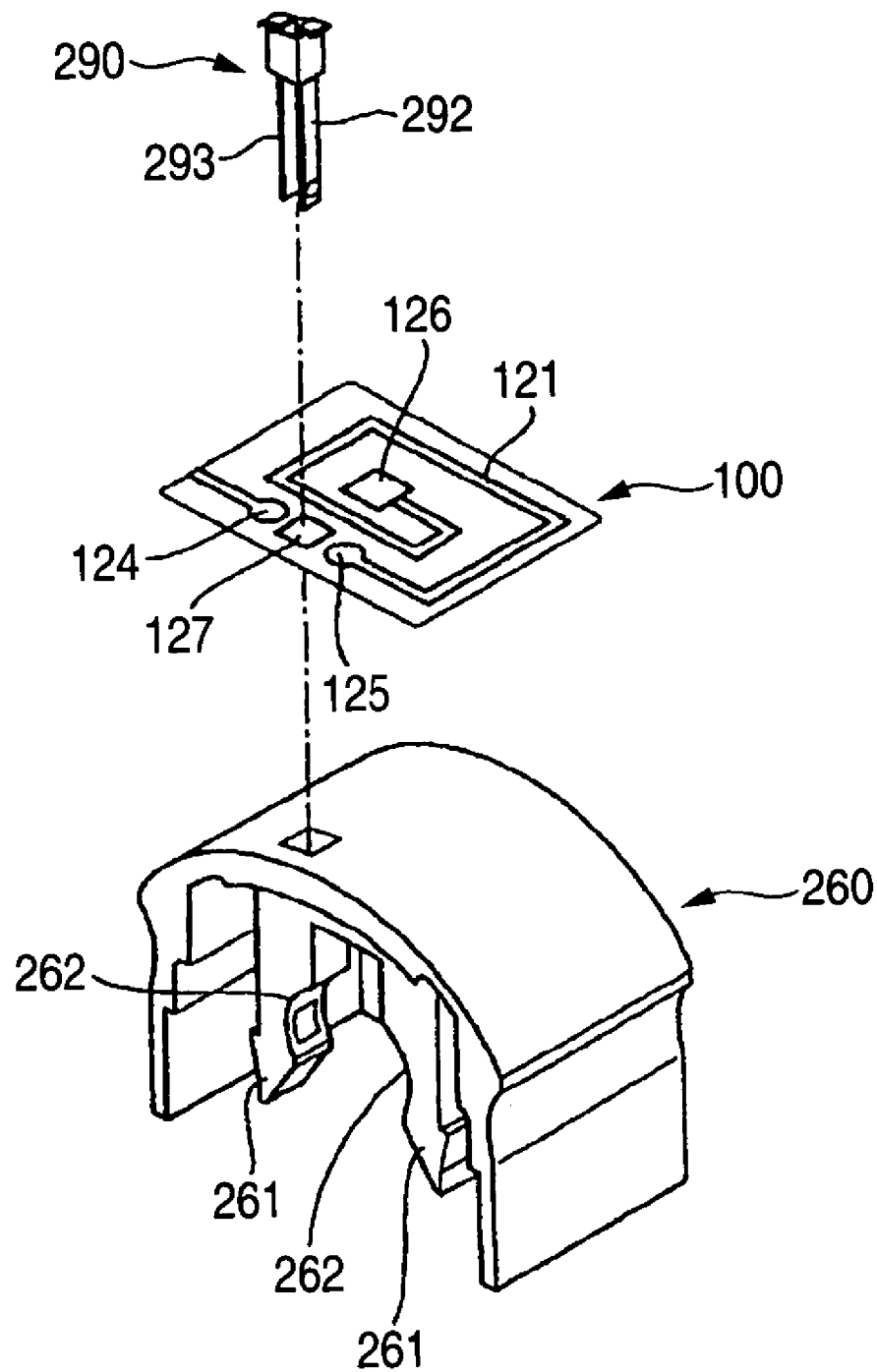
FIG. 7 is an exploded perspective view showing another example where the invention is applied to a fuel connector with retainer.
Figure 8:
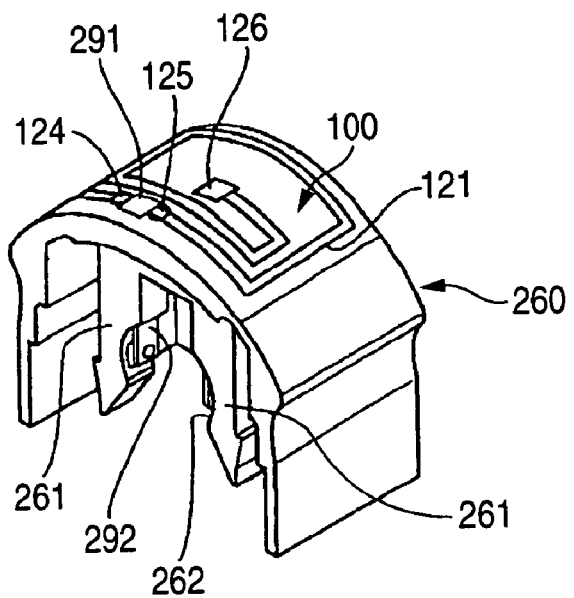
FIG. 8 is a perspective view of a retainer section of the fuel connector with retainer.
Figure 9:
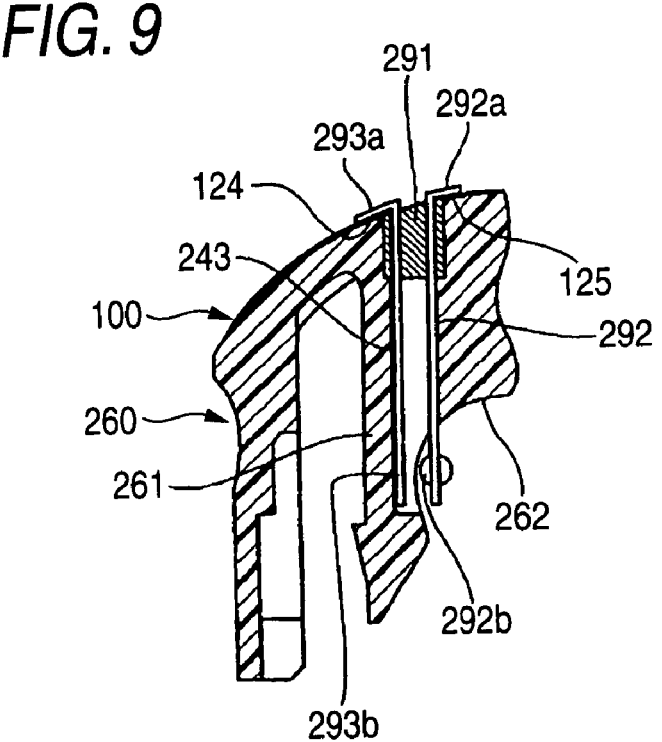
FIG. 9 is a partial cross-sectional view of a retainer section of the fuel connector with retainer.

FIGS. 7 through 9 show another embodiment in which the invention is applied to a fuel connector with retainer. Those sections which are substantially identical with those of the embodiment shown in FIGS. 4 through 6 are denoted by the same reference numerals, and repeated description thereof is omitted.

The present embodiment relates to a fuel connector with retainer suitable for connecting a pipe 210 made of an insulating member.

With regard to the fuel connector with retainer, only the constitution of the circuit of the LC resonance tag 100 of the retainer 260 has been modified from the embodiment shown in FIGS. 4, 5A, and 5B, and other sections are substantially the same as in that embodiment. Therefore, only the modified sections will be described.

As shown in FIG. 8, a circuit of the LC resonance tag 100 has the coil 121 and the capacitor 126 disposed in series, and the contacts 124 and 125 disposed on the respective ends of the circuit. A through hole 127 is formed between the contacts 124 and 125. Meanwhile, on the top wall of the retainer 260, there is formed a through hole 263, which is superposed on the through hole 127 when the LC resonance tag is attached.

On the top wall of the retainer 260, in a state where the LC resonance tag is attached, a switch 290 is to be inserted through the through holes 127 and 263. The switch 290 has a base section 291 made of insulating resin which matches the inner circumference of the through holes 127 and 263, and a pair of elastic metal pieces 292 and 293 extending downward in parallel through the base section 291.

Top end portions 292a and 293a of the metal pieces 292 and 293 are flanged so as to be exposed from the base 291 and to make contact with the contacts 124 and 125 of the LC resonance tag 100. Bottom end portions of the metal pieces 292 and 293 are formed into contacts 292b and 293b. The contact 292b, one of the above contacts, protrudes for easy contact with the other contact 293b.

The contacts 292b and 293b are disposed on the pipe-contact face of the locking piece 261 of the retainer 260 so that the contact 292b protrudes from the inner circumference thereof. When the locking piece 261 fits over the pipe 210, the contact 292b is pressed by the pipe 210 and bends toward the other contact 293b to make contact with the same. Accordingly, the circuit of the LC resonance tag 100 is closed and functions as a resonance circuit.

Also, in the embodiment, when the pipe 210 is fully inserted in the housing 220, the retainer 260 becomes able to be inserted into the housing 220. Upon the insertion, the locking piece 261 fits over the pipe 210 and engages the annular protrusion 211 to complete the connection. The circuit of the LC resonance tag 100 is brought into contact with the contacts 292b and 293b, to thereby be closed, and functions as a resonance circuit. Then, completion of connection can be confirmed by transmitting the transmission radio waves A having approximately the same frequency as the resonance frequency of the resonance circuit from the transmitter, and by receiving the echo waves B reflected by the resonance circuit with the receiver.

Before completion of connection, because the contacts 292b and 293b which are to be connected to the respective ends of the circuit of the LC resonance tag 100 are open, the circuit of the LC resonance tag 100 is not a closed circuit. So long as the pipe 210 is not fully inserted into the housing 220, the retainer 260 is unable to be inserted in the housing 220. For this reason, the contact 292b is not pressed by the pipe 210 made of an insulating member, and therefore does not come into contact with the contact 293b. The contacts 292b and 293b are held as being opened, and the circuit of the LC resonance tag 100 is not closed. Even in the case where the transmission radio waves A are transmitted from the transmitter, the circuit does not function as a resonance circuit, and the echo waves B are not generated. Because the receiver does not receive the echo waves B, completion of a connection of the fuel connector with retainer 200 cannot be confirmed.

As described above, the fuel connector with retainer 200 can be applied to a pipe 210 of either a conductive material or an insulating material.

The fuel connector with retainer 200 according to the embodiment is for connecting fuel piping on automobiles, and application thereof is not limited to connection wherein a member to be connected is pipe 210, a hose, or a tube. It can also be constituted for connections wherein a member to be connected has a valve function for controlling direction of fuel flow, flow rate, or the like, such as a cut-off valve, a check valve, or a drain valve which are disposed in the middle of a fuel piping path, or a fuel tank.

In the above constitution, the housing 220 may extend from a member having a valve function, a fuel tank, or the like, or the housing 220 may be attached thereon. In the case where a hose, a tube, or the like is connected to a member having a valve function, a fuel tank, or the like, the pipe 210 is to be attached to the member. Further, the members having a valve function, a fuel tank, or the like can also be connected to each other by attaching the fuel connector with retainer 200 on the members.

As is apparent, in any connection of the member to be connected, completion of connection between the respective members to be connected can be confirmed reliably, instantaneously, in a non-contacting manner, which is similar to that described previously.

In the case where the fuel connector 200 is attached on a member having a valve function, a fuel tank, or the like, the LC resonance tag 100 of the fuel connector 200 may be relocated on the member so as to connect between the fuel connector 200 and the LC resonance tag 100 with a conductive pattern to confirm the connection.

Meanwhile, completion of connection can also be confirmed by the following configuration. Namely, the contacts 124 and 125 of the LC tag 100 are bridged via a short-circuit line, in advance, to close the circuit of the LC tag 100 so as to allow it function as a resonance circuit; the short-circuit line is disposed on an unillustrated through hole, in such a way that when the retainer 260 is pushed down, a protrusion which has a sharp tip and stands out from the side of the housing 220 projects from the through hole; and the short-circuit line is cut off so as to shut down the closed circuit by the protrusion, thereby disabling a function as a resonance circuit.

So long as the shortcircuit line is not cut off, the circuit functions as a resonance circuit. Therefore, when the transmission radio waves A are transmitted from the transmitter, the echo waves B are generated, and received by the receiver. Accordingly, the switch is confirmed not to be inserted in the through hole 263, and connection between the pipe 210 and the fuel connector 200 with retainer is identified as not being completed.

When the short-circuit line is cut off by pushing down a protrusion protruding from the side of the housing 220 with the retainer 260, the circuit between the contacts 125 and 126 is shut off and does not function as a resonance circuit. When the transmission radio waves A are transmitted from the transmitter under such a condition, the echo waves B are not generated, and the receiver does not receive the echo waves B. Thereby, completion of a connection between the pipe 210 and the fuel connector with retainer 200 is confirmed in a manner similar to that described in the aforementioned embodiment.

An LC resonance tag having a conductive pattern which constitutes a closed circuit not having contacts 125 and 126 may be used.

Therefore, in such a constitution, not only the contacts 125 and 126, but also the elastic metal pieces 292 and 293 become redundant, and connection can be confirmed with an inexpensive constitution.

Figure 10:
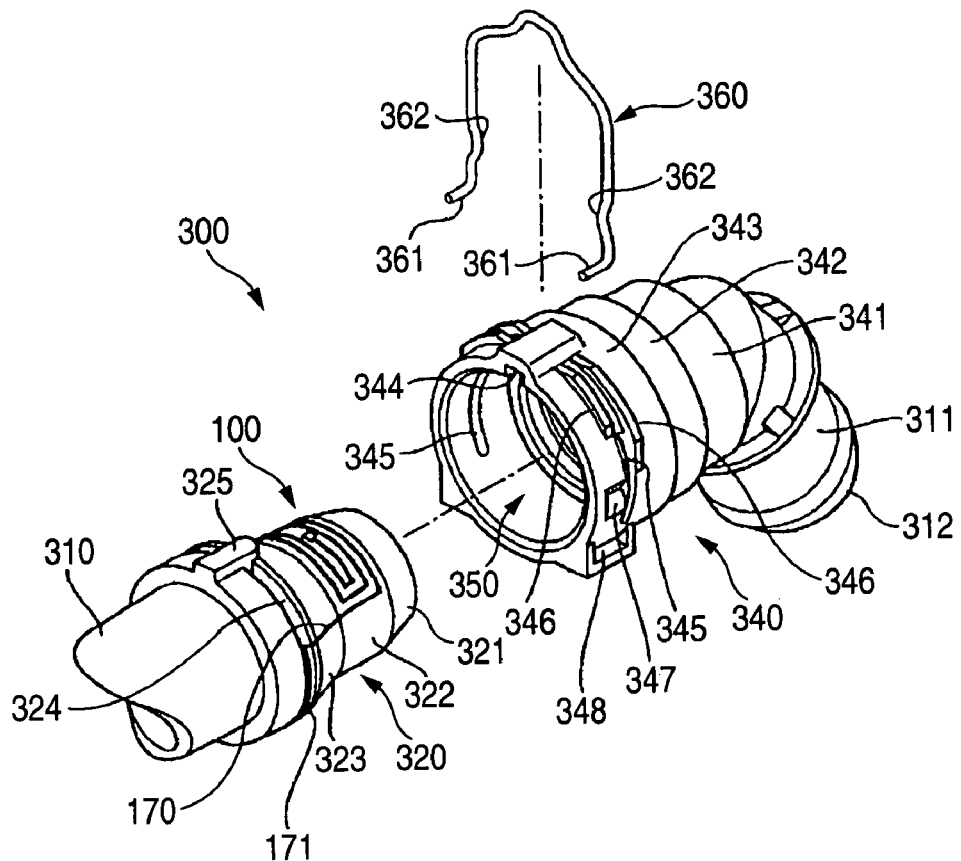
FIG. 10 is a exploded perspective view of still another embodiment where the invention is applied to a 3-piece pipe connector.
Figure 11:
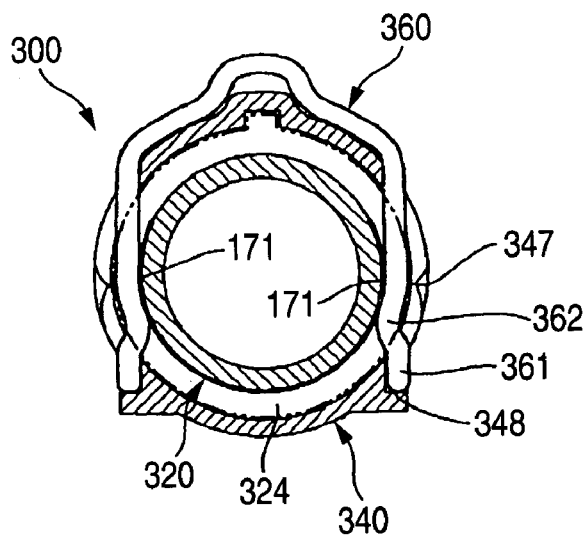
FIG. 11 is a cross-sectional view of the 3-piece pipe connector.

FIGS. 10 and 11 show still another embodiment in which the invention is applied to a 3-piece pipe connector.

The 3-piece pipe connector 300 includes an insertion section 320 disposed on an end of a pipe 310 and made of an insulating member; a socket 340 disposed on an end of a pipe 311 and made of an insulating member; and a stopper 360 to be fitted on the socket 340 and formed from a bent wire made of a conductive metal.

The insertion section 320 takes a form starting from a tapered tip section 321, through a straight section 322 and ending at a wider-diameter tapered section 323. The insertion section 320 has a structure, in which an annular groove 324 and a positioning protrusion 325 are formed on the outer circumference of the top of the wider-diameter tapered taper section 323; and in which a through hole is formed along the axis.

The socket 320 is connected to the pipe 311 at a predetermined angle of approximately 60 degrees in the case of the embodiment and has a through hole extending along the axis. In the embodiment, the end portion of the pipe 311 forms an insert hole 312 which is tapered to the tip so that an unillustrated hose, tube, or the like can be easily inserted.

The socket 340 has a shape with a diameter expanding stepwise, including: a first larger-diameter section 341 whose diameter is slightly larger than that of the insert hole 312; a second larger-diameter section 342 whose diameter is slightly larger than that of the first larger-diameter section 341; and a third larger-diameter section 343 whose diameter is still larger than that of the second larger-diameter section 342. The opposite end portion of the socket 340 against the pipe 311 forms an insert hole 350 for receiving the insertion section 320.

The tapered tip section 321 of the inserting section 320 is to be inserted in the inner circumference of the first larger-diameter section 341. On the inner circumference of the second larger-diameter section 342, an unillustrated O-ring is disposed, and the straight section 322 of the insertion section 320 is inserted therein.

In the inner circumference of the third larger-diameter section 343, the wider-diameter taper section 323 of the insertion section 320 and the annular groove 324 are inserted. The stopper 360 is fitted on the annular groove 324 so as to prevent slip-off. On the third larger-diameter section 343 of the socket 340, there is formed a guide groove 344 in which the positioning protrusion 325 for the inserting section 320 is to be inserted.

On the third larger-diameter section 343 of the socket 340, there is formed a notched groove 345 in which the stopper 360 is to be inserted. The notched groove 345 is formed in a shape of a slit so as to pass through the socket 340 along the opposing section in the circumferential direction of the third larger-diameter section 343.

On the upper half section of the notched groove 345 on the outer circumference of the third larger-diameter section 343, a rib 346 protruding from the opposing edge of the notched groove 345 is formed so as to hold the stopper 360 securely therebetween. On the middle section of the notched groove 345 on the third larger-diameter section 343 outer circumference, at the end side of the socket 320, there is formed a recessed section 347 whose radial cross section is V-shaped. On the bottom end of the notched groove 345 on the outer circumference of the third larger-diameter section 343, there is formed a receiving recess 348 which is surrounded by a U-shaped wall for containing an end portion of the stopper 360.

The stopper 360 is composed of a wire and the like which is bent in an overall arch-shape. On respective end of the stopper 360, there are formed bent-forward sections 361 which are bent toward the axial direction of the socket 320 or at approximately 90 degrees to the insert hole. Further, at the respective sections which are slightly closer to the base from the bent-forward sections 361, there are formed bent-inward sections 362 which bend toward the inside in an arc shape.

When the stopper 360 is fitted on the socket 340, the stopper 360 is put over the socket 340 from above while being inserted into the notched groove 345 with both ends of the stopper 360 widened. Then, the bent-forward sections 361 of the stopper are fitted in the V-shaped recessed 347 on the outer circumference of the socket 340 and held. When the stopper is pushed further down from the above state, both ends of the stopper 360 are slid while being widened again, and the bent-forward sections 361 are fitted in the receiving recesses 348.

At this time, as shown in FIG. 11, both ends of the stopper 360, which are inserted into the notched grooves of the socket 340, pass across the circumference of the notched groove 345 in the manner of a string so that parts of the ends protrude inward from the inner circumference of the notched groove 345; particularly, the bent-inward sections 362 protrude inward to a large extent.

An LC resonance tag is affixed on the straight section 322 of the insertion section 320 formed on the end portion of the pipe 310. Lead sections 170 are respectively connected to the contacts 124 and 125 of the respective sides of the circuit of the LC resonance tag, and each of the lead sections 170 extends to the inner wall of the annular groove 324 and forms a conductive pattern 171 on the bottom face of the annular groove 324.

Therefore, when the pipes 310 and 311 are connected, the insertion section 320 is inserted into the socket 340 of the pipe 311 on which the stopper 360 is fitted, while the positioning protrusion 325 is positioned in the guide groove 344. The stopper 360 protrudes inward from the notched groove 345. While the protruding section is widened in contact with the wider-diameter taper section 323, the insertion section 320 continues to be inserted. Finally, both ends of the stopper 360 fit on the annular groove 324 of the insertion section 320 to thereby complete connection between the pipes 310 and 311.

When connection is thus completed, both ends of the stopper 360 press the bottom face of the annular groove 324 and are brought into contact with the respective conductive patterns 171. Accordingly, a pair of leads 150 are brought into conduction, and the circuit of the LC resonance tag 100 is closed and functions as a resonance circuit. Then, completion of connection can be confirmed by transmitting the transmission radio waves A having approximately the same frequency as the resonance frequency of the resonance circuit from the transmitter, and receiving the echo waves B reflected by the resonance circuit with the receiver.

Before completion of connection, the pair of conductive patterns 171 which are respectively connected to the ends of the circuit of the LC resonance tag 100 are open. Therefore, the circuit of the LC resonance tag 100 is not a closed circuit. So long as the pipe 310 is not fully inserted into the socket 340 of the pipe 311, the stopper 360, which forms a short-circuit or short-circuit member cannot be inserted in the annular groove 324. For this reason, both ends of the stopper 360 are not brought into contact with the respective conductive patterns 171 which are formed on the bottom face of the annular groove. Because the conductive patterns 171 are opened with respect to each other, even in the case where the transmission radio waves A are transmitted from the transmitter, the circuit does not function as a resonance circuit, and the echo waves B are not generated. Because the receiver does not receive the echo waves B, completion of connection of the 3-piece pipe connector 300 cannot be confirmed.

The 3-piece pipe connector 300 according to the embodiment is for the use of connecting coolant piping on automobiles, and application thereof is not limited to connections in which member to be connected is a hose or a tube attached to the pipe 310 and the pipe 311.

The 3-piece pipe connector 300 can also be used for connection between hoses or tubes when the hose or the tube is attached on a nipple which is formed on the end portion of the inserting section 320 instead of the pipe 310, and the insertion section 320 is connected to a socket 340.

By integrally forming either the insertion section 320 or the socket 340 with equipment used for cooling or a member such as a radiator, or by attaching the same thereon, the 3-piece pipe connector can be used for connection between equipment used for cooling or a member such as a radiator, and a pipe, a hose, or a tube.

As is apparent, in any connection of the members to be connected, the connection between the respective members to be connected can be confirmed reliably, instantaneously in a non-contacting manner, which is similar to that described previously.

FIGS. 12A to 12D show still another embodiment in which the invention is applied to a pipe connector.

Figure 12A:
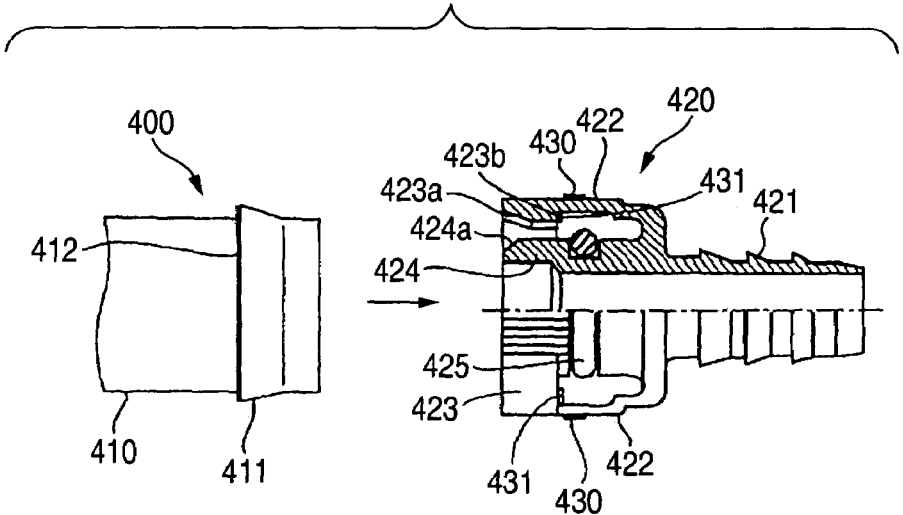
FIG. 12A is an explanatory diagram showing a pipe to be connected and a connector main body.

A 2-piece pipe connector 400 is for connecting a pipe 410, and a hose, a tube, or the like. As shown in FIG. 12A, a larger-diameter section 411 which is tapered to the tip is formed on the tip of the pipe 410.

A connector main body 420 to be connected with the pipe 410 is made of an insulating member, and connected to a nipple 421 which is inserted in a hose or a tube. An end portion 424 opposite the nipple 421 is formed such that the outer circumference of a tip 424a is tapered to the tip end so as to allow insertion into the inner circumference of the pipe 410. An O-ring 425 is attached onto the outer circumference of the end portion 424. The connector main body 420 has a through hole extending axially.

Figure 12B:
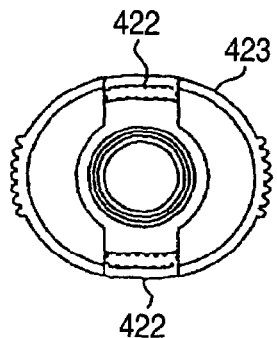
FIG. 12B is an end view of the connector main body, FIG. C is a partial perspective view showing a conductive plate provided on the connector main body, and FIG. D is a perspective view showing an LC resonance tag.

As shown in FIG. 12B, elastic pieces 422 extend from two opposing points on the outer circumference of the connector main body 420 so as to cover the end portion 424. An annular band 423 is integrally connected to the end portions of the respective elastic pieces 422. An inner circumference 423a of the band 323 is formed in a taper which is gradually expanded in diameter toward the end portions. A stepped expanding-diameter section 423b is formed at a section where the elastic pieces 422 are connected on the inner circumference of the band 423.

Therefore, the pipe 410 is constituted such that: the pipe 410 is inserted between the end portion 424 and the band 423; the larger-diameter section 411 of the pipe 410 is prevented from slipping off by being engaged in the stepped larger-diameter section 423b, whereby the pipe 410 is fully connected to the connector main body 420.

Figure 12C:
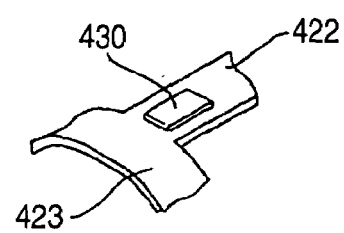

As shown in FIG. 12C, a conductive plate 430 is attached to each of the two connection sections between the band 423 and the elastic pieces 422. As shown in FIG. 12A, the conductive plate 430 is connected, through the elastic pieces 422 and the band 423, to a conductive pattern 431 on the stepped larger-diameter section 423b of the band 423. Further, an annular conductive pattern 412 is formed on a stepped engaging section of the larger-diameter section 411 of the pipe 410.

Figure 12D:
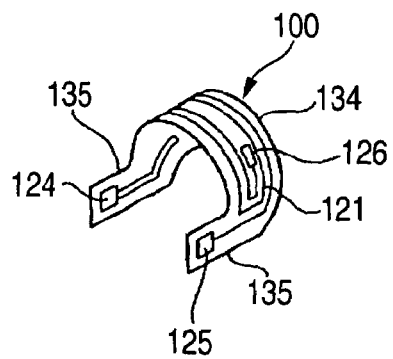

An LC resonance tag 100 shown in FIG. 12D is attached on the outer circumference of the band 423. The LC resonance tag 100 has an elongated rectangular sheet 134, and arm-shaped sheets 135 which extend from respective ends of the rectangular sheet 134 in a direction perpendicular thereto. Contacts 124 and 125 are provided on the inner circumference (i.e., the side which contacts the connector main body 420) of the armed-shaped sheets 135. Further, the rectangular sheet 134 is attached on the outer circumference of the band 423, the arc-shaped sheets 135 are attached on the elastic pieces, and the contacts 124 and 125 are in contact with the conductive plates 430 of the elastic pieces 422 so as to obtain conductivity.

When the pipe 410 is fully inserted into the connector main body 420, the larger-diameter section 411 of the pipe 410 is engaged in the stepped expanding-diameter section 423b of the band 423. The annular conductive pattern 412 formed on the stepped engaging section of the larger-diameter section 411 of the pipe 410 contacts the conductive patterns 431 and bring them into conduction.

Because the conductive pattern 431 has continuity with the contacts 124 and 125 of the LC resonance tag 100 via the conductive plate 430, the contacts 124 and 125 of the LC resonance tag 100 are brought in conduction each other. Thereby, the circuit of the LC resonance tag 100 is closed and functions as a resonance circuit. Therefore, completion of connection can be confirmed by transmitting the transmission radio waves A having approximately the same frequency as the resonance frequency of the resonance circuit from the transmitter, and by receiving the echo waves B reflected by the resonance circuit with the receiver.

Before completion of connection, the pair of conductive patterns 431 which are connected to the respective ends of the circuit of the LC resonance tag 100 are open. Therefore, the circuit of the LC resonance tag 100 is not a closed circuit. So long as the pipe 410, forming a shortcircuit and being a conductive member, is not fully inserted into the connector main body 410, the stepped engaging section of the larger-diameter section 411 is not engaged in the stepped expanding-diameter section 423b. Accordingly, the annular conductive pattern 412 is not brought into contact with the conductive pattern 431. Because the conductive patterns 431 are held opened, even in the case where transmitted radio waves A are transmitted from the transmitter, the circuit does not function as a resonance circuit, and the echo waves B are not generated. Because the receiver does not receive the echo waves B, completion of a connection of the 2-piece pipe connector 400 cannot be confirmed.

The 2-piece piping connector 400 according to the embodiment is for the use in connecting coolant piping on automobiles. Therefore, application thereof is not limited to connection whose member to be connected is the pipe 410, a hose, or a tube which is attached on the connector main body 420.

The 2-piece pipe connector 300 can also be used for connection between hoses or between tubes when the hose or the tube is attached on the nipple formed on the end of the pipe 410, and the pipe 410 and the connector main body 420 are connected.

By integrally forming either the pipe 410 or the connector main body 420 with equipment used for cooling or a member such as a radiator, or by attaching the same thereon, the 2-piece pipe connector 40 can be used for connection between equipment used for cooling or a member such as a radiator, and a pipe, a hose, or a tube.

As is apparent, in any connection of the members to be connected, the connection between the respective members to be connected can be confirmed reliably, instantaneously, in a non-contacting manner, which is similar to that described previously.

When the pipe 410 is a conductive member made of a conductive material, the pipe 410 itself forms a shortcircuit and functions similarly to the current conductive pattern 412. Thereby, the conductive pattern 412 can be eliminated.

Figure 13:
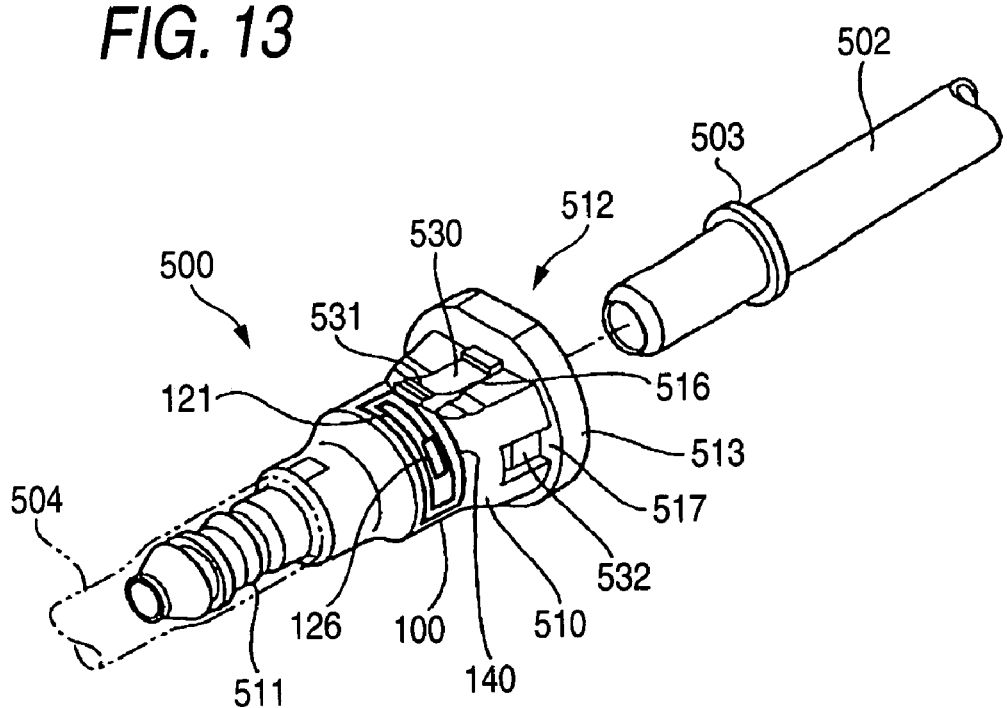
FIG. 13 is a perspective view showing still another embodiment where the invention is applied to a fuel connector.
Figure 14:
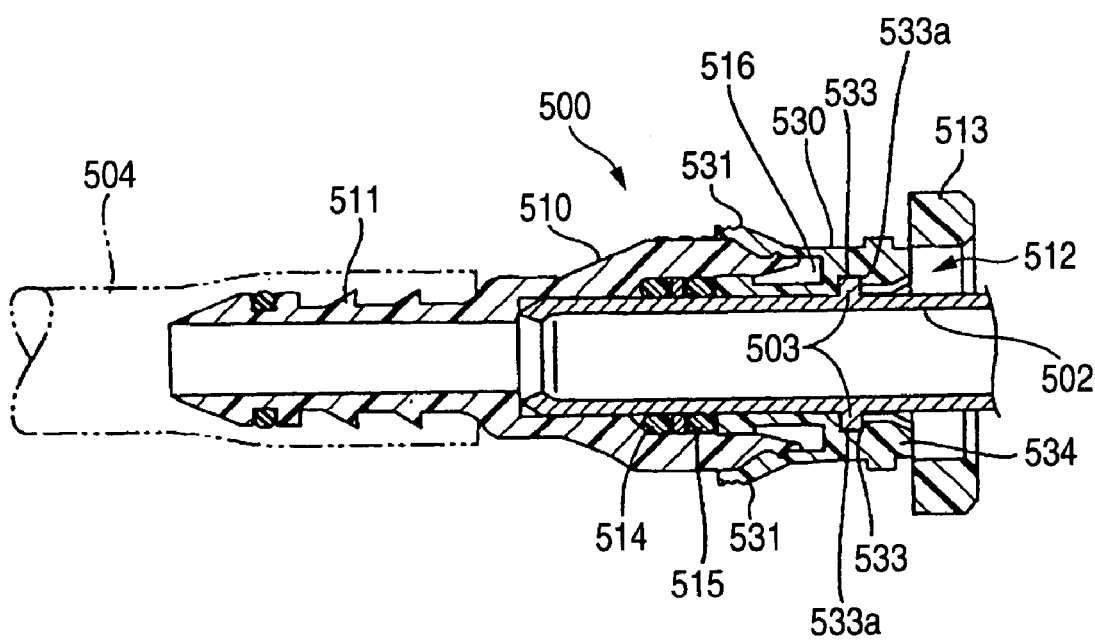
FIG. 14 is a cross-sectional view showing a state of connection of a fuel connector.
Figure 15:
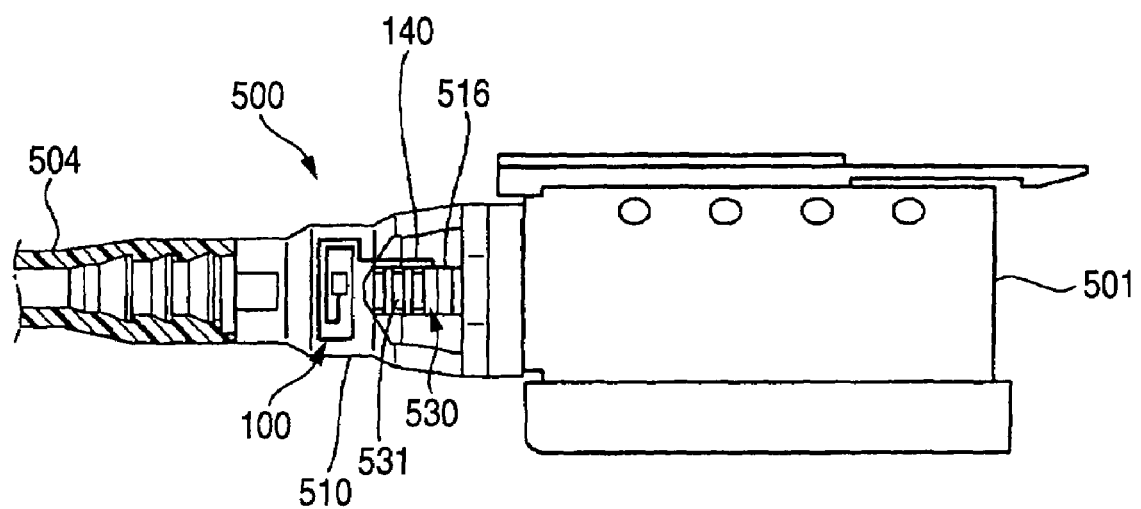
FIG. 15 is an explanatory diagram showing a state of connection of a fuel connector connected to a fuel cut valve.

FIGS. 13 through 15 show still another embodiment in which the invention is applied to a fuel connector.

The fuel connector 500 is made of an insulating member, and is suitably used, for example, for piping connection to a fuel cut valve 501 which is disposed within a fuel tank of an automobile as shown in FIG. 15. The fuel cut valve 501 is for the use in sending vapor in a fuel tank to a canister through piping connected to the valve 501. When the fuel level has been increased for reasons of vibrations of the automotive vehicle or the like, a built-in float valve blocks the path.

Specifically, a pipe 502 made of a conductive metal as shown in FIG. 13 is attached to the fuel cut valve 501. The pipe 502 is for discharging vapor inside a fuel tank, and is provided with an annular rib 503 on its outer circumference. A tube 504 is to be connected to the pipe 502 via the fuel connector 500. The tube 504 is linked to a canister or the like which is taken out of the fuel tank and not shown.

The fuel connector 500 has a cylindrical main body 510, and a through hole extending in the axial direction of the main body. One end of the main body 510 includes a connecting pipe section 511 which has the shape of a bamboo shoot and extends in the axial direction. The tube 504 is inserted over the connecting pipe section 511 to establish a connection.

An insert hole 512 for receiving the pipe 502 is opened on the end portion of the main body 510 opposite the connecting pipe section 511. A restrictive section 513 whose diameter is expanded to form a flange is formed on the periphery of the insert hole 512. The insert hole 512 leads to the through hole and has a section where the inner diameter is expanded so as to be larger than the outer circumference of the pipe 502. On the larger-diameter section, an annular sliding member 530 is inserted in such a way that it can slide in relation to the main body 510. O-rings 514 and 515 are disposed between a tip section 534 of the sliding member 530 and an end portion of the larger-diameter section of the insert hole 512, and provide a seal between the pipe 502 and the main body 510.

The sliding member 530 has pressing pieces 531 which extend outward at two opposing points on the outer circumference, and fitting protrusions 532 which similarly protrude outward at points away from the press pieces 531 at an angle of 90 degrees. The pressing pieces 531 protrude out of the main body 510 through openings 516 of the main body 510. The fitting protrusions 532 fit on other openings 517 of the main body 510.

On the inner circumference of the sliding member 530, there is formed an annular groove 533, in which the flange 503 of the pipe 502 fits. Further, the tip section 534 of the sliding member 530 is disposed as follows: when the sliding member 530 moves to the opening side of the insert hole 512, it is inserted by the inner circumference of the restrictive section 513 and prevented from expanding in diameter; and when the sliding member 530 is positioned at the deep side of the insert hole 512, it is away from the restrictive section 513 and its diameter can be expanded through the openings 516.

The LC resonance tag 100 is affixed on the outer circumference of the main body 510. Lead wires 140 are connected to the contacts 124 and 125 on the respective ends of the circuit of the LC resonance tag 100. The lead wires 140 are further connected to two conductive patterns 533a which are formed on the inner circumference of the annular groove 533 of the sliding material 530.

At the time of connecting the fuel connector, first, the sliding member 530 is moved to the deep side of the insert hole 512 so that the tip section of the sliding member 530 is away from the restricting section 513 from the main body 510, and the tip section 534 can be expanded in its diameter through the openings 516.

When the pipe 502 is inserted into the insert hole 512 of the main body 510 under the above state, the tip 534 of the sliding member 530 is bent outward and its diameter is expanded, and the flange 503 of the pipe 502 fits in the annular groove 533.

When connection of the pipe 502 is thus completed, the flange 503 of the pipe 502 contacts the conductive patterns 533a on the inner circumference of the annular groove 533. Accordingly, the conductive patterns 533a which are connected to the respective lead wires 140 are brought into conduction with each other via the pipe 502. Thereby, the circuit of the LC resonance tag 100 is closed and functions as a resonance circuit. Therefore, completion of connection can be confirmed by transmitting the transmission radio waves A having approximately the same frequency as the resonance frequency of the resonance circuit from the transmitter, and by receiving the echo waves B reflected by the resonance circuit with the receiver.

Before completion of connection, the pair of conductive patterns 533a which are connected to the respective ends of the circuit of the LC resonance tag 100 are open. Therefore, the circuit of the LC resonance tag 100 is not a closed circuit. So long as the pipe 502, forming a shortcircuit and a conductive member, is not fully inserted into the fuel connector 500, the flange 533 does not fit in the annular groove 533. Accordingly, the flange 503 is not brought into contact with the conductive patterns 533a. While the conductive patterns 533a are held open, even in the case where the transmission radio waves A are transmitted from the transmitter, the circuit does not function as a resonance circuit, and the echo waves B are not generated. Because a receiver does not receive the echo waves B, completion of connection of the fuel connector 500 cannot be confirmed.

Under the above state, when the pipe 502 is pulled toward a drawing direction, the sliding member 530, in which the flange 503 of the pipe 502 is fitted is pulled in the same direction, and the sliding member 530 is slid toward the opening side. Then, the state of the tip section 534 of the sliding member 530 shifts from the state wherein the tip section is away from the restrictive section 513 to the state wherein the tip section 534 is fitted into the inner circumference of the restrictive section 513. Accordingly, the tip section 534 is prevented from expanding in diameter. As a result, the flange 503 fitted into the annular groove 533 is prevented from coming out of the annular groove 533; namely, dislodgement of the flange 503 is prevented.

On the other hand, when the pipe 502 is desired to be drawn from the main body 510 to separate again, the pipe 502 is temporarily pushed into the insert hole 512 of the main body 510. While the sliding member 530 is held at a position moved to the deep interior of the insert hole 512 while the pressing piece 531 is held with a hand, the pipe 502 is pulled in the drawing direction. Then, because the tip section 534 of the sliding member 530 is expanded in its diameter through the openings 516, the flange 503 of the pipe 502 comes out of the annular groove 533, thereby allowing the pipe 502 to be drawn from the insert hole 512 of the main body 510.

Figure 16:
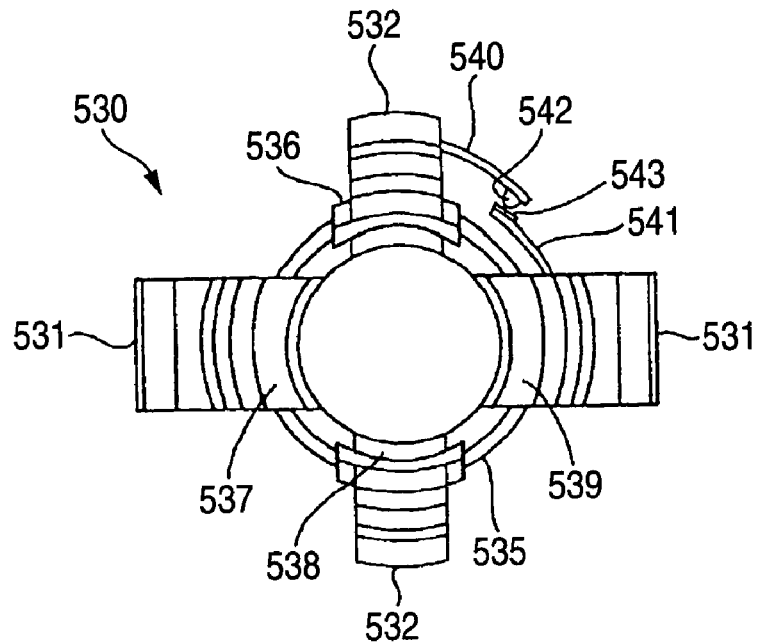
FIG. 16 is an end view of a sliding member according to still another embodiment where the invention is applied to a fuel connector.
Figure 17:
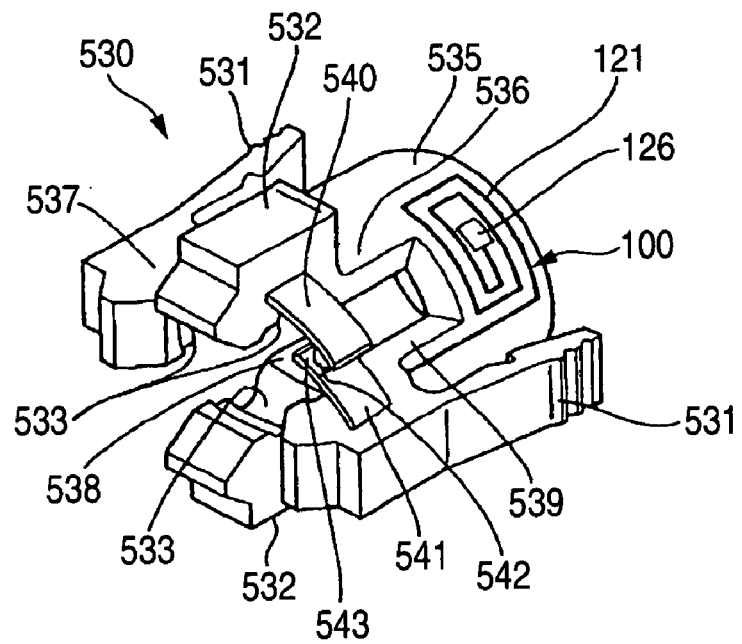
FIG. 17 is a perspective view of the sliding member of the embodiment.

FIGS. 16 and 17 show still another embodiment in which the invention is applied to a fuel connector. Those sections which are identical with those of the embodiment shown in FIGS. 13 through 15 are denoted by the same reference numerals, and repeated description thereof is omitted.

The present embodiment relates to a fuel connector with retainer suitable for connecting a pipe 502 made of an insulating member.

The structure of the connector itself of the embodiment is substantially identical with that of the embodiment described by reference to FIGS. 13 through 15. The present embodiment is characterized in that the LC resonance tag 100 is attached onto the sliding member 530.

Specifically, the sliding member 530 has a cylinder section 535, and a total of four protruding pieces 536, 537, 538, and 539 which are arranged at intervals of approximately 90 degrees and protrude in the axial direction from one end face of the cylinder section 535. The pressing pieces 531 are integrally formed with the protruding pieces 537 and 539 which face opposite each other in a circumferential direction. The pair of protruding pieces 536 and 538 are formed so as to deviate from the protruded pieces 537 and 539 at angles of 90 degrees, and face opposite each other in the circumferential direction. Further, the fitting protrusions 532 are formed on the protruding pieces 536 and 538. As described in the embodiment shown in to FIGS. 13 and 14, the pressing pieces 531 protrude out of the main body 510 through the openings 516 of the main body. The fitting protrusions 532 fit on other openings 517 of the main body. The annular groove 533 is formed on the inner circumferences of the tips of the four protruding pieces 536, 537, 538, and 539, respectively.

Strips 540 and 541 extend from the adjacent pair of protruding pieces 536 and 539 along the circumferential direction. Tips of the strips 540 and 541 are slightly overlapped with a predetermined radial interval therebetween, and contacts 542 and 543 are formed on the facing surfaces. The LC resonance tag 100 is attached on the outer circumference of the cylinder section 535. Lead wires which have continuity with the pair of opened contacts of the LC resonance tag 100 are connected to the contacts 542 and 543, respectively. The lead wires and the contacts 542 and 543 can be formed by providing a conductive pattern on the surface of the sliding member 530.

Accordingly, in the embodiment, when the flange 503 of the pipe 502 which is shown in the FIGS. 13 through 15 is fitted in the annular groove 533 of the sliding member 530 to thereby complete connection, the protruding pieces 536, 537, 538, and 539 expand in diameter. At this time, the exterior strip 540 does not expand, because of restraint by the inner circumference of the main body 510. In contrast, the interior strip 541 expands together with the protruding piece 539, and the contacts 542 and 543 are brought into contact with each other. Thereby, the circuit of the LC resonance tag 100 is closed and functions as a resonance circuit. Therefore, completion of connection can be confirmed by transmitting the transmission radio waves A having approximately the same frequency as the resonance frequency of the resonance circuit from the transmitter, and by receiving the echo waves B reflected by the resonance circuit with the receiver.

Before completion of connection, the contacts 542 and 543 connected to the respective ends of the LC resonance tag 100 respectively are open. Therefore, the circuit of the LC resonance tag 100 is not a closed circuit. So long as the pipe 502, being a conductive material, is not fully inserted into the fuel connector 500, the protruding piece 539, which is provided with the strip 541, does not expand in diameter, and the strip 541 does not expand in the direction of the normal, as well. Accordingly, the contact 542 is not brought into contact with the contact 543. Because the contacts 542 and 543 are held as being open, even in the case where the transmission radio waves A are transmitted from the transmitter, the circuit does not function as a resonance circuit, and the echo waves B are not generated. Because the receiver does not receive the echo waves B, completion of a connection of the fuel connector 500 cannot be confirmed.

As described above, the fuel connector can be applied to a pipe 502 of either a conductive material or an insulating material.

Application of the fuel connector 500 according to the embodiment is not limited to connection wherein a member to be connected is a hose, a tube, or a fuel cut valve with the pipe 502. It can also be applied to connections wherein a member to be connected has a valve function for controlling direction of fuel flow, flow rate, or the like, such as a cut-off valve, a check valve, or a drain valve, or a fuel tank.

Connection between hoses or tubes can also be achieved by connecting the hose or the tube, on whose tip the pipe 502 is provided, with the fuel connector 500.

When a member having a valve function or a fuel tank on which the fuel connector 500 is provided serves as one member to be connected, and a member having a valve function or a fuel tank, on which the fuel connector 500 is provided, serves as the other member to be connected, they can also be connected directly.

As is apparent, in any connection of the members to be connected, the connection between the respective members to be connected can be confirmed reliably, instantaneously, in a non-contacting manner, which is similar to that described previously.

In the case where the fuel connector is attached on a member having a valve function or a fuel tank, the LC resonance tag 100 of the fuel connector 500 may be relocated on the member so as to connect between the fuel connector 200 and the LC resonance tag 100 with a conductive pattern so as to confirm the connection.

As described above, connection between members of a wide variety of connectors can be confirmed to be connected, reliably, instantaneously in a non-contacting manner.

In an engine compartment of an automobile or the like, coolant piping for cooling an engine or fuel piping of the engine is disposed in close proximity in all directions. Accordingly a large number of connecting points of the piping exist. In order to confirm completion of connection at the large number of connection points, completion of connection at each connection point can be confirmed, as described hitherto, by means of, for example, using different LC resonance tags 100, which differ from each other in terms of size of the capacitor 126 or shape of the coil 121. on respective connecting tools, members to be connected, or connecting points; or using different connecting tools which are formed on the capacitors 126 or the coils 121, and which differ from each other in terms of size of the capacitor 126 or shape of the coil 121 on the respective connecting points.

Figure 18:
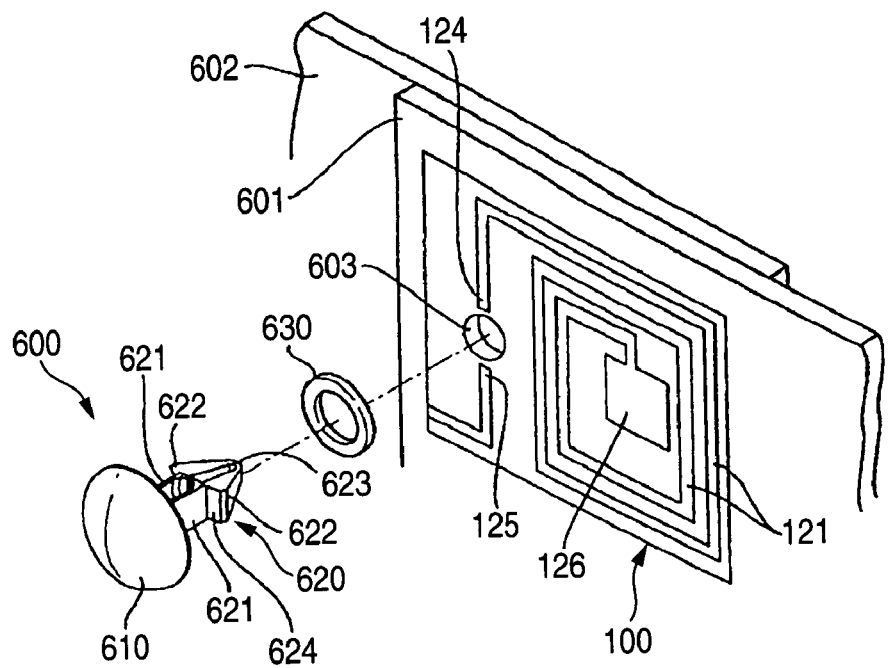
FIG. 18 is a perspective view showing an embodiment where the invention is applied to a button clip.

FIG. 18 shows an embodiment wherein the invention is applied to a button clip which is inserted into an through hole and fastens superposed two members to be fastened by means of an elastic leg and a flange.

The clip 600 is for fastening panels 601 and 602 being members to be fastened, and is composed of insulating members. The clip 600 has a head section 610 and a leg section 620. The head section 610 has a circular circumference which is spread to form a flange, and a top face which is protrudes to form a curve. The leg section 620 is composed of: a pair of parallel columns 621, 621 extending substantially perpendicular from the bottom surface of the head 610; engaging claw sections 622, 622 which extend from the middles of the columns 621 in the outer radial direction; and a connecting section 623 serving as tip sections of the engaging claws 622, 622 which have been formed into angled tapers and connected with each other.

Insert holes 603 are formed on the panels 601 and 602 (for convenience of explanation, in FIG. 18 only the insert hole of the panel 601 is shown). In the case of fastening by the button clip 600, the panels 601 and 602 are superposed so as to superpose the insert holes 603.

When the leg section 620 of the button clip 600, drawn through a metal washer 630, is inserted into the insert holes 603 of the superposed panels 601 and 602, the leg section 620 is bent inward. The engaging claw sections 622, 622 pass through the insert holes 603, and engage on the periphery of an opening on the back side of the insert hole on the panel 602. As a result, the panels 601 and 602 are engaged by the clip 600.

Inclined faces 624 are faces which face the head section 610 and form the engaging claw sections 622. Upon completion of fastening, the inclined faces 624 of the engaging claw sections 622 engage on the periphery of the insert hole 603 of the panel 620.

When the engaging claw sections 622, which have been bent at the time of insertion into the insert hole 603, have passed through the insert hole 603, an elastic restoration force acts in the outer radial direction. Accordingly, a component force having a direction opposite the insertion direction is generated by the inclined faces 624 engaged on the periphery of the insert hole 603.

Therefore, upon completion of fastening by the button clip 600, the head section 610 and the engaging claw sections 622 press the two panels 601 and 602.

Of the above two panels 601 and 602, the LC resonance tag 100 is attached on the panel 601, which is disposed on the insertion side of the button clip 600. The contacts 124 and 125 of the LC resonance tag 100 are oppositely disposed with the insert holes 603 therebetween. As a result, when the above fastening is completed and the washer 630 contacts the contacts 124 and 125, the circuit of the LC resonance tag 100 is closed, and functions as a resonance circuit. Therefore, completion of connection can be confirmed by transmitting the transmission radio waves A having approximately the same frequency as the resonance frequency of the resonance circuit from the transmitter, and by receiving the echo waves B reflected by the resonance circuit with the receiver.

Before completion of fastening, because the contacts 124 and 125 of the LC resonance tag 100 are open, the circuit of the LC resonance tag 100 is not a closed circuit. So long as the metal washer, which forms a shortcircuit and is a conductive member, is not securely pressed onto the contacts 124 and 125 by the engaging claw sections 622 engaged on the head section 610 of the button clip 600 and the panel 602, the contact 124 and the contact 125 cannot stably maintain a contact state with the metal washer 630. For example, in the case where the button clip 600 is inserted in the insert hole 603 but the engaging claw sections 622 are not engaged in the panel 602, a contact state cannot be maintained stably. Accordingly, the LC resonance tag 100 may or may not become a closed circuit. Under such a state, even in the case where the transmission radio waves A are transmitted from the transmitter, the circuit may or may not function as a resonance circuit, such that in some cases echo waves B are generated and in other cases they are interrupted. Thus, because the receiver does not receive the echo waves B continuously, completion of fastening between the panels 601 and 602 cannot be confirmed.

Figure 19:
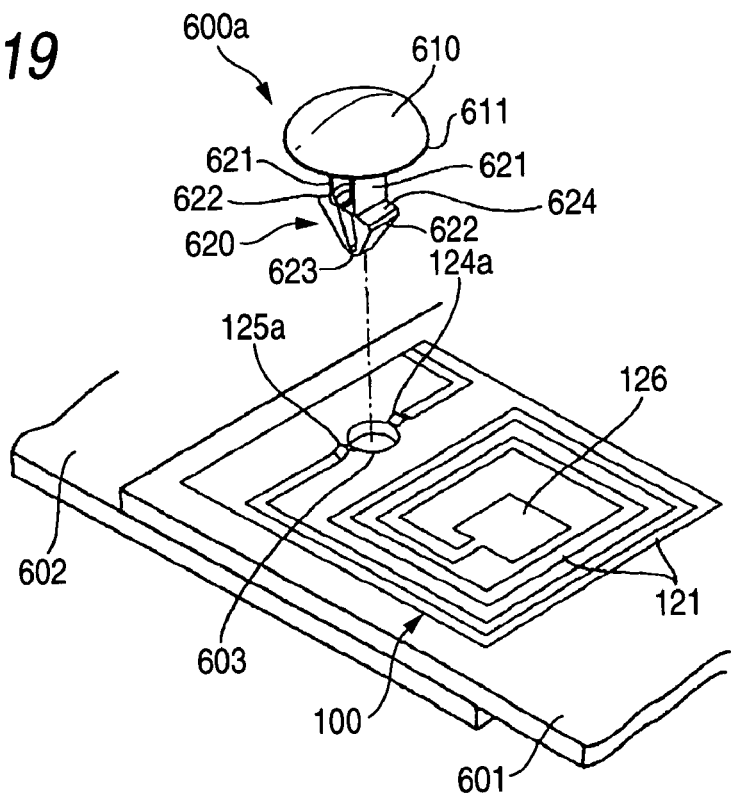
FIG. 19 is a perspective view showing an embodiment where the invention is applied to a button clip.
Figure 20:
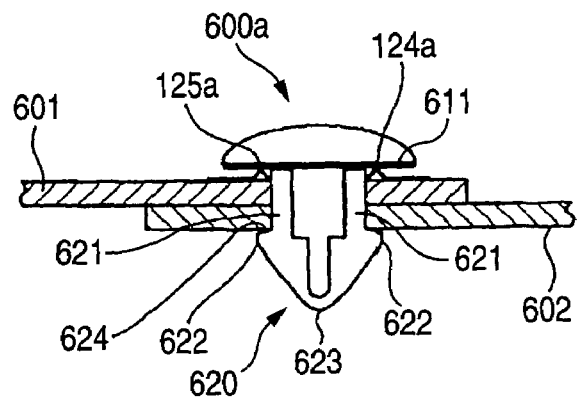
FIG. 20 is a cross-sectional view showing a state of connection of a button clip in the another embodiment where the invention is applied to a button clip.

FIGS. 19 and 20 show another embodiment in which the invention is applied to a button clip. The embodiment has basically the same constitution as that of the embodiment shown in FIG. 18. Therefore, identical components are labeled with the same reference numerals, and their repeated explanations are omitted.

The button clip 600*a* can achieve fastening without using a metal washer, and has an annular conductive pattern 611 formed on the bottom face of the flange section of the head section 610, which is made of an insulating member. In addition, contacts 124*a* and 125*a* of the LC resonance tag 100 are caused to protrude by means of soldering or the like. Other components are identical with those of the embodiment of FIG. 18.

The button clip 600*a* is constituted as follows. When the leg section 620 of the button clip 600*a* is inserted to the insert holes 603 of the pair of panels 601 and 602, the leg section 620 is bent inward. The engaging claw sections 622, 622 pass through the insert holes 603, and engage on the periphery of an opening on the back side of the insert hole 603 of the panel 602. Thereby, the pair of panels 601 and 602 are engaged. At this time, the conductive pattern 611 formed on the bottom face of the head section 610 of the bottom clip 600*a* comes in contact with the contacts 124*a* and 125*a*. Thus, the circuit of the LC resonance tag 100 is closed, and functions as a resonance circuit. Consequently, completion of fastening can be confirmed without use of a metal washer.

Before completion of fastening, because the contacts 124*a* and 125*a* of the LC resonance tag 100 are open, the circuit of the LC resonance tag 100 is not a closed circuit. So long as the annular conductive pattern 611, forming a shortcircuit and being a shortcircuit line, is not pressed onto the contacts 124*a* and 125*a* by the engaging claw sections 622 engaged on the panel 602, the contact 124*a* and the contact 125*a* cannot stably maintain a state of contact with the conductive pattern 611. For example, in the case where the button clip 600*a* is inserted in the insert hole 603 but the engaging claw sections 622 are not engaged in the panel 602, a contact state cannot be maintained stable. Accordingly, the LC resonance tag 100 may or may not become a closed circuit. Even in the case where the transmission radio waves A are transmitted from the transmitter, the circuit may or may not function as a resonance circuit, whereby in some cases echo waves B are generated, and in other cases they are interrupted. Thus, because the receiver does not receive the echo waves B continuously, completion of fastening between the panels 601 and 602 cannot be confirmed.

Needless to say, although not shown, even in a case where a clip having components on its head is fastened onto a panel serving as a member to be fastened, completion of fastening between the clip and the panel can be confirmed, so long as the LC resonance tag 100 is affixed to the panel such that the contacts 124, 125 of the LC resonance tag 100 opposes the periphery of a hole into which the clip is to be inserted, and the metal washer 630, which acts as a short-circuit and a conductive member, and the conductor pattern 611 serving as a short-circuit line are short-circuited by means of the contacts 124, 125.

Meanwhile, completion of connection can also be confirmed by means of the following constitution: the contacts 124 and 125 of the LC tag 100 are bridged in advance by use of a short-circuit line so as to close the circuit of the LC tag 100 and allow it function as a resonance circuit; the short-circuit line is disposed on the through hole 603 so that a button clip, whose contacting section, which contacts the contacts 124 and 125, is made of an insulating member, cuts off the shortcircuit line with the tip thereof at the time of insertion into the insert hole 603, thereby shutting off the closed circuit and disabling a function as a resonance circuit.

So long as the shortcircuit line is not cut off, the circuit functions as a resonance circuit. Therefore, when the transmission radio waves A are transmitted from the transmitter, the echo waves B are generated and received by the receiver. Accordingly, failure of the button clips 600 and 600*a* to be inserted in the through hole is confirmed, whereby the fastening between the panel 601 and 602 is identified not to be connected.

In the case where the tip of the button clip 600 or 600*a* cuts off the shortcircuit line, the cut-off of the shortcircuit line indicates completion of fastening. When the button clip 600 or 600*a* is further inserted to thereby complete the actual fastening, a component force is generated in the direction of insertion, and fastening force is applied on the panels 601 and 602. Accordingly, the contacts 124 and 125 are pressed by the insulating member of the clip, which prevents contact between the contact 124 and the contact 125. Therefore, even in the case where the transmitted radio waves A are transmitted from the transmitter, the circuit does not function as a resonance circuit, and the echo waves B are not generated. Because the receiver does not receive the echo waves B, completion of fastening between the panels 601 and 602 cannot be confirmed.

There may be used an LC resonance tag whose contacts 125 and 126 and shortcircuit line are replaced by lead wires.

Therefore, when such a constitution is applied, not only the contacts 125 and 126, but also the metal washer 630 and the conductive pattern 611 become redundant, and fastening can be confirmed by means of an inexpensive constitution.

Figure 21A:
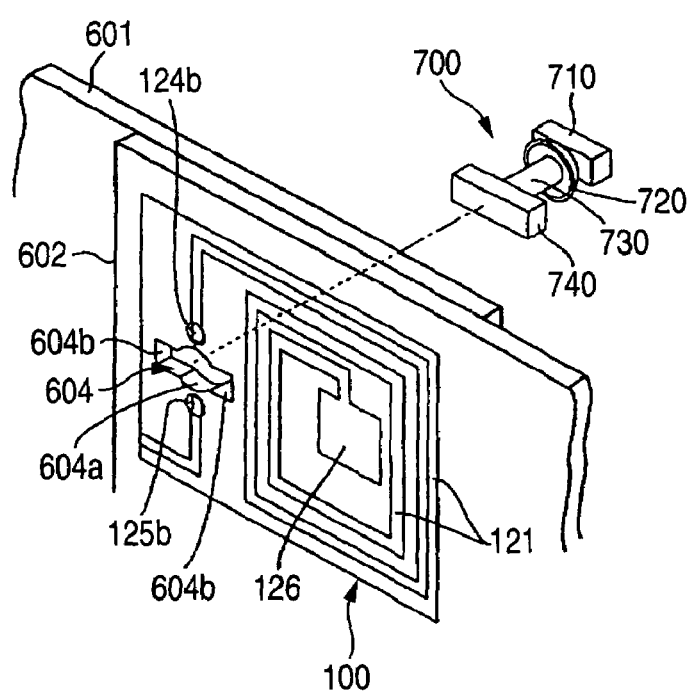
FIGS. 21A and 21B are a perspective view showing still another embodiment where the invention is applied to a turn clip.
Figure 21B:
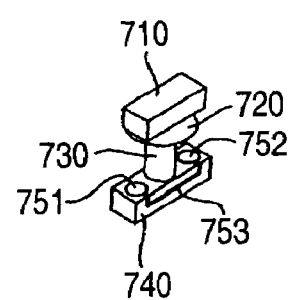

FIG. 21 shows still another embodiment in which the invention is applied to a turn clip which fastens a member to be fastened by being inserted and turned.

The turn clip 700 includes: a rectangular prism-shaped head 710 made of an insulating member; a seal pad 720 which is integrally formed on one face of the head 710 and spreads in a skirt shape; a column 730 extending in a T-shape against the head 710 while sandwiching the seal pad 720 therebetween; and a rectangular prism-shaped engaging section 740 which is connected to the bottom end of the column 730 in a T-shape as well.

Further, protruding contacts 751 and 752 are formed on an engaging face, which is a face opposing the head 710, on the engaging section 740 with the column 730 therebetween. The contacts 751 and 752 are connected to respective ends of a conductive pattern 753 formed on the engaging section 740.

Meanwhile, insert holes 604, each composed of a center circular sections 604a and notched sections 604b, are formed on the pair of panels 601 and 602 (for convenience of explanation, only the insert hole 604 of one of the panels, 602, is shown in FIG. 21).

In the embodiment, the LC tag 100 is attached on the outer side face of the panel 602, which is the back side, opposite the insertion direction of the turn clip 700. Recessed contacts 124b and 125b of the LC resonance tag 100 are disposed opposite each other with the insert hole 604 therebetween. In this case, the contacts 124b and 125b are disposed perpendicular to the directions of the notched sections 604b.

With regard to the turn clip 700, the engaging section 740 and the column 730 are inserted into the insert holes 604 of the panels 601 and 602 which are superposed so that the insert holes 604 are aligned. At this time, the engaging section 740 can be inserted by aligning its longitudinal direction along the direction of the notched sections 604b of the insert holes 604.

When the engaging section 740 has thus protruded out of the back side panel 602, the turn clip 700 is turned by 90 degrees to engage with the engaging section 740 on the periphery of the insert hole 604 on the back side panel 602. At this time, the seal pad 720 is elastically crimped to the surface side panel 601. Accordingly, the engaging face of the engaging section 740 is pressed in contact against the back side panel 602.

At this time, because the contacts 124b and 125b of the LC resonance tag 100 are disposed on the corresponding points of the back side panel 602, the protruding contact 751 formed on the engaging face of the engaging section 740 enters either the recessed contact 124b or the recessed contact 125b and comes into contact therewith. The contact 752 enters the remaining contact and comes into contact therewith. As a result, the opened contacts 124b and 125b of the LC resonance tag 100 are connected to the contacts 751 and 752, which are formed on the engaging face of the engaging section 740, via the conductive plate 753. Thereby, the circuit of the LC resonance tag 100 is closed and functions as a resonance circuit. Therefore, completion of fastening can be confirmed by transmitting the transmission radio waves A having approximately the same frequency as the resonance frequency of the resonance circuit from the transmitter, and receiving the echo waves B reflected by the resonance circuit by the receiver.

Before completion of fastening, because the contacts 124a and 125a of the LC resonance tag 100 are open, the circuit of the LC resonance tag 100 is not a closed circuit. So long as the annular conductive pattern 720, forming a shortcircuit and being a short-circuit line, is not pressed onto the contacts 124a and 125a by the engaging sections 740 engaged on the panel 602, the contact 124b and the contact 751 or 752, and the contact 125b and the remaining contact cannot stably maintain states of contact with each other. For example, in the case where the turn clip 700 is inserted in the insert holes 603 and turned but the turning angle does not reach 90 degrees, the protrusions of the contacts 751 and 752 do not enter into the recesses of the contacts 124b and 125b to press them. Accordingly, because a contact state cannot be maintained stable, the circuit of the LC resonance tag 100 may or may not become a closed circuit. Even in the case where the transmission radio waves A are transmitted from the transmitter, the circuit may or may not function as a resonance circuit, whereby in some cases echo waves B are generated and in other cases they are interrupted. Thus, completion of fastening between the panels 601 and 602 cannot be confirmed, because the receiver does not receive the echo waves B continuously.

FIGS. 22 through 25 show still another embodiment in which the invention is applied to a 2-piece clip. The 2-piece clip 800 is composed of a pin member 810 and a grommet 840.

The pin member 810 is composed of: a flanged head section 811; a shaft section 812 whose cross section is cross-shaped and extends perpendicular from the center of a bottom surface of the head section 811; an annular first smaller-diameter section 813 formed in the middle section of the shaft section 812; a first larger-diameter section 814 whose diameter is tapered to expand from the first smaller-diameter section 812; a second smaller-diameter section 815 whose diameter is tapered to be reduced from the first larger-diameter section 814 toward a tip of the shaft section 812; a second larger-diameter section 816 adjacent to the second diameter-reduced section 815; and a tip section 817 which is tapered to the tip.

Ribs 818 are axially formed between the second smaller-diameter section 815 and the second larger-diameter section at radial intervals of about 90 degrees and divided into four segments.

Meanwhile, the grommet 840 forms an overall cylindrical shape together with a flange section 841. The grommet 840 has an elastic leg section 842 which is divided in quadrants by slits extending in the axial direction of the cylinder. The flange section 841 has a protruding section 843 on its outer circumference, and on the protruded section 843, three recessed sections 844 are formed along the circumferential direction. A hole in which the pin member 810 is inserted is formed at the center of the flange section 841. The hole is directly linked to the inner circumference of the elastic leg section 842.

Figure 22:
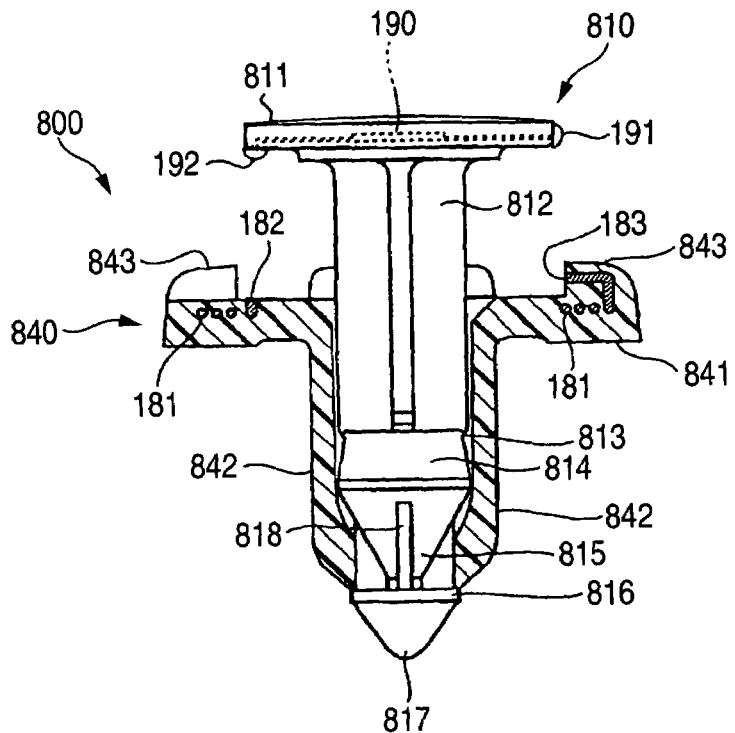

The bottom end of the elastic leg section 842 protrudes toward the center axis of the pin member 810. As shown in FIG. 22, in normal times, the elastic leg section 842 is fitted on the second diameter-reduced section 815 of the pin member 810 and the pin member is assembled to the grommet 840.

Figure 23:
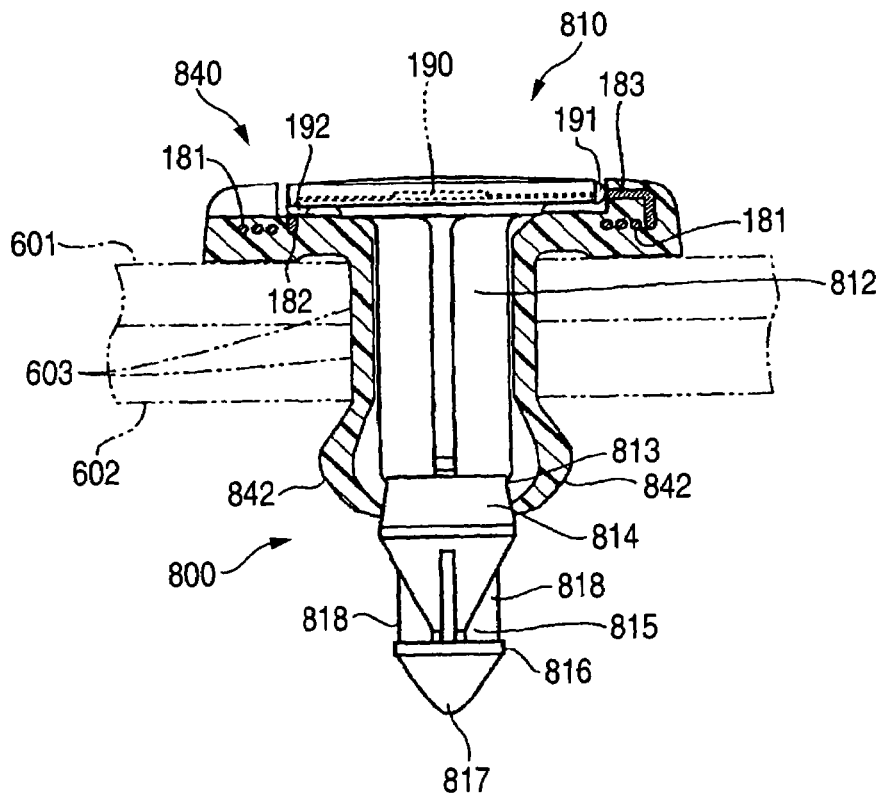
Figure 24:
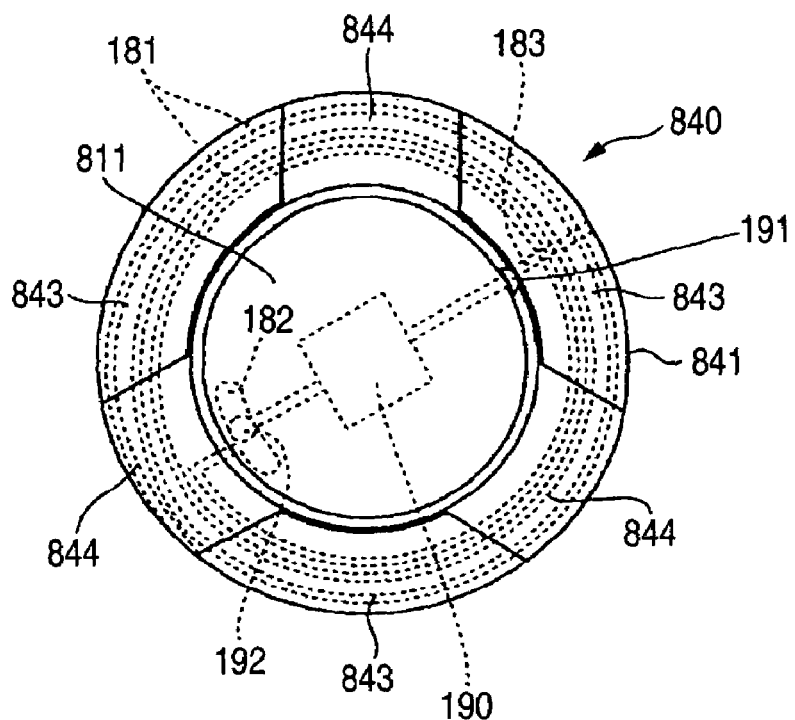
FIG. 24 is a plan view showing a grommet of a 2-piece clip of the embodiment where the invention is applied to a 2-piece clip.
Figure 25:
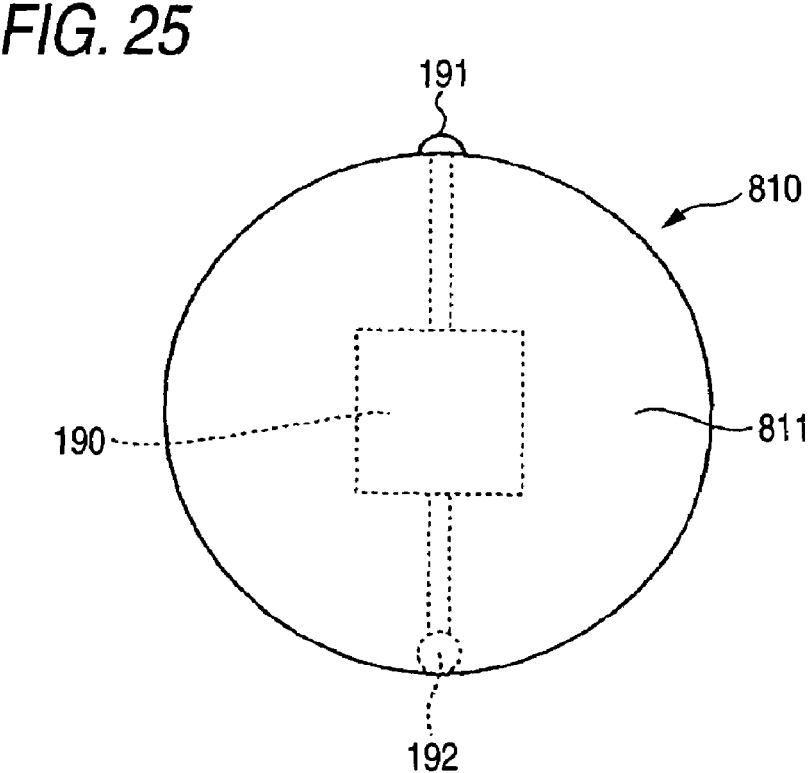
FIG. 25 is a plan view showing a pin member of a 2-piece clip of the embodiment where the invention is applied to a 2-piece clip.

Under the state where the pin member 812 is pressed into the grommet 840, as shown in FIG. 23, the bottom end portion, which protrudes toward the center axis of the elastic leg section 842 is moved to the first larger-diameter section 814 of the pin member 810, and presses the first larger-diameter section 814 with its diameter expanded. Thus, a component force in the axial direction is applied on the pin member 810, and the head section 811 of the pin member 810 is pressed by the flange section of the grommet 840.

The 2-piece clip 800 fastens the panels 601 and 602, for example, as follows: the panels 601 and 602 serving as members to be fastened are superposed; the insert holes 603 thereof are superposed thereon; as shown in FIG. 22, the 2-piece clip 800 is inserted into the insert holes 603 with the shaft section 812 being inserted in the elastic leg section 842; after the flange section 841 is brought into contact with the panel 601, the head section 811 of the pin member 810 is pressed in order to press the pin member into the grommet 840; and accordingly, the bottom end portion of the elastic leg section 842 is moved to the first larger-diameter section 814 of the pin member 810 as shown in FIG. 23. As a result, the elastic leg section 842, whose diameter is expanded, is engaged on the periphery of the insert hole 603 of the panel 602, and the pin member 810 and the elastic leg section 842 are prevented from slipping out of the insert holes 603 to thereby complete fastening of the panels 601 and 602.

When the grommet 840 of the pin member 810 is pressed and fastening is completed, a circuit in which a capacitor 190 and a coil 181 are disposed in series is closed, and functions as a resonance circuit.

That is, the coil 181 is buried on the flange section 841 of the grommet 840. One end of the coil 181 forms the top face of the flange section 841, and extends to an inner circumference of the protruding section 843, to thus form a contact 182. The other end of the coil 181 extends to an inner circumference of the protruding section 843, to thus form a contact 183.

The capacitor 190 is buried in the head section 811 of the pin member 810. One end of the circuit which is connected to the capacitor 190 extends to the outer circumference of the head section 811 and forms a contact 191. The other end of the circuit extends to the bottom face of the head 811 which faces the top face of the flange section 841.

In the case of a 2-piece clip which does not have the protruding section 843 on the flange section 841, completion of fastening of the panels 601 and 602 can be confirmed in the same manner as described above, so long as the 2-piece clip is constituted as follows. Namely, the contact 191 extends to the bottom face of the head 811, and the contact 183 extends to the top face of the flange section 841 so that the four contacts are disposed to connect the top face of the head section 811 and the top face of the flange section 841 with the capacitor 190 and the coil 181.

Alternatively, in the case of a 2-piece clip wherein the top face of the flange section 841 and the bottom face of the head section 811 are not in contact, completion of fastening of the panels 601 and 602 can be confirmed in the same manner as described above, so long as the 2-piece clip is constituted as follows. Namely, the contact 192 extends to the outer circumference of the head 811, and the contact 182 extends to the inner circumference of the flange section 841 so that the four contacts are disposed to connect the outer circumference of the head section 811 and the inner circumference of the flange section 841 with the capacitor 190 and the coil 181.

As described above, the present invention can be adapted to a wide variety of 2-piece clips.

Therefore, when the pin member 812 is pressed into the grommet 840 and fastening is completed, the contact 191 of the pin member 810 is brought into contact with the contact 183 of the grommet, and the contact 192 of the pin member 810 is brought into contact with the contact 182 of the grommet 840. Accordingly, the circuit in which the capacitor 190 and the coil 181 are disposed in series is closed, and functions as a resonance circuit.

Meanwhile, in the above embodiment, the ribs 818 are provided at angular intervals of 90 degrees on the shaft section 812 of the pin member 810. However, a match in the settings can be achieved inevitably, so long as the width of the ribs 818 and the elastic leg section 842 of the four-segmented grommet 840 have been varied in advance such that the contacts 191 and 192 of the pin member 810 face the contacts 182 and 183 of the grommet 840.

Therefore, completion of connection can be confirmed by transmitting the transmission radio waves A having approximately the same frequency as the resonance frequency of the resonance circuit from the transmitter, and receiving the echo waves B reflected by the resonance circuit with the receiver.

Before completion of fastening, the contact 182 which has continuity with one of the coils 181 and the contact 192 which has continuity with one of the capacitors 190 are open, and the contact 183 which has continuity with the other one of the coils 181 and the contact 191 which has continuity with the other one of the capacitors 190 are open. Therefore, the circuit is not a closed circuit.

Under the condition that the pin member 810 is not pressed into the grommet 840, the bottom end does not press the first larger-diameter section 814. Therefore, a component force of the axis direction is not generated, and the head section 811 of the pin member 810 is not pressed by the flange section 841 of the grommet 840. As a result, the contact 192 is not pressed by the contact 182, and the contact 191 is not pressed by the contact 183.

For example, under the condition that the bottom end of the elastic leg section 842 is fitted in the second smaller-diameter section 815 of the pin member 810, when the 2-piece clip is inserted into the insert holes 603 but the pin member 812 is not pressed into the grommet 840, the contacts 182 and 183 of the coil 181 and the contacts 191 and 192 of the capacitor 190 are held as being open. Accordingly, even in the case where the transmission radio waves A are transmitted from the transmitter, the circuit does not function as a resonance circuit, and the echo waves B are not generated. Because a receiver does not receive the echo waves B, completion of a fastening between the panels 601 and 602 cannot be confirmed.

Further, under the condition that the flange section 841 of the 2-piece clip 800 is not in contact with the panel 601, when the pin member 812 is pressed into the grommet 840, the elastic leg section 842 is interrupted by a face of the insert hole 603 and cannot expand in diameter. Accordingly, for the same reason as described above, the contacts 182 and 183 of the coil 181 and the contacts 191 and 192 of the capacitor 190 are held open, and even in the case where the transmission radio waves A are transmitted from a transmitter, the circuit does not function as a resonance circuit, and the echo waves B are not generated. Because the receiver does not receive the echo waves B, completion of a fastening between the panels 601 and 602 cannot be confirmed.

When the pin member 812 is pushed into the grommet 840 without inserting the two-piece clip 800 into the insertion hole 603, the lower ends of the elastic leg sections 842 move to the first larger-diameter section 814 of the pin member 812 and extend the first larger-diameter section 814. As a result, axial component force acts on the pin member 812. Hence, the contact 191 of the pin member 810 comes into contact with the contact 183 of the grommet 840, and the contact 192 of the pin member 810 also comes into contact with the contact 182 of the grommet 840. Consequently, the circuit in which the coil 181 and the capacitor 190 are disposed in series is closed to function as a resonance circuit. However, since the propagation range of the transmission radio waves A or the echo waves B is limited as described hitherto, so long as the turn clip is constituted so as not to be able to stay within the propagation range from the transmitter/receiver placed close to the insert holes, the transmitting radio waves A cannot reach the resonance circuit, and the receiver does not receive the echo waves B. Consequently, completion of a fastening between the panels 601 and 602 cannot be confirmed.

As described above, a wide variety of clips (hereinafter referred to as fasteners) can confirm fastening between the members to be fastened reliably, instantaneously in a non-contacting manner.

Especially in the case where interior or exterior components are fastened to a body panel of an automobile, they are usually fastened with a plurality of fasteners, and in many cases the fastening points are adjacent to each other.

In the case where a member to be fastened is fastened with a plurality of fasteners, completion of each fastening point can be confirmed, as described hitherto, by means of, for example, using different LC resonance tags 100 which differ in terms of size of the capacitor 126 or shape of the coil 121 on respective fasteners, members to be fastened, or fastening points; or using on the respective fastening points different fasteners which are formed on the capacitors 126 or the coils 121, and which differ in terms of size of the capacitor 126 or shape of the coil 121.

The above embodiments have been described with regard to examples using the LC resonance tag 100 which is composed so that when connectors or the like are adequately connected, a pair of contacts 124 and 125 are brought into conduction and form a closed circuit to function as a resonance circuit. However, as shown in FIGS. 2A to 2E, there may be applied the LC resonance tag 101, which is composed so that when connectors or the like are adequately connected, wherein a pair of contacts 15 and 18 are brought into conduction and both ends of the capacitor 126 are short-circuited so as to disable the LC resonance tag 191 to function as a resonance circuit.

Still another embodiment of the invention will be explained in reference to the drawings as follows.

Figure 26A:
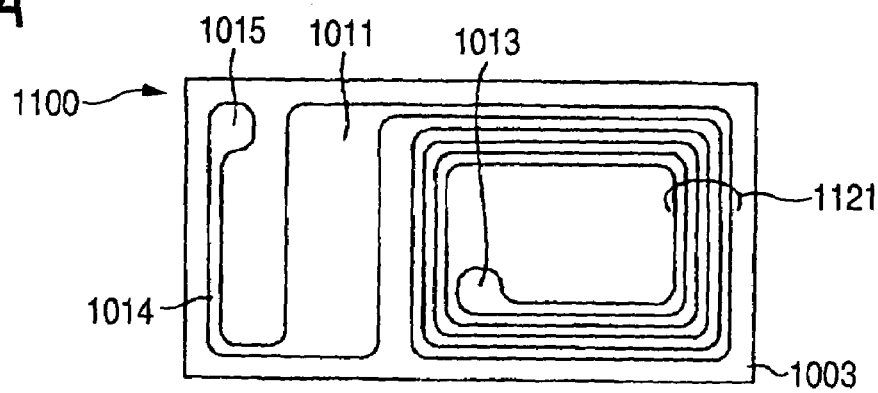
FIGS. 26A to 26E show examples of an LC resonance tag used in the invention.
Figure 26B:
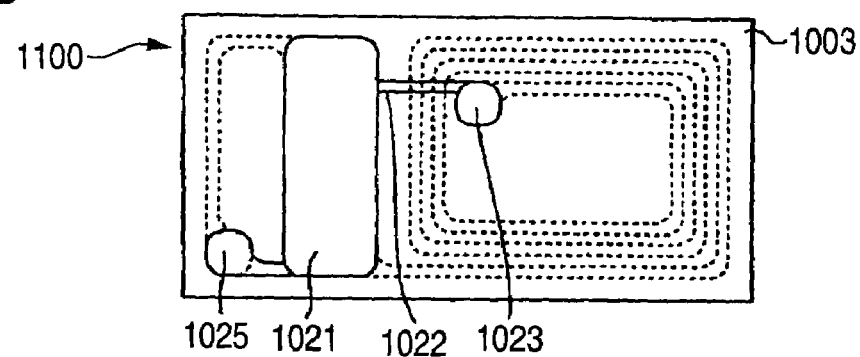
Figure 26C:
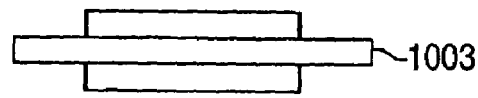
Figure 26D:
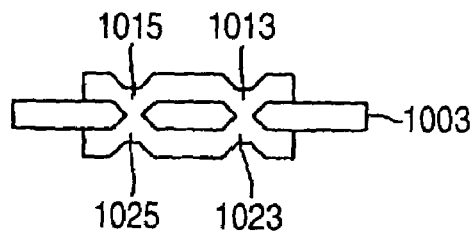
Figure 26E:
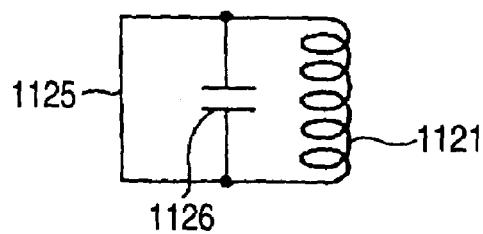

FIGS. 26A and 26B are schematic views of a surface and a rear face showing an example of an LC resonance tag used in the invention. FIGS. 26C and 26D are explanatory views showing a method of connecting patterns on the surface and the rear face in the LC resonance tag. FIG. 26E is an equivalent circuit diagram of the LC resonance tag.

An LC resonance tag 100 shown in FIGS. 26A to 26E are constituted by forming a conductive strip-like pattern of copper, aluminum or the like on an insulating sheet 1003 by, for example, means of adhering, vapor deposition and etching or the like. As shown by FIG. 26A, the conductive pattern includes a comparatively wide first plane portion 1011 for constituting a capacitor (conductance) 1126, a coil 1121 in a spiral shape by a slender wire drawn out from one end of the first plane portion 1011, a first conductive portion 1013 disposed at a front end of the capacitor 1121, a wiring 1014 drawn out from other end of the first plane portion 1011, and a first short circuit portion 1015 disposed at a front end of the wiring 1014.

Meanwhile, the rear face of the LC resonance tag 1100 is also formed with a conductive strip-like pattern of copper, aluminum or the like and as shown by FIG. 26B, the strip-like pattern includes a second plane portion 1021 having a shape substantially the same as that of the first plane portion 1011 and constituting the capacitor (conductance) 1126 along with the first plane portion, a second conductive portion 1023 connected to the conductive portion 1013 of the coil 1121, a connecting portion 1022 for linearly connecting the second plane portion 1021 and the second conductive portion 1023 by the shortest distance, and a second shortcircuit portion 1025 drawn out from the second plane portion 1021 and connected to the first shortcircuit portion 1015.

The insulating sheet 1003 adhered (welded) with the strip-like pattern is brought into a state shown in FIG. 26C and the insulating sheet 1003 is pinched by projected and recessed press contact (press) or the like. Then, as shown by FIG. 26D, the first conductive portion 1013 and the second conductive portion 1023 are conducted and the first shortcircuit portion 1015 and the second shortcircuit portion 25 are conducted. Therefore, as shown by FIG. 26E, the capacitor 1126 and the coil 1121 are connected in parallel with each other, further, a shortcircuiting circuit 1125 is connected in parallel with the capacitor 1126. By providing the shortcircuiting circuit 1125, the LC resonance tag 1100 is constituted not to function as a resonating circuit. Further, the LC resonance tag 1100 is made to function as the resonating circuit by cutting the shortcircuiting circuit in finishing to fasten to a fastening member of a clip or the like.

Figure 27A:
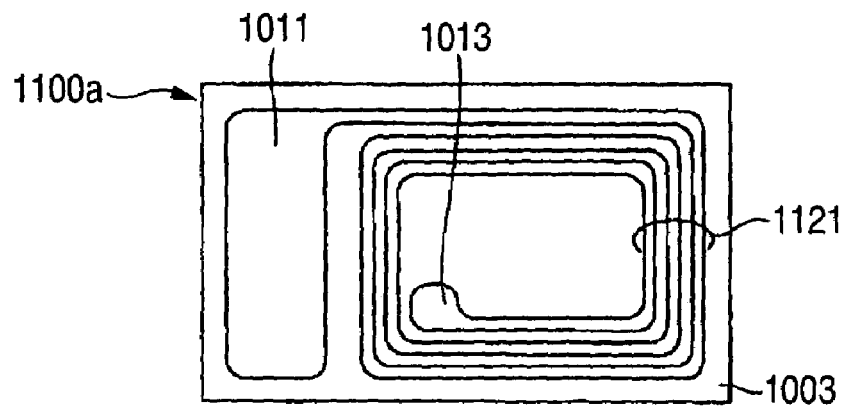
FIGS. 27A to 27C show examples of an LC resonance tag used in the invention.
Figure 27B:
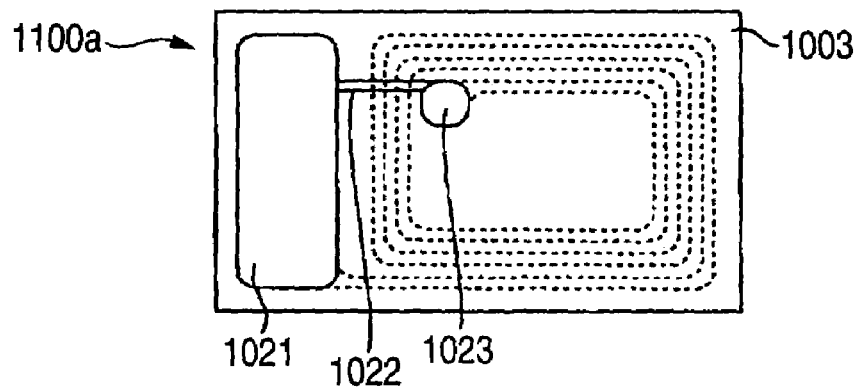
Figure 27C:
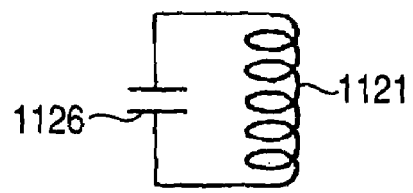

FIGS. 27A and 27B are schematic views of a surface and a rear face showing other example of an LC resonance tag used in the invention. FIG. 27C is an equivalent circuit diagram of the LC resonance tag.

An LC resonance tag 1100a shown in FIG. 2 is constituted by forming the conductive strip-like pattern of copper, aluminum or the like on the insulating sheet 1003. As shown by FIG. 27A, the strip-like pattern includes the comparatively wide first plane portion 1011 for constituting the capacitor (conductance) 1126, the coil 1121 in the spiral shape by the slender wire drawn out from the end portion of the first plane portion 1011, and the first conductive portion 1013 disposed at the front end of the coil 1121.

Meanwhile, the rear face of the LC resonance tag 1100a is also formed with the conductive strip-like pattern of copper, aluminum or the like and as shown by FIG. 27B, the strip-like pattern is constituted by a shape substantially the same as that of the first plane portion 1011 and includes the second plane portion 1021 constituting the capacitor (conductance) 1126 along with the first plane portion 1011, the second conductive portion 1023 connected to the conductive portion 1013 of the coil 1121 and the connecting portion 1022 linearly connecting to the second conductive portion 1023 and the second plane portion 1021 by the shortest distance.

As shown by FIG. 27C, the capacitor 1126 and the coil 1121 are connected in parallel with each other and the LC resonance tag 1100a is constituted to function as a resonating circuit.

According to the embodiment, as described later, simultaneously with connecting a connector or fastening a clip, for example, the connecting portion 1022 is cut, thereby, the LC resonance tag 1100 is constituted not to function as the resonating circuit.

Figure 28A:
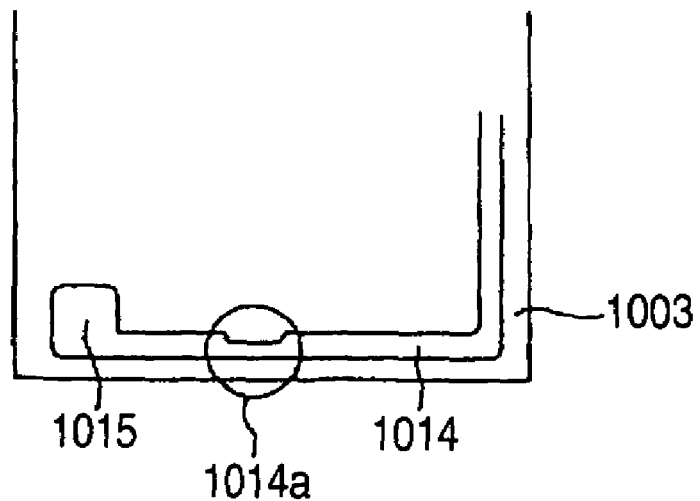
FIGS. 28A and 28B show an example of a structure for facilitating to cut a predetermined portion of a wiring of an LC resonance tag.
Figure 28B:
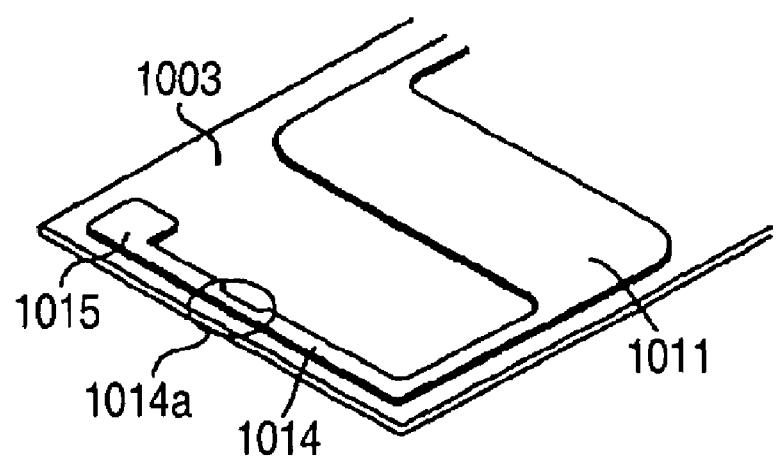

FIGS. 28A and 28B show an example of a structure for facilitating to cut the wirings of the LC resonance tags 1100 and 1100a shown in FIGS. 26A to 27C. According to the example, the wiring 1014 is provided with a slender portion 1014a for making a width of the wire smaller than that of other portion. As described later, the slender portion 1014a is a portion which is cut after finishing to fasten a clip or the like to a fastened member. By providing the slender portion by weakening the strength more than other portion of the wiring 1014 by reducing a width or thinning a thickness of the wiring 1014 in this way, stress on the wiring 1014 is concentrated on the slender portion 1014a and the wiring 1014 is made to be liable to cut.

Further, according to the LC resonance tag 1100 of FIGS. 26A to 26E, when the wiring 1014 is cut, the shortcircuiting circuit 1125 is cut, the LC resonance tag 1100 is made to function as the resonating circuit. Further, the LC resonance tag 1100a of FIG. 2 does not function as the resonating circuit when the wiring 1014 is cut since the LC resonance tag 1100 is cut at a portion of the resonating circuit.

Figure 29A:
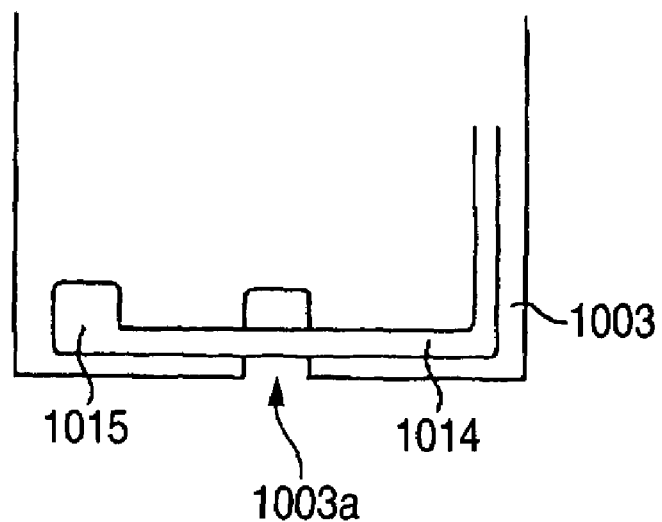
FIGS. 29A and 29B show other example of a structure for facilitating to cut a predetermined portion of a wiring of an LC resonance tag.
Figure 29B:
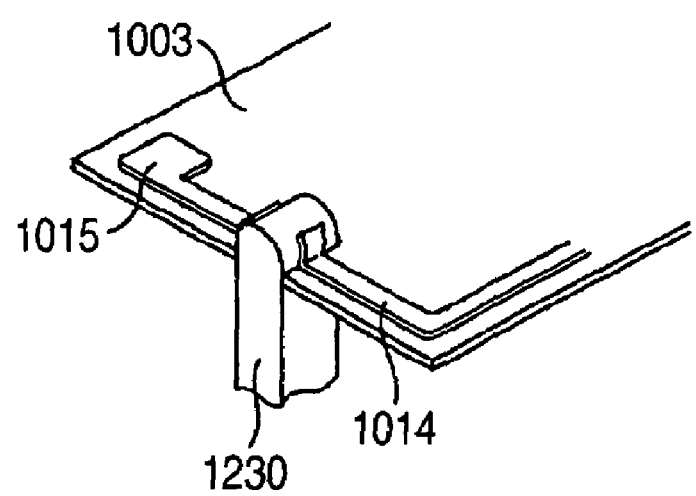

FIGS. 29A and 29B show other example of a structure for facilitating to cut the wiring of the LC resonance tag 1100 shown in FIGS. 1 and 2. As shown by FIG. 29A, according to the example, a notch 1003a is provided and the wiring 1014 is arranged to cross over the notch.

Further, as shown by FIG. 29B, when a projected portion 1230 is inserted into the notch 1003a, a front end of the projected portion 1230 is brought into direct contact with the wiring 1014 to elongate the wiring 1014 crossing over the notch 1003a in an inserting direction. The elongated wiring 1014 includes the conductive member of copper, aluminum or the like. When such a material undergoes a strain exceeding a breaking point in a stress strain diagram, the material is broken and therefore, the wiring 1014 elongated by the projected portion is also broken to cut. Both ends of the cut wiring are divided by the projected portion 1230, and by constituting the projected portion 1230 by an insulating material, the wiring 1014 is electrically cut completely. When the wiring 1014 is elongated by the projected portion 1230, since the wiring 1014 constituting a portion of the strip-like pattern is adhered (welded) to the insulating sheet 1003, the wiring 1014 is not exfoliated from the insulating sheet 1003 and only a portion thereof crossing over the notch 1003a is elongated to break.

When the notch 1003a is not assumedly provided, the wiring 1014 is difficult to break unless an amount of pressing the projected portion 1230 is increased. In comparison with the conductive member of copper, aluminum or the like, in the case of an insulating sheet including a resin having a flexibility, an amount of strain until breakage is large and therefore, even when the wiring 1014 is pressed by the front end of the projected portion 1230 in a direction orthogonal to the wiring 1014, the insulating sheet 1003 is also elongated along with the wiring 1014.

Although when the projected portion 1230 is deeply pressed, the wiring 1014 is broken prior to the insulating sheet even when the notch 3a is not provided, since the wiring 1014 is adhered (welded) to the insulating sheet 1003, there can be a case in which both ends of the broken breaking portion is not completely cut electrically by being separated from each other.

Therefore, by providing the notch 1003a, even when an amount of inserting (amount of pressing) the projected portion 1230 is reduced, the wiring 1014 can further firmly be cut electrically and therefore, a mechanism of cutting the wiring 1014 can be integrated to a small part of a fastening piece or a connecting piece.

Further, when the front end of the projected portion 1230 is sharpened, the wiring 1014 and the insulating sheet 1003 can be cut before being elongated and therefore, it is facilitated to electrically cut the wiring 1014.

Figure 30A:
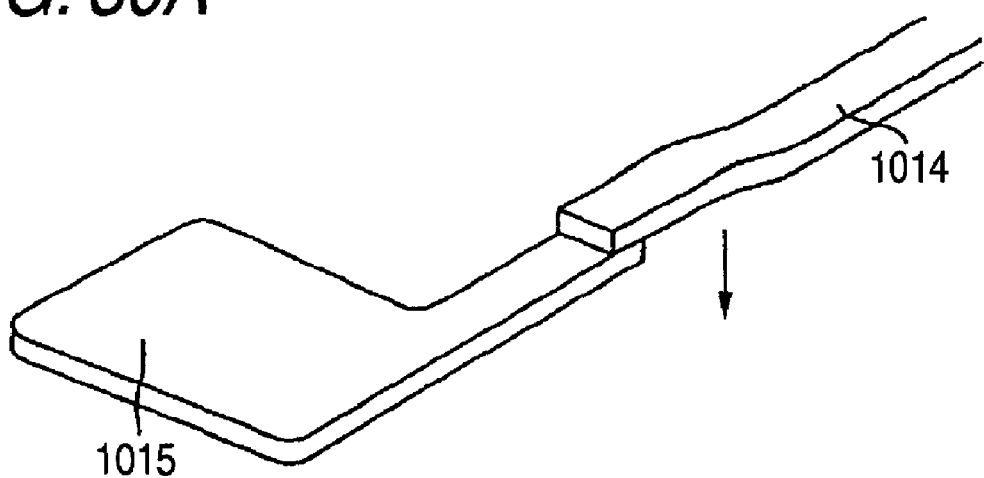
FIGS. 30A and 30B show an example of switching presence or absence of electric connection of a wiring instead of cutting the wiring of an LC resonance tag.
Figure 30B:
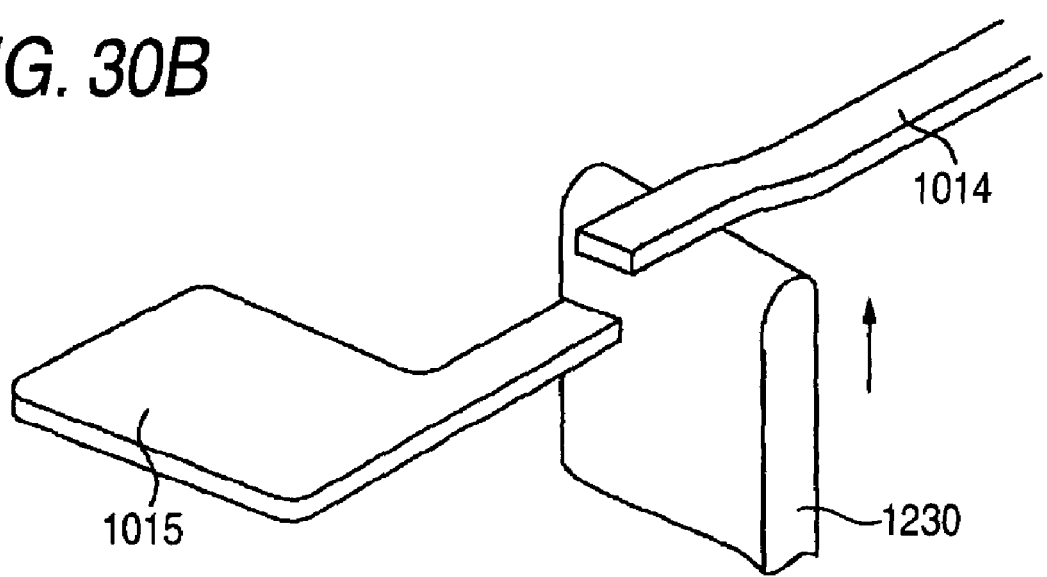

FIGS. 30A and 30B show an example in which presence or absence of electric connection of the wiring 1014 can be switched instead of cutting the wiring 1014. As shown by FIG. 30A, according to the example, the wiring 1014 and the shortcircuit portion 1015 are separately formed and arranged such that end portions thereof overlap each other. When an explanation is given of the operation with regard to the LC resonance tag 1100 of FIGS. 26A to 26E, in the above-described state, since the shortcircuiting circuit 1125 is formed, the LC resonance tag 1100 does not function as the resonating circuit. Further, by pushing up the wiring 1014 by the projected portion 1230 to release contact between the wiring 1014 and the shortcircuiting portion 1015, the shortcircuiting circuit 1125 is cut and the LC resonance tag 1100 functions as the resonating circuit. Such an LC resonance tag 1100 can be used repeatedly by a number of times and therefore, the LC resonance tag 1100 can preferably be used for a clip or the like which is inserted and drawn for a number of times. Here, the projected portion 1230 naturally includes an insulating member.

Figure 31:
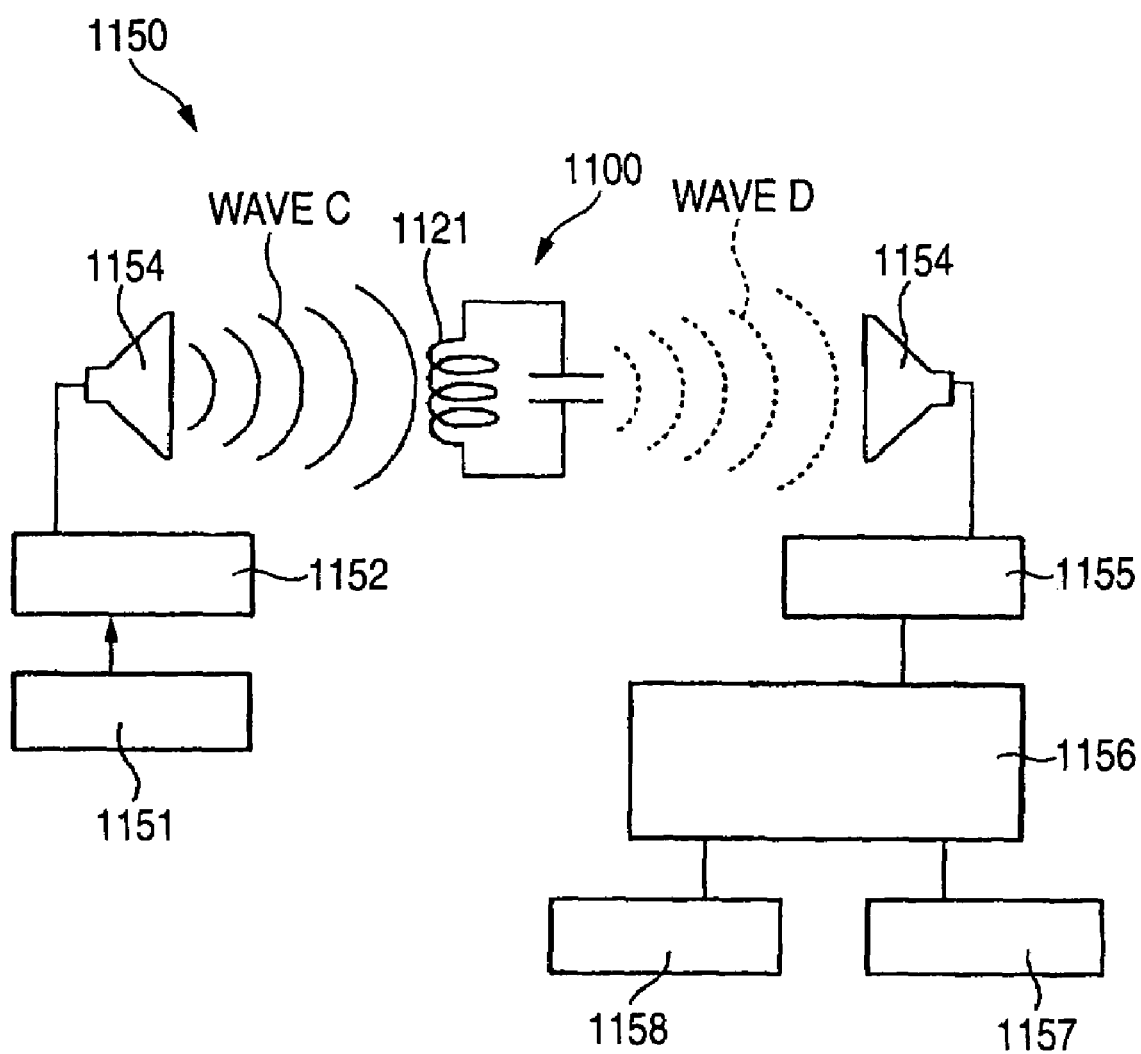
FIG. 31 is an explanatory view showing an example of a detecting apparatus for detecting whether an LC resonance tag functions as a resonating circuit.

FIG. 31 shows an example of a detecting apparatus 1150 for detecting whether the above-described LC resonance tags 1100 and 1100a function as the resonating circuits. For example, when transmitting radio waves C having a predetermined frequency is transmitted, there is generated an echo waves D an amplitude of which is increased by resonating with the transmitting radio waves C. Here, the predetermined frequency is a frequency of resonating the circuit of the LC resonance tag 1100 and a frequency determined by a capacitance of the capacitor 1126 and a shape of the coil 1121.

Therefore, by detecting presence or absence of generation of the echo waves D, it can be determined whether the circuit of the LC resonance tag 1100 functions as the resonating circuit, that is, whether the circuit of the LC resonance tag 1100 constitutes the closed circuit.

That is, the detecting apparatus 1150 is provided with a transmission controller 1151 and a transmission amplifier 1152 and includes a transmitting antenna 1153 for transmitting the radio wave having the predetermined frequency thereby. Further, the detecting apparatus 1150 is provided with a receiving antenna 1154, a reception amplifier 1155, and a data processor 1156 and the data processor 1156 is connected to storing means 1157 and display alarming means 1158.

Further, in the above-described, the transmission controller 1151, the transmission amplifier 1152 and the transmitting antenna 1153 constitute a transmitter and the receiving antenna 1154 and the reception amplifier 1155 constitute a receiver. However, the transmitting antenna 1153 and the receiving antenna 1154 as well as the transmitter and the receiver can commonly be used also as a transmitting and a receiving antenna and a transceiver.

In using the detecting apparatus 1150, in order to confirm fastening of a clip which is a fastening piece or connection of a connector which is a connecting piece, the transmitting antenna 1153 of the detecting apparatus 1150 is made to be proximate to the LC resonance tag 1100 pasted thereon.

When transmission radio waves C having approximately the same frequency as the resonance frequency of the LC resonance tag 1100 are transmitted from the transmitting antenna 1153 by way of the transmitting controller 1151 and the transmitting amplifier 1152, the LC resonance tag 1100 resonates and generates echo waves D. The echo waves D are received by the receiving antenna 1154, and are transmitted to the data processor 1156 via the receiving amplifier 1155.

The transmission radio waves C and the echo waves D can be distinguished because the echo waves D, which are generated due to resonance, have a higher amplitude and a higher level than the transmission radio waves C.

The data processor 1156 compares the thus-transmitted echo waves D with the receiving level at a specified frequency stored in the data storage means 1157. In the case where the receiving level is drastically higher, the circuit of the LC resonance tag 1100 is confirmed to be closed and functioning as a resonance circuit. When the circuit of the LC resonance tag 1100 is thus confirmed to be functioning as a resonance circuit, the alert display apparatus 1158 displays a message to this effect or issues a notice to this effect. Therefore, an operator can be informed instantaneously of whether or not fastening of a fastener or connection of a connecting tool on which the LC resonance tag 1100 is attached has been completed.

Since the propagation range of the transmission radio waves C or the echo waves D is limited, the transmitting antenna 1153 and the receiving antenna 1154, or a detecting apparatus 1150 in which these antennas are integrated, must be placed near the LC resonance tag 1100 so as to fall within the propagation range.

Meanwhile, even in the case where a plurality of resonance tags 1100 functioning as resonance circuits upon completion of fastening or connection are provided, when the plurality of resonance tags fall outside the propagation range of the transmission radio waves C or the echo waves D, completion of fastening or connection of plurality of points can be confirmed in turns by bringing the antenna or the detection apparatus near their respective LC resonance tag 1100.

FIGS. 7 through 9 are constitution views of a fuel connector 1200 with a retainer which is a connector including a check function. The fuel connector 1200 shown in FIG. 32 connects a tube 1210 (refer to FIG. 34) to be connected and a hose, a tube or the like, not illustrated, previously connected to the connector 1200.

The fuel connector 1200 with a retainer is provided with a housing 1220, a retainer 1260 capable of being inserted to the housing 1220 under a condition of precisely inserting the tube 1210 into the housing 1220, and a stopper 1240 previously arranged at inside of the housing 1220 for hampering the retainer 1260 from being inserted into the housing 1220 until the tube 1210 is precisely inserted into the housing 1220. Further, the retainer 1260 is pasted with the LC resonance tag 1100 including the coil 1121, the shortcircuiting circuit 1125, the capacitor 1126 and the like as mentioned later in reference to FIGS. 35A to 35C.

The housing 1220 is provided with a through hole for passing a fuel in an axial direction. Further, the housing 1220 includes a nipple 1221 connected with a hose, a tube or the like, not illustrated, by being outwardly inserted thereto at one end thereof and other end constitutes an opening portion 1222 for inserting an end portion the tube 1210. Two side walls of the housing 1220 are formed with side wall openings 1224 fitted with projected pieces 1241, mentioned later, of the stopper 1240.

A position of the side wall opening 1224 contiguous in a direction of the nipple 1221 is formed with a projection 1220*a* brought into contact with a front end of the projected piece 1241 provided at the stopper 1240 and when the tube 1210 is completely inserted into the housing 1220, the projected piece 1241 rides over the projection 1220*a* to be locked and therefore, the stopper 1240 is positioned to be able to insert the retainer 1260. Meanwhile, so far as the tube 1210 is not completely inserted into the housing 1220, the retainer 1260 is made to be unable to insert into the housing 1220.

Further, a ceiling wall of the housing 1220 is formed with a ceiling wall opening 1225 and a projected portion 1230. The ceiling wall opening 1225 is a destination of inserting two lock pieces 1261 extended to a center of an inner periphery of the ceiling wall of the retainer 1260 and the projected portion 1230 is projected from an opening hole 1263 formed at an upper face of the retainer 1260 when the retainer 1260 is inserted to the housing 1220.

The stopper 1420 has an annular section 1242 which is inserted in the housing 1220. Engaging pieces 1243 which elastically engage with the annular protrusion 1211 of the pipe 1210, and the pair of protruded pieces 1241 which are fitted on both of the side wall openings 1224 of the housing 1220 extend from the annular section 1242 toward an opening 1222 of the housing 1220.

The pair of projected pieces 1241 are constituted to be able to fit to the side wall openings 1224 of the housing 1220 by being extended in an axial direction by a predetermined distance, thereafter expanded skewedly to the two side walls of the housing 1220 and folding back front ends thereof rearwardly. An end portion of the projected piece 1241 is formed with a projection 1244 projected in an outer diameter direction, the projection 1244 is engaged with a stepped portion, not illustrated, formed at an inner wall face of the retainer 1260 at an initial position before inserting the tube 1210 to hamper the retainer 1260 from being inserted. When the tube 1210 is completely inserted, the stopper 1240 is moved to a depth side of the housing 1220 by a mode, mentioned later, and therefore, engagement of the projection 1244 and the retainer 1260 is disengaged to constitute to be able to insert the retainer 1260.

When the retainer 1260 is inserted to housing 1220 after releasing the retainer 1260 from being hampered to insert thereto by the stopper 1240, the lock piece 1261 is fitted to the tube 1210 to be engaged with a ring-like projected portion 1211 to thereby stop the tube 1210 from being drawn and the tube 1210 is connected to the fuel connector 1200 with the retainer.

Figure 32:
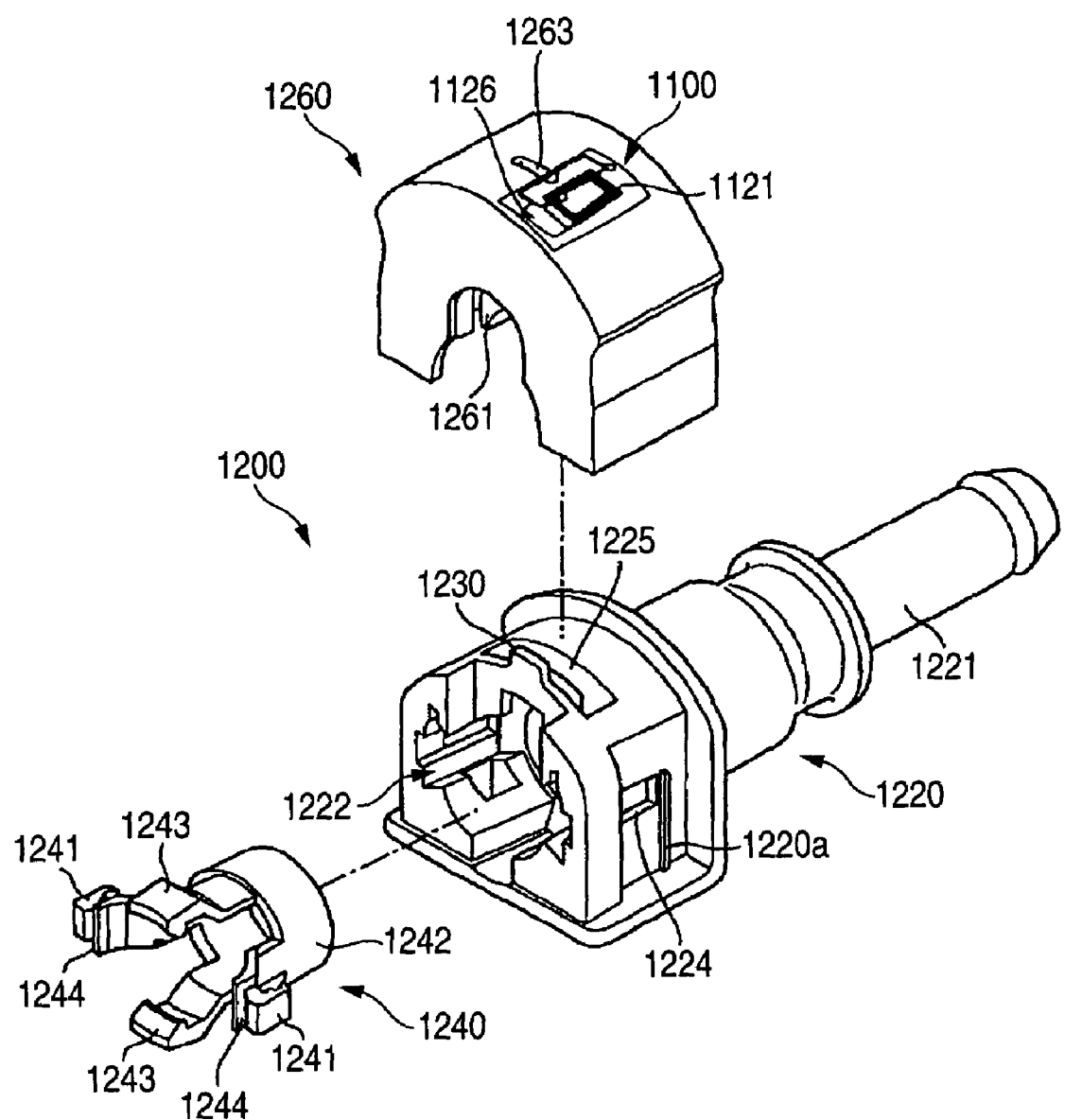
FIG. 32 is a disassembled perspective view showing an example of applying the invention to a connector for a fuel vapor pipe with a retainer.
Figure 33:
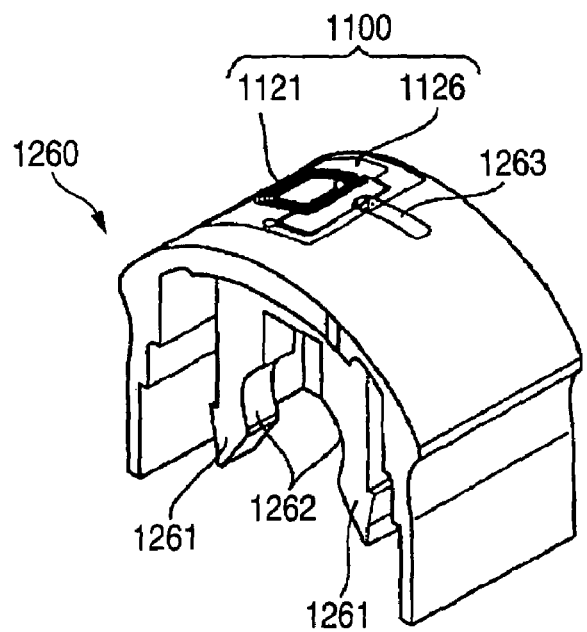
FIG. 33 is a perspective view showing the retainer of the connector by viewing from a rear face side.

FIG. 33 is a perspective view of the retainer 1260 shown in FIG. 32 from a rear face direction thereof. The above-described lock pieces 1261 are extended in a plate-like shape by being slightly remote from the two side walls of the retainer 1260 and lower edge portion thereof are formed with tube contact faces 1262 notched in a circular arc shape. The tube contact face 1262 constitutes a portion of an inner diameter adapted to an outer periphery of the tube 1210.

Figure 34:
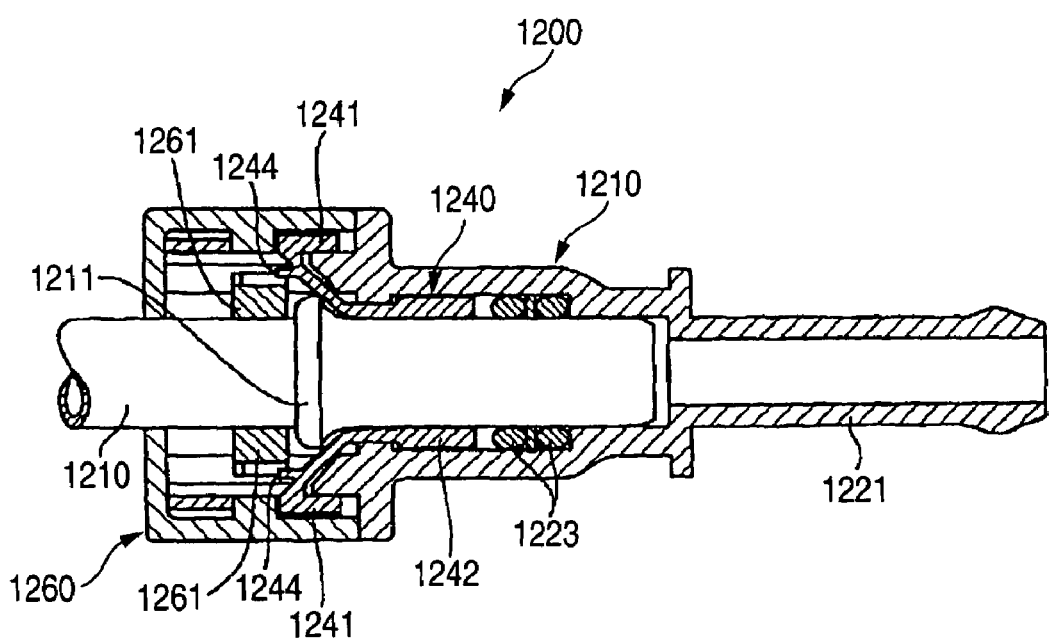
FIG. 34 is a sectional view of the connector.

FIG. 34 is a sectional view in a state of inserting the tube 1210 into the fuel connector 1200 with the retainer shown in FIG. 32. The tube 1210 includes the ring-like projected portion 1211 elastically engaged with an engaging piece 1243 of the stopper 1240 at an outer periphery of an end portion thereof. An inner periphery of the housing 1220 is arranged with, for example, two pieces of seal rings 1223 for receiving the tube 1210.

When the tube 1210 is inserted into the housing 1220, the ring-like projected portion 1211 of the tube 1210 is engaged with the engaging piece 1243 and the stopper 1240 is slid in the axial direction in accordance with movement of the tube 1210. When the tube 1210 is completely inserted, engagement of the projection 1244 of the stopper 1240 and the inner wall of the retainer 1260 is disengaged to thereby enable to insert the retainer 1260. That is, the stopper 1240 serves to hamper the retainer 1260 from being inserted until the tube 1210 is completely inserted into the housing 1220.

Further, when the end portion of the tube 1210 is inserted into the housing 1220 and the retainer 1260 is inserted into the housing 1220, by fitting the left and right side contact faces 1262 of the lock pieces 1261 of the outer periphery of the tube 1210 to engage with the ring-like projected portion 1211, the tube 1210 is stopped from being drawn to finish connection.

Figure 35A:
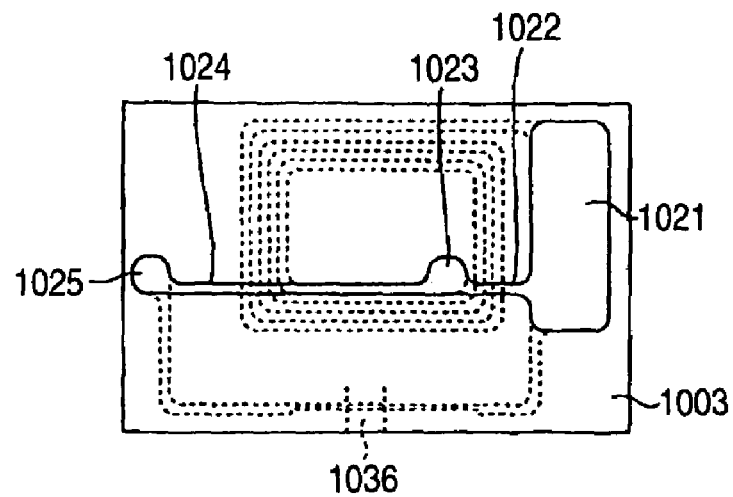
FIGS. 35A to 35C show an LC resonance tag applied to the connector.
Figure 35B:
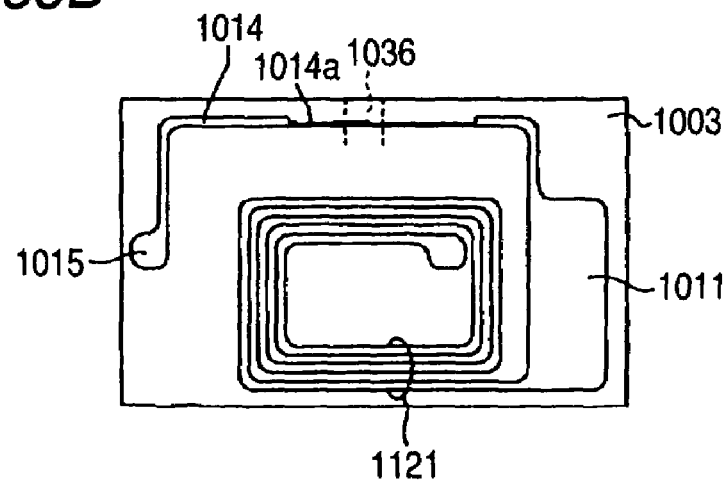
Figure 35C:
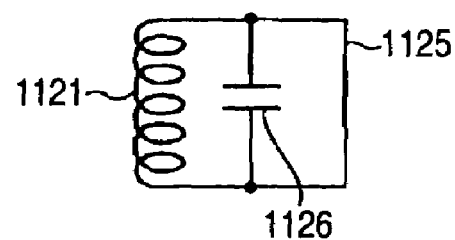

FIGS. 35A to 35C show the constitution of the LC resonance tag 1100 shown in FIG. 32 and the like. According to the LC resonance tag 1100, a position of leading the wiring 1014 is changed, the slender portion 1014*a* is provided at the wiring 1014, further, and a breaking portion 1003*b* for urging to cut the wiring 1014 is provided at the insulating sheet 1003. When the retainer 1260 is inserted into the housing 1220 after finishing to insert the tube 1210 to the housing 1220, the shortcircuiting circuit 1125 is cut by cutting the wiring 1014 by the projected portion 1230 of the housing 1220. Therefore, the LC resonance tag 1100 functions as the resonating circuit.

Therefore, when the detecting apparatus 1150 shown in FIG. 31 is used, it can be detected whether the tube 1210 is connected to inside of the housing 1220. That is, in the case in which when the transmitting radio waves C having a frequency substantially the same as a resonating frequency of the resonating circuit is transmitted from the transmitter, the echo wave reflected by the resonating circuit can be received by the receiver, the tube 1210 is connected to inside of the housing 1220.

On the other hand, in the case in which when the transmitting radio wave C having the frequency substantially the same as the resonating frequency of the resonating circuit is transmitted from the transmitter, the echo waves D cannot be received by the receiver, the wiring 1014 is not cut by the projected portion 1230 of the housing 1220 by inserting the retainer 1260, that is, the tube 1210 is not connected to inside of the housing 1220.

Figure 36:
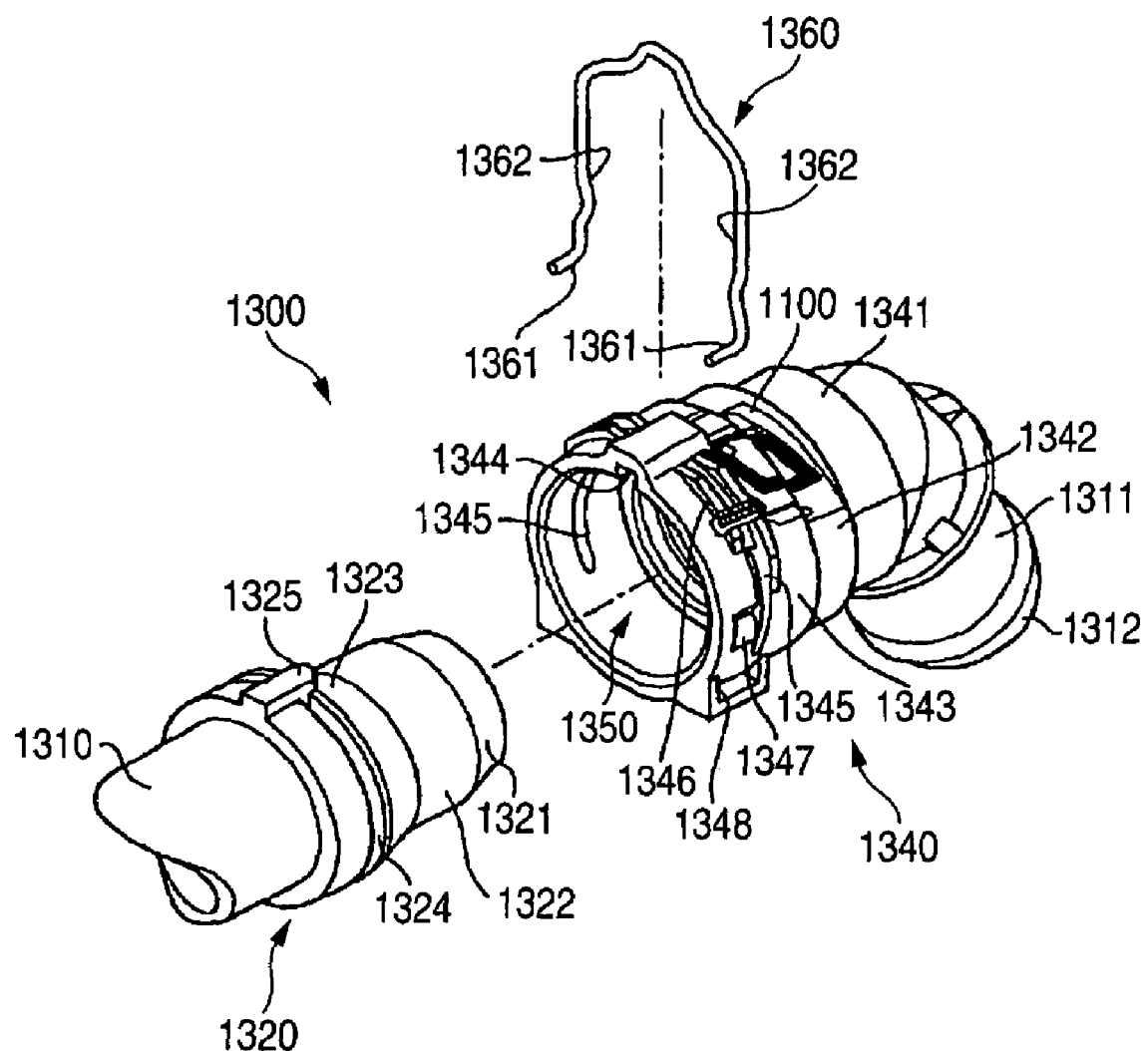
FIG. 36 is a disassembled perspective view showing still other embodiment of applying the invention to a three pieces piping connector.
Figure 37:
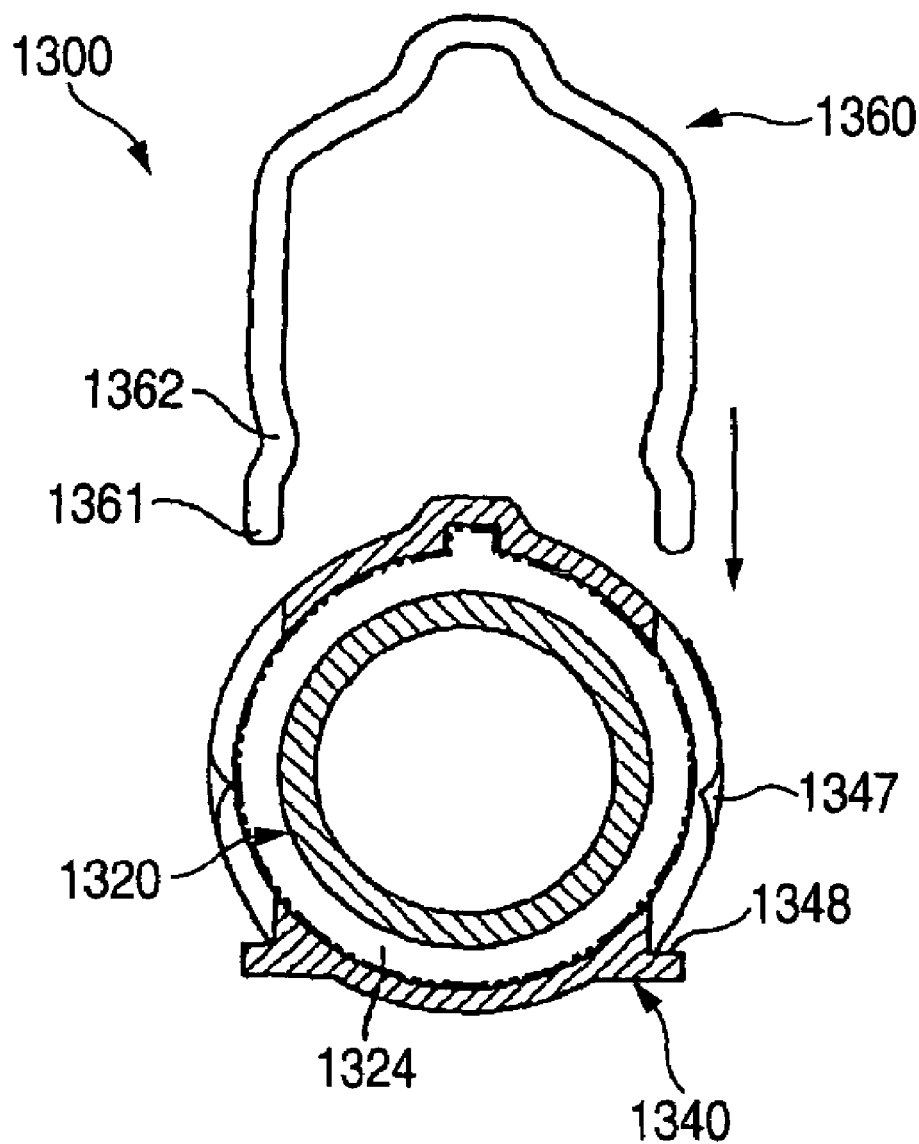
FIG. 37 is a sectional view showing a stopper of the connector and an inserting portion thereof.

FIGS. 36 and 37 show still another embodiment in which the invention is applied to a 3-piece pipe connector.

The 3-piece pipe connector 300 includes an insertion section 1320 disposed on an end of a pipe 1310 and made of an insulating member; a socket 1340 disposed on an end of a pipe 1311 and made of an insulating member; and a stopper 1360 to be fitted on the socket 1340 and formed from a bent wire made of a conductive metal.

The insertion section 1320 takes a form starting from a tapered tip section 1321, through a straight section 1322 and ending at a wider-diameter tapered section 1323. The insertion section 1320 has a structure, in which an annular groove 1324 and a positioning protrusion 1325 are formed on the outer circumference of the top of the wider-diameter tapered taper section 1323; and in which a through hole is formed along the axis.

The socket 1320 is connected to the pipe 1311 at a predetermined angle of approximately 60 degrees in the case of the embodiment and has a through hole extending along the axis. In the embodiment, the end portion of the pipe 1311 forms an insert hole 1312 which is tapered to the tip so that an unillustrated hose, tube, or the like can be easily inserted.

The socket 1340 has a shape with a diameter expanding stepwise, including: a first larger-diameter section 1341 whose diameter is slightly larger than that of the insert hole 1312; a second larger-diameter section 1342 whose diameter is slightly larger than that of the first larger-diameter section 1341; and a third larger-diameter section 1343 whose diameter is still larger than that of the second larger-diameter section 1342. The opposite end portion of the socket 1340 against the pipe 1311 forms an insert hole 1350 for receiving the insertion section 1320.

The tapered tip section 1321 of the inserting section 1320 is to be inserted in the inner circumference of the first larger-diameter section 1341. On the inner circumference of the second larger-diameter section 1342, an unillustrated O-ring is disposed, and the straight section 1322 of the insertion section 1320 is inserted therein.

In the inner circumference of the third larger-diameter section 1343, the wider-diameter taper section 1323 of the insertion section 1320 and the annular groove 1324 are inserted. The stopper 1360 is fitted on the annular groove 1324 so as to prevent slip-off. On the third larger-diameter section 1343 of the socket 1340, there is formed a guide groove 1344 in which the positioning protrusion 1325 for the inserting section 1320 is to be inserted.

On the third larger-diameter section 1343 of the socket 1340, there is formed a notched groove 1345 in which the stopper 1360 is to be inserted. The notched groove 1345 is formed in a shape of a slit so as to pass through the socket 1340 along the opposing section in the circumferential direction of the third larger-diameter section 1343.

On the upper half section of the notched groove 1345 on the outer circumference of the third larger-diameter section 1343, a rib 1346 protruding from the opposing edge of the notched groove 1345 is formed so as to hold the stopper 1360 securely therebetween. On the middle section of the notched groove 1345 on the third larger-diameter section 1343 outer circumference, at the end side of the socket 1320, there is formed a recessed section 1347 whose radial cross section is V-shaped. On the bottom end of the notched groove 1345 on the outer circumference of the third larger-diameter section 1343, there is formed a receiving recess 1348 which is surrounded by a U-shaped wall for containing an end portion of the stopper 1360.

Further, as described later in reference to FIG. 38A to 38C, the LC resonance tag 1100 including the coil 1121, the shortcircuiting circuit 1125, the capacitor 1126 and the like is pasted over the second enlarged diameter portion 1342, the third enlarged diameter portion 1343 and the rib 1346.

The stopper 1360 is composed of a wire and the like which is bent in an overall arch-shape. On respective end of the stopper 1360, there are formed bent-forward sections 1361 which are bent toward the axial direction of the socket 1320 or at approximately 90 degrees to the insert hole. Further, at the respective sections which are slightly closer to the base from the bent-forward sections 1361, there are formed bent-inward sections 1362 which bend toward the inside in an arc shape.

When the stopper 1360 is fitted on the socket 1340, the stopper 1360 is put over the socket 1340 from above while being inserted into the notched groove 1345 with both ends of the stopper 1360 widened. Then, the bent-forward sections 1361 of the stopper are fitted in the V-shaped recessed 1347 on the outer circumference of the socket 1340 and held. When the stopper is pushed further down from the above state, both ends of the stopper 1360 are slid while being widened again, and the bent-forward sections 1361 are fitted in the receiving recesses 1348.

At this time, as shown in FIG. 36, both ends of the stopper 1360, which are inserted into the notched grooves of the socket 1340, pass across the circumference of the notched groove 1345 in the manner of a string so that parts of the ends protrude inward from the inner circumference of the notched groove 1345; particularly, the bent-inward sections 1362 protrude inward to a large extent.

Figure 38A:
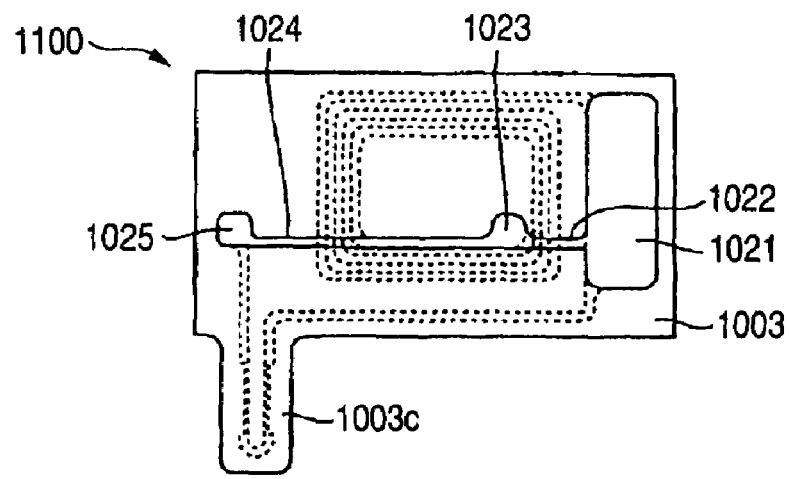
FIG. 38A to 38C show an LC resonance tag applied to the connector.
Figure 38B:
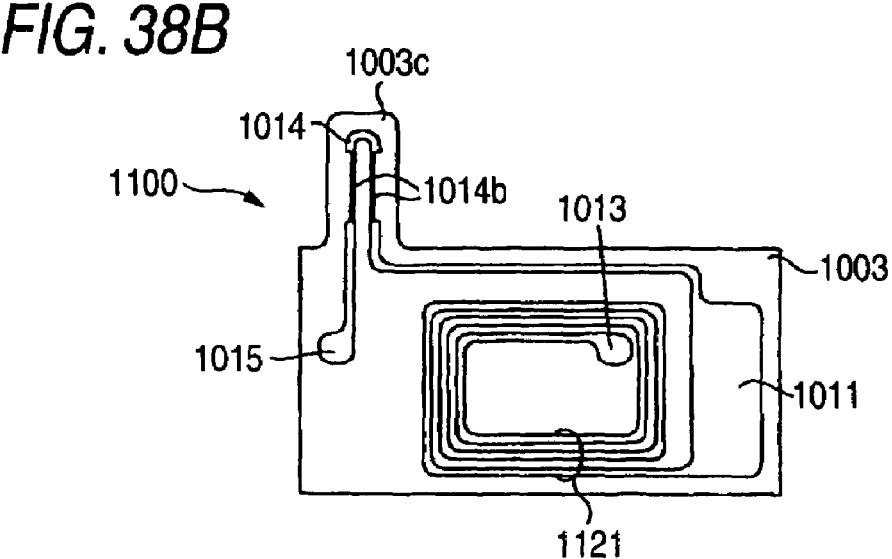
Figure 38C:
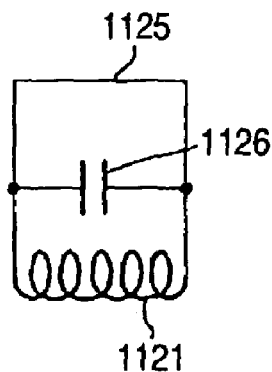

FIGS. 38A and 38B are schematic views of respectives of a surface and a rear face of the LC resonance tag 1100 shown in FIG. 11 and FIG. 38C is an equivalent circuit diagram of the LC resonance tag 1100. In FIG. 38A to 38C, portions similar to portions shown in FIGS. 27A to 27C or the like are attached with the same notations.

The LC resonance tag 1100 shown in FIG. 38A to 38C is provided with the insulating sheet 1003 having a projected portion 1003c. At the projected portion 1003c, the wiring 1014 is made to crawl in a U-like shape and the slender portion 1014b is constituted by a portion of the wiring 1014 to be cut by the stopper 1360. Further, as shown by FIG. 36, the LC resonance tag 1100 is pasted such that the projected portion is disposed on the rib 1346 and a main body of the insulating sheet 1003 is disposed at the second enlarged diameter portion 1342 and the third enlarged diameter portion 1343.

When the tubes 1310 and the 1311 are connected, the inserting portion 1320 of the tube 1310 is inserted to the socket 1340 of the tube 1311 fitted with the stopper 1360 while matching the positioning projection 1325 to the guide groove 1344. The stopper 1360 is projected from the notched groove 1345 to an inner side and while the portion is being pressed to widen by being brought into contact with the enlarged diameter taper portion 1323 of the inserting portion 1320, the inserting portion 1320 is inserted. Further, both end portions of the stopper 1360 are fitted to the ring-like groove portion 1324 of the inserting portion 1320 to finish to connect the tube 1310 and the tube 1311.

When the connection has been finished, the stopper 1360, the projected portion 1003c and the slender portion 1014b disposed on the rib 1346 are cut, the shortcircuiting circuit 1125 is cut, and the circuit of the LC resonance tag 1100 becomes the close circuit to function as the resonating circuit. Here, when the transmitting radio waves C having the frequency substantially the same as the resonance frequency of the resonating circuit is transmitted from the transmitter, the echo waves D reflected by the resonating circuit can be received by the receiver.

Meanwhile, before finishing connection, the projected portion 1003c and the slender portion 1014b disposed on the rib 1346 are not cut and therefore, the shortcircuiting circuit 1125 stays to be formed, and also the circuit of the LC resonance tag 1100 does not become the close circuit. That is, so far as the tube 1310 is not completely inserted into the socket 1340 of the tube 1311, the stopper 1360 cannot be inserted into the ring-like groove portion 1324 and the projected portion 1003c and the slender portion 1014b are not cut. In this case, even when the transmitting radio waves C is transmitted from the transmitter, the echo waves D is not generated since the LC resonance tag 1100 does not function as the resonating circuit and the echo waves D is not received by the receiver. Therefore, by presence or absence of reception of the echo waves D, it can be confirmed whether the connection of the three pieces piping connector 1300 have been finished.

The three pieces piping connector 1300 according to the embodiment is for connecting a cooling water pipe of an automobile and therefore, the three pieces piping connector 1300 is not limited to a connection use constituting a connected member by hoses or tubes mounted to the tube 1310 and the tube 1311.

When a hose or a tube is mounted to an end portion of the inserting portion 1320 by forming a nipple in place of the tube 1310 and the inserting portion 1320 and the socket 1340 are connected, the three pieces piping connector 1300 can be used also for connecting hoses or tubes.

Further, by forming either of the inserting portion 1320 and the socket 1340 integrally with an apparatus used for cooling or a member of a radiator or the like, or attaching either thereof thereto, the three pieces piping connector 1300 can be used for connecting the apparatus used for cooling or the member of the radiator or the like with a pipe or a hose or a tube.

Even in the case of connecting any connected member, similar to the above-described, it can naturally be confirmed firmly, instantly, simply and in noncontact to finish to connect respective connected members.

FIGS. 39A to 39D show still other embodiment in which the invention is applied to a piping connector.

Figure 39A:
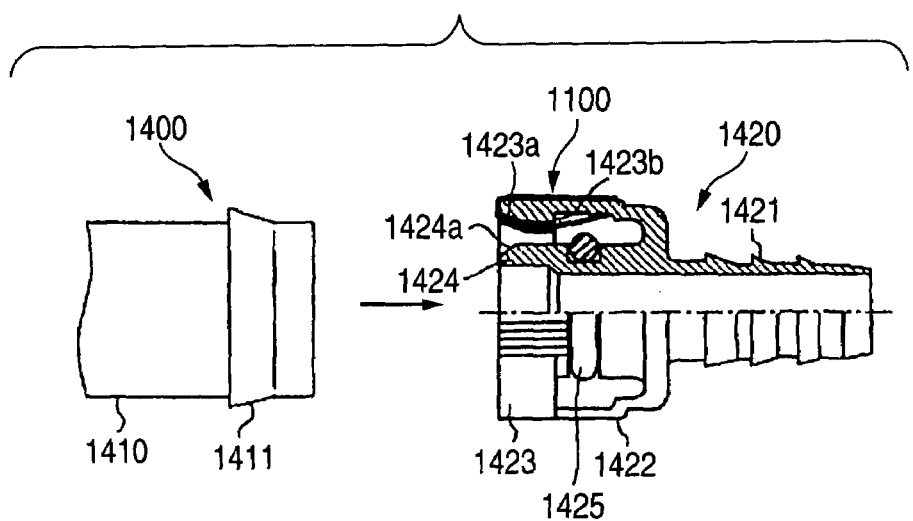
FIGS. 39A to 39D show still other embodiment of applying the invention to a piping connector.

The two pieces piping connector 1400 connects a pipe 1410 and a hose, a tube or the like and as shown by FIG. 39A, an end portion of the pipe 1410 is formed with an enlarged diameter portion 1411 in a shape of a conversing taper. The pipe 1410 is made of a metal and an outer surface thereof is covered by an insulating film or an insulating coating.

Further, a connector main body 1420 connected with the pipe 1410 includes an insulating member and is connected with a hose or a tube by outwardly inserting the hose or the tube to a nipple 1421. A front end outer periphery 1424a of an end portion 1424 on a side opposed to the nipple 1421 is constituted by a shape of a conversing taper and is inserted into an inner periphery of the pipe 1410. An outer periphery of the end portion 1424 is mounted with an O-ring 1425. The connector main body 1420 includes a through hole along an axis line thereof.

Figure 39B:
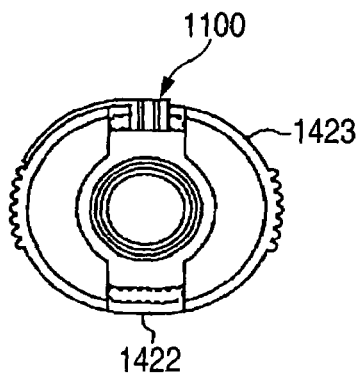

In reference also to FIG. 39B, elastic pieces 1422 are extended from two locations of an outer periphery of the connector main body 1420 opposed to each other to extend to cover the end portion 1424. Further, straps 1423 in a ring-like shape are integrally connected to end portions of the respective elastic pieces 1422, and an inner periphery 1423a are constituted by a taper shape gradually enlarging a diameter thereof toward an end portion thereof. Further, an enlarged diameter stepped portion 1423b is formed at a portion of the inner periphery of the strap 1423 connected to the elastic piece 1422.

Therefore, the pipe 1410 is inserted between the end portion 1424 of the connector main body 1420 and the strap 1423, by engaging the enlarged diameter portion 1411 of the pipe 1410 with the enlarged diameter stepped portion 1423b of the strap 1423, the pipe 1410 is prevented from being drawn and the pipe 1410 is completely connected to the connector main body 1420.

Figure 39C:
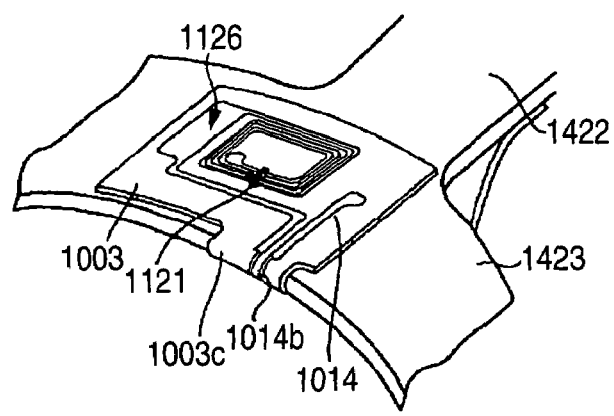

Further, as shown by FIG. 39C, the strap 1423 is pasted with the LC resonance tag 1100 of a type shown in FIG. 38A to 38C in a mode in which the projected portion 1003c is extended from an outer periphery to an inner periphery of the strap 1423.

Figure 39D:
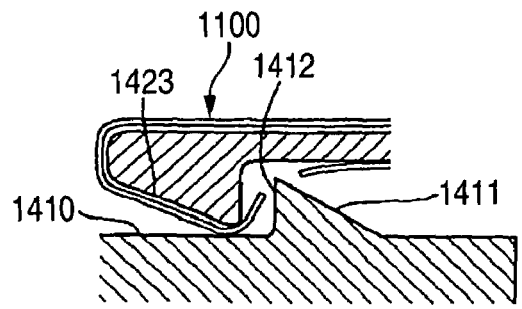

Here, as shown by FIG. 39D, after completely inserting the pipe 1410 into the connector main body 1420, the enlarged diameter portion 1411 of the pipe 1410 is engaged with the enlarged diameter stepped portion 1423b of the strap 1423 and at this occasion, the projected portion 1003c and the slender portion 1014b of the wiring made to crawl thereon are cut. Thereby, the circuit of the LC resonance tag 1100 becomes the closed circuit to function as the resonating circuit. Hence, the transmitting radio waves A having the frequency substantially the same as the resonating frequency of the resonating circuit can be transmitted from the transmitter and the echo waves D reflected by the resonating circuit can be received by the receiver.

Meanwhile, before finishing connection, the pipe 1410 is not completely inserted into the connector main body 1420 and therefore, the engaging stepped portion of the enlarged diameter portion 1411 does not engage with the enlarged diameter stepped portion 1423b, the projected portion 1003c and the slender portion 1014b are not cut and the shortcircuiting circuit 1125 stays not to be formed. Therefore, also the circuit of the LC resonance tag 1100 does not become the close circuit. In this case, even when the transmitting radio waves C is transmitted from the transmitter, the LC resonance tag 1100 does not function as the resonating circuit and therefore, the echo waves D is not generated and the echo waves D cannot be received by the receiver. Therefore, by presence or absence of reception of the echo waves D, it can be confirmed whether connection of the two pieces piping connector 1300 has been finished.

The two pieces piping connector 1400 according to the embodiment is for connecting a cooling water piping of an automobile and therefore, the two pieces piping connector 1400 is not limited to a connection use constituting a connected member by a hose or a tube mounted to the pipe 1410 or the connector main body 1420.

When the pipe 1410 and the connector main body 1420 are connected by mounting a hose or a tube to an end portion of the pipe 1410 by forming a nipple at the end portion, the two pieces piping connector 1400 can also be used to connect hoses and tubes.

Further, by forming either of the pipe 1410 and the connector main body 1420 integrally with an apparatus used for cooling or a member of a radiator or the like, or attaching either thereof thereto, the two pieces piping connector 1400 can also be used for connecting the apparatus used for cooling or the member of the radiator or the like and a pipe or a hose or a tube.

Even in the case of connecting any connected member, similar to the above-described, it can naturally be confirmed firmly, instantly, simply and in noncontact to finish to connect respective connected members.

FIGS. 15 through 20 show still other embodiment in which the invention is applied to a connector for a fuel vapor pipe.

Figure 42:
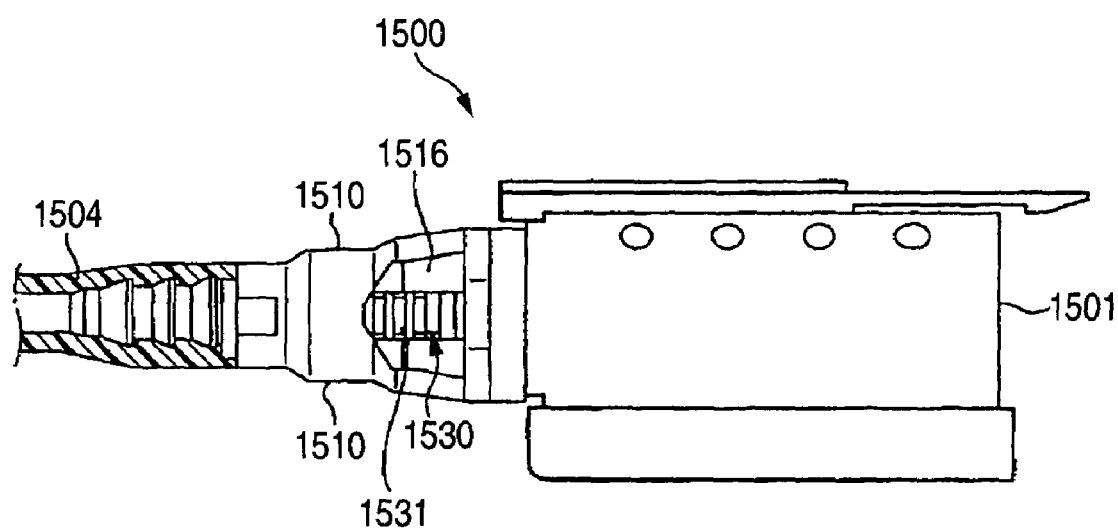
FIG. 42 is a side view showing an embodiment of applying the connector to connect a fuel cut valve.
Figure 43:
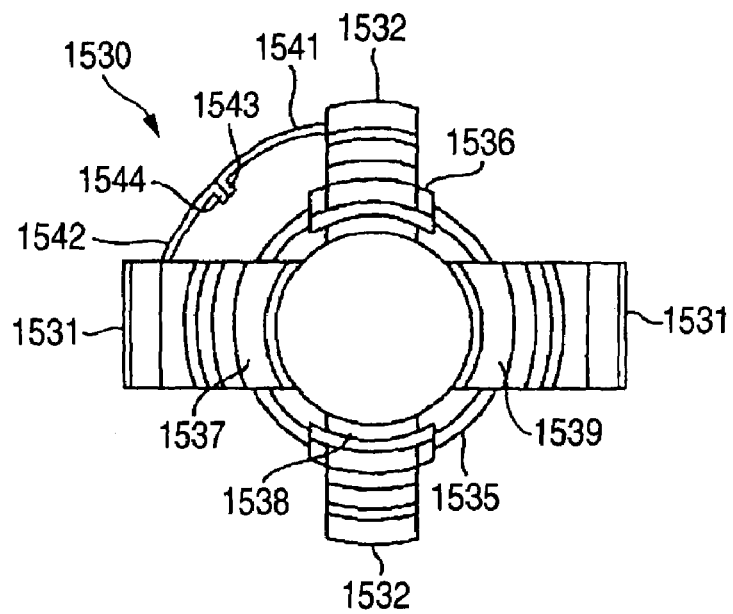
FIG. 43 is a sectional view of a slide member showing still other embodiment of applying the invention to a connector for a fuel vapor pipe.
Figure 44:
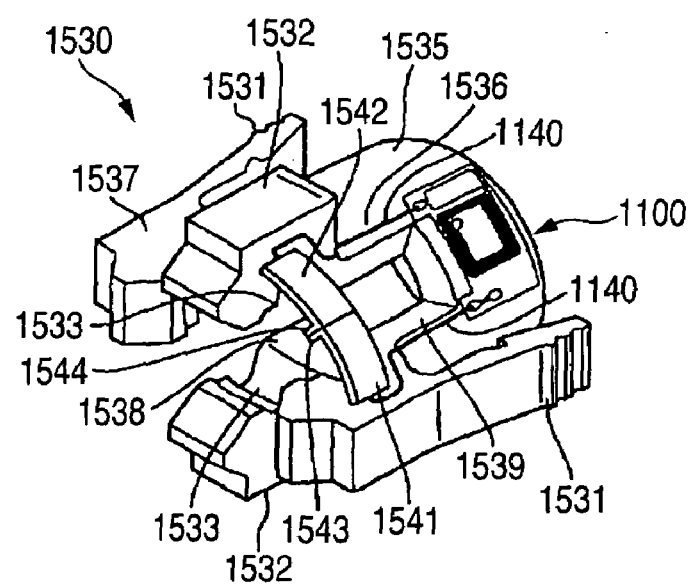
FIG. 44 is a perspective view of the slide member of the connector.

The connector 1500 for the fuel vapor pipe includes an insulating member, and can preferably used for connecting a pipe to a fuel cut valve 1501 arranged at inside of a fuel tank of an automobile shown in, for example, FIG. 42. The fuel cut valve 1501 is for delivering vapor at inside of the fuel tank to a canister by passing a pipe connected to the valve 1501 and closing a path by an included float valve when fuel is moved up by swinging the automobile or the like.

Figure 40:
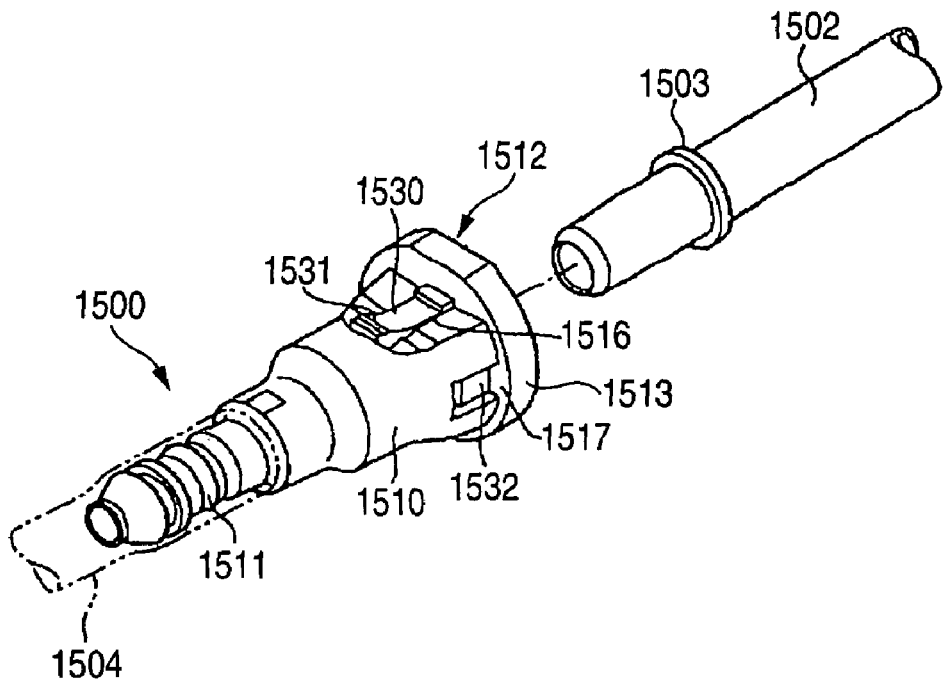
FIG. 40 is a perspective view showing still other embodiment of applying the invention to a connector for a fuel vapor pipe.

That is, the fuel cut valve 1501 is attached with a pipe 1502 including a conductive metal as shown by FIG. 40. The pipe 1502 is for exhausting vapor at inside of the fuel tank and is provided with a ring-like projected portion 1503 at an outer periphery thereof. Further, a tube 1504 is connected to the tube 1502 via the connector 1500 for the fuel vapor pipe. The tube 1504 is taken out to outside of the fuel tank to communicate with a canister or the like, not illustrated.

The fuel connector 1500 has a cylindrical main body 1510, and a through hole extending in the axial direction of the main body. One end of the main body 1510 includes a connecting pipe section 1511 which has the shape of a bamboo shoot and extends in the axial direction. The tube 1504 is inserted over the connecting pipe section 1511 to establish a connection.

An insert hole 1512 for receiving the pipe 1502 is opened on the end portion of the main body 1510 opposite the connecting pipe section 1511. A restrictive section 1513 whose diameter is expanded to form a flange is formed on the periphery of the insert hole 1512. The insert hole 1512 leads to the through hole and has a section where the inner diameter is expanded so as to be larger than the outer circumference of the pipe 1502. On the larger-diameter section, an annular sliding member 1530 is inserted in such a way that it can slide in relation to the main body 1510. O-rings 1514 and 1515 are disposed between a tip section 1534 of the sliding member 1530 and an end portion of the larger-diameter section of the insert hole 1512, and provide a seal between the pipe 1502 and the main body 1510.

The sliding member 1530 has pressing pieces 1531 which extend outward at two opposing points on the outer circumference, and fitting protrusions 1532 which similarly protrude outward at points away from the press pieces 1531 at an angle of 90 degrees. The pressing pieces 1531 protrude out of the main body 1510 through openings 1516 of the main body 1510. The fitting protrusions 1532 fit on other openings 1517 of the main body 1510.

Further, although explained in reference to FIGS. 43 through 45E, the slide member 1530 is pasted with the LC resonance tag 1100.

Figure 41:
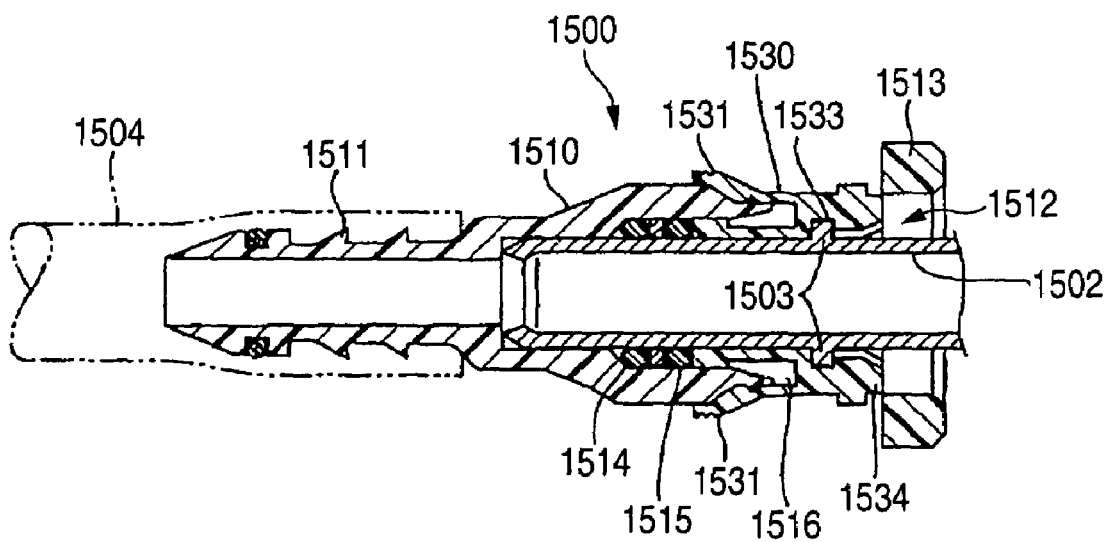
FIG. 41 is a sectional view of the connector.

As shown by FIG. 41, O rings 1514 and 1515 are interposed between a front end portion 1534 of the slide member 1530 and an end portion of an enlarged diameter portion of the inserting hole 1512 to seal an interval between the tube 1502 and the main body potion 1510. An inner periphery of the slide member 1530 is formed with a ring-like groove 1533 fitted with the ring-like projected portion 1503 of the tube 1502. Further, the front end portion 1534 of the slide member 1530 is hampered from being expanded by being inserted into the inner periphery of the restricting portion 1513 and the slide member 1530 is made to be able to be expanded via an opening 1516 by being separated from the restricting portion 1513 when the slide member 1530 is disposed on a depth side of the inserting hole 1512.

At the time of connecting the fuel connector, first, the sliding member 1530 is moved to the deep side of the insert hole 1512 so that the tip section of the sliding member 1530 is away from the restricting section 1513 from the main body 1510, and the tip section 1534 can be expanded in its diameter through the openings 1516.

When the pipe 1502 is inserted into the insert hole 1512 of the main body 1510 under the above state, the tip 1534 of the sliding member 1530 is bent outward and its diameter is expanded, and the flange 1503 of the pipe 1502 fits in the annular groove 1533.

Under the above state, when the pipe 1502 is pulled toward a drawing direction, the sliding member 1530, in which the flange 1503 of the pipe 1502 is fitted, is pulled in the same direction, and the sliding member 1530 is slid toward the opening side. Then, the state of the tip section 1534 of the sliding member 1530 shifts from the state wherein the tip section is away from the restrictive section 1513 to the state wherein the tip section 1534 is fitted into the inner circumference of the restrictive section 1513. Accordingly, the tip section 1534 is prevented from expanding in diameter. As a result, the flange 1503 fitted into the annular groove 1533 is prevented from coming out of the annular groove 1533; namely, dislodgement of the flange 1503 is prevented.

On the other hand, when the pipe 1502 is desired to be drawn from the main body 1510 to separate again, the pipe 1502 is temporarily pushed into the insert hole 1512 of the main body 1510. While the sliding member 1530 is held at a position moved to the deep interior of the insert hole 1512 while the pressing piece 1531 is held with a hand, the pipe 1502 is pulled in the drawing direction. Then, because the tip section 1534 of the sliding member 1530 is expanded in its diameter through the openings 1516, the flange 1503 of the pipe 1502 comes out of the annular groove 1533, thereby allowing the pipe 1502 to be drawn from the insert hole 1512 of the main body 1510.

Specifically, the sliding member 530 has a cylinder section 1535, and a total of four protruding pieces 1536, 1537, 1538, and 1539 which are arranged at intervals of approximately 90 degrees and protrude in the axial direction from one end face of the cylinder section 1535. The pressing pieces 1531 are integrally formed with the protruding pieces 1537 and 539 which face opposite each other in a circumferential direction. The pair of protruding pieces 1536 and 1538 are formed so as to deviate from the protruded pieces 1537 and 539 at angles of 90 degrees, and face opposite each other in the circumferential direction. Further, the fitting protrusions 1532 are formed on the protruding pieces 1536 and 1538.

The pressing pieces 1531 protrude out of the main body 1510 through the openings 1516 of the main body. The fitting protrusions 1532 fit on other openings 1517 of the main body. The annular groove 1533 is formed on the inner circumferences of the tips of the four protruding pieces 1536, 1537, 1538, and 1539, respectively.

Strips 1540 and 1541 extend from the adjacent pair of protruding pieces 1536 and 1539 along the circumferential direction. Tips of the strips 1540 and 1541 are slightly overlapped with a predetermined radial interval therebetween, and contacts 1542 and 1543 are formed on the facing surfaces. The LC resonance tag 1100 is attached on the outer circumference of the cylinder section 1535. Lead wires which have continuity with the pair of opened contacts of the LC resonance tag 1100 are connected to the contacts 1542 and 1543, respectively. The lead wires and the contacts 1542 and 1543 can be formed by providing a conductive pattern on the surface of the sliding member 1530.

Figure 45A:
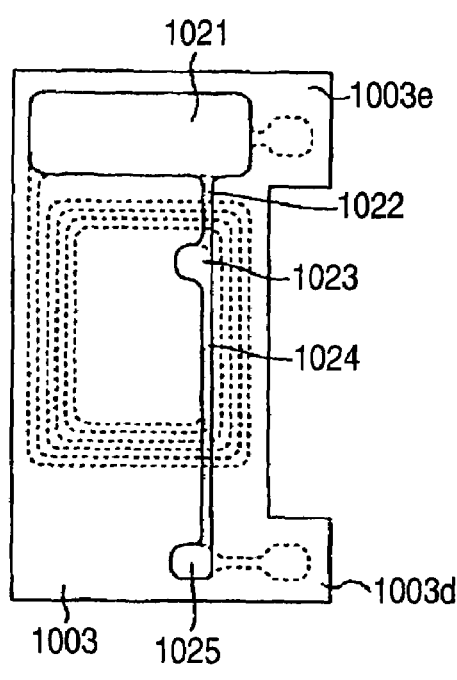
FIGS. 45A to 45C show an LC resonance tag applied to the connector.
Figure 45B:
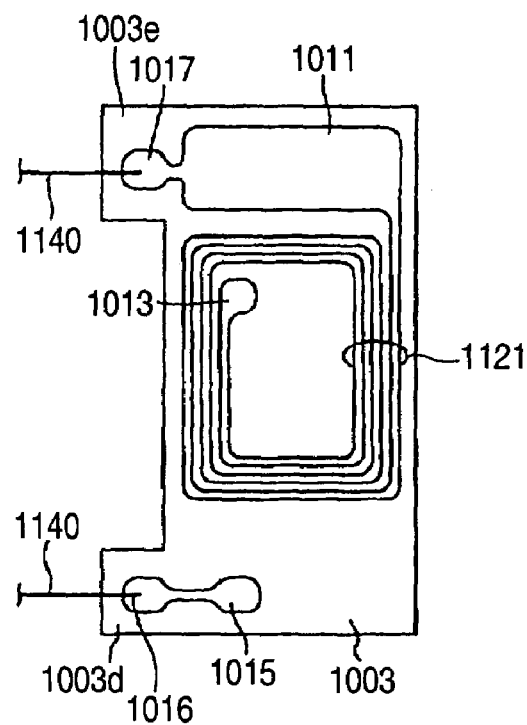
Figure 45C:
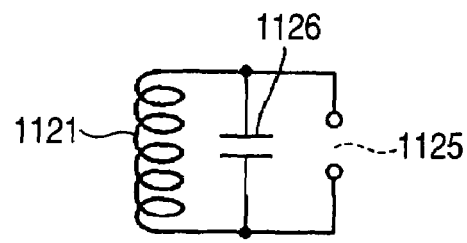

Here, as shown by FIGS. 45A to 45C, the LC resonance tag 1100 is provided with the insulating sheet 1003 having projected portions 1003d and 1003e. The projected portions 1003d and 1003e are formed with connecting portions 1016, 1017 for connecting the respective lead wires 1140 and the LC resonance tag 1100, and the respective lead wires 1140 and the connecting portions 1016, 1017 are connected to each other by solder or the like.

When connection is finished by fitting the ring-like projected portion 1503 of the tube 1502 to the ring-like groove 1533, the projected pieces 1536 and 1537, 1538 and 1539 are expanded. At this occasion, the strip piece 1541 and strip piece 1542 are widened along therewith and therefore, the front ends 1543 and 1544 are released from being brought into contact with each other, the shortcircuiting circuit 1125 of the LC resonance tag 1100 is cut to function as the resonating circuit. Under the state, when the transmitting radio waves C having the frequency substantially the same as the resonance frequency of the resonating circuit is transmitted from the transmitter, the LC resonance tag 1100 functions as the resonating circuit to generate the echo waves D and by receiving the echo waves D by the receiver, connection can be confirmed to finish.

Meanwhile, before connection is finished, the front ends 1543 and 1544 of the strip pieces 1541 and 1542 respectively connected to both ends of the LC resonance tag 1100 are brought into contact with each other and therefore, the shortcircuiting circuit 1125 is formed and the resonating circuit does not function. Further, so far as the tube 1502 is not completely inserted into the connector 1500 for the fuel vapor pipe, the strip piece 1541 and the strip piece 1542 are not widened in a perpendicular line direction and therefore, contact between the front ends 1543 and 1544 of the strip pieces 1541 and 1542 is not released. Therefore, even when the transmitting radio waves C is transmitted under the state, the echo waves D is not generated and the echo waves D cannot be received by the receiver. Therefore, by presence or absence of reception of the echo waves D, it can be confirmed whether connection of the connector 1500 for the fuel vapor pipe has been finished.

Application of the fuel connector 1500 according to the embodiment is not limited to connection wherein a member to be connected is a hose, a tube, or a fuel cut valve with the pipe 1502. It can also be applied to connections wherein a member to be connected has a valve function for controlling direction of fuel flow, flow rate, or the like, such as a cut-off valve, a check valve, or a drain valve, or a fuel tank.

Connection between hoses or tubes can also be achieved by connecting the hose or the tube, on whose tip the pipe 1502 is provided, with the fuel connector 1500.

When a member having a valve function or a fuel tank on which the fuel connector 1500 is provided serves as one member to be connected, and a member having a valve function or a fuel tank, on which the fuel connector 1500 is provided, serves as the other member to be connected, they can also be connected directly.

As is apparent, in any connection of the members to be connected, the connection between the respective members to be connected can be confirmed reliably, instantaneously, in a non-contacting manner, which is similar to that described previously.

In the case where the fuel connector is attached on a member having a valve function or a fuel tank, the LC resonance tag 1100 of the fuel connector 1500 may be relocated on the member so as to connect between the fuel connector 1200 and the LC resonance tag 1100 with a conductive pattern so as to confirm the connection.

As described above, connection between members of a wide variety of connectors can be confirmed to be connected, reliably, instantaneously in a non-contacting manner.

In an engine compartment of an automobile or the like, coolant piping for cooling an engine or fuel piping of the engine is disposed in close proximity in all directions. Accordingly a large number of connecting points of the piping exist. In order to confirm completion of connection at the large number of connection points, completion of connection at each connection point can be confirmed, as described hitherto, by means of, for example, using different LC resonance tags 1100, which differ from each other in terms of size of the capacitor 1126 or shape of the coil 1121, on respective connecting tools, members to be connected, or connecting points; or using different connecting tools which are formed on the capacitors 1126 or the coils 1121, and which differ from each other in terms of size of the capacitor 1126 or shape of the coil 1121 on the respective connecting points.

Figure 46:
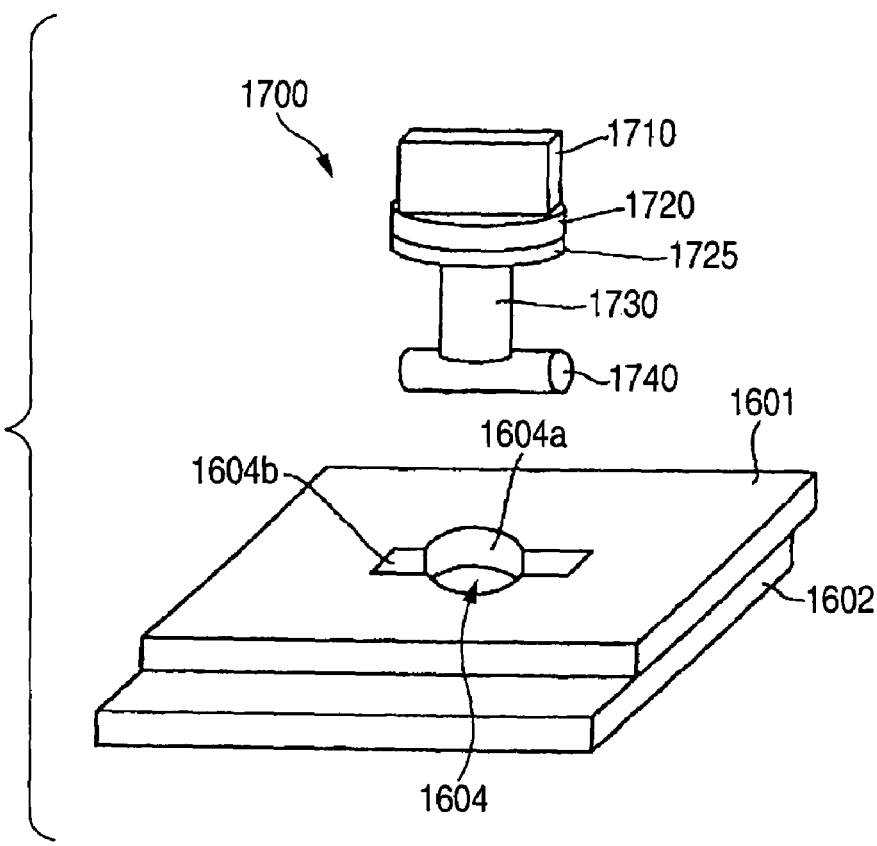
FIG. 46 is a perspective view showing an embodiment of applying the invention to a turn clip.

FIG. 46 shows still other embodiment which is applied to a turn clip for fastening a fastened member by being inserted to an inserting hole to rotate by itself.

The turn clip 1700 includes a head portion 1710 in a shape of a parallelepiped including an insulating member, an upper portion 1720 in a cylindrical shape including an insulating member integrally formed with one face of the head portion 1710, an elastic seal pad 1725 attached to a bottom face of the upper portion 1720, a stay 1730 extended to the head portion 1710 in a T-like shape, and an engaging portion 1740 in a cylindrical shape connected to a lower end of the stay 1730 similarly in a T-like shape.

Further, a pair of panels 1601 and 1602 each is formed with an inserting hole 604 constituted by a center circular portion 1604a and notched portions 1604b extended outwardly from peripheral edges of the circular portion 1604a opposed to each other (in FIG. 46, only the inserting hole of the panel 1601 on one side is shown for convenience of explanation).

Figure 47:
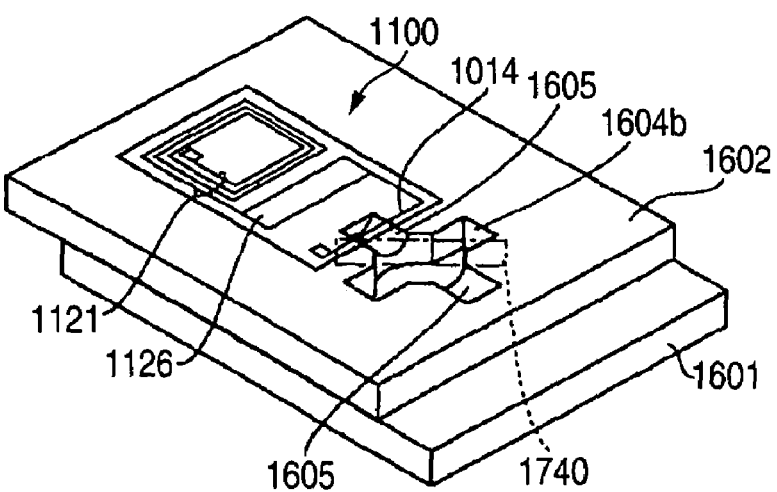
FIG. 47 is a perspective view viewing from a rear face side of a panel of FIG. 46.

As shown by FIG. 47, according to the embodiment, an outer side face of the panel 1602 on a rear face side relative to a direction of inserting the turn clip 1700 is formed with a pair of grooves 1605 in which the engaging portion 1740 is contained after the turn clip 1700 is inserted to rotate by itself. Further, the outer side face of the panel 1602 on the rear face side is pasted with the LC resonance tag 1100 shown in FIGS. 2 through 4 (in FIG. 47, the LC resonance tag 1100 shown in FIGS. 27A to 27C is exemplified) by a mode in which the wiring 1014 is disposed on one of the grooves 1605.

In the turn clip 1700, the panels 1601, 1602 are overlapped to match the inserting holes and the engaging portion 1740 and the stay 1730 are inserted into the inserting holes from a side of the panel 1601. At this occasion, the engaging portion can be inserted thereinto by directing a longitudinal direction of the engaging portion in a direction along the notched portion 1604*b* of the inserting hole 1604.

When the engaging portion 1740 is projected to an outer side of the panel 1602 on the rear face side, the turn clip 1700 is rotated by 90 degrees to contain the engaging portion 1740 in the groove 1605. Further, in rotating the turn clip 1700, smooth rotation can be realized since the seal pad 1725 is elastically brought into press contact with the panel 1601 on a surface side, on the other hand, after rotating the turn clip 1700, the seal pad 1725 recovers to an original shape and therefore, the engaging portion 1740 is precisely contained in the groove 1605.

Figure 48A:
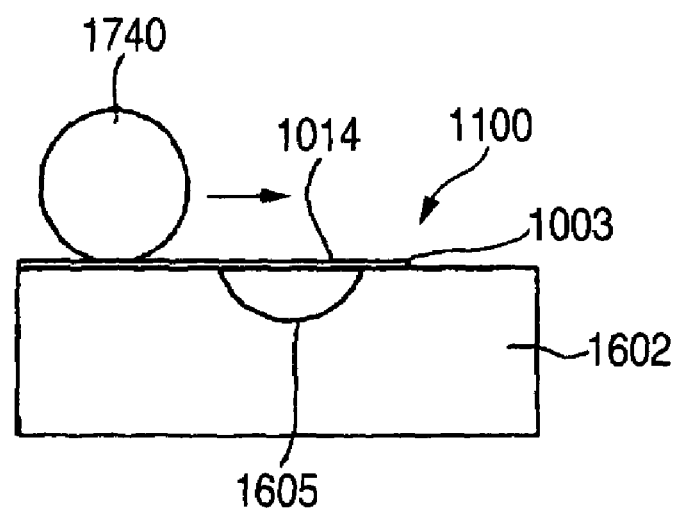
FIGS. 48A and 48B show operation of cutting a wiring of an LC resonance tag by the turn clip.
Figure 48B:
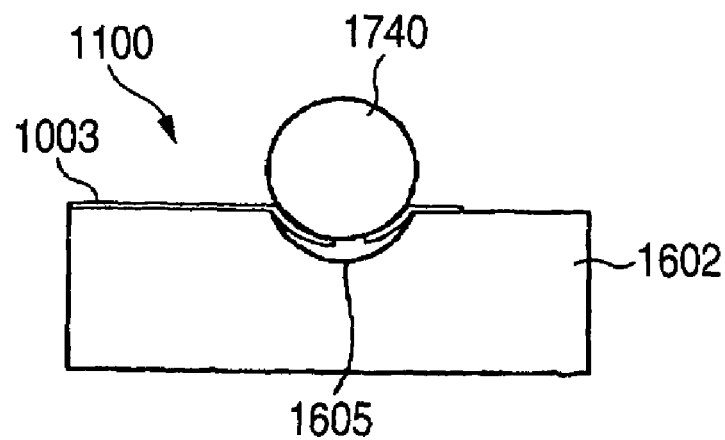

As shown by FIGS. 48A and 48B, when the engaging portion 1740 is contained in the groove 1605, by cutting the wiring 1014 of the LC resonance tag 1100 disposed on an upper side of the groove 1605 by the engaging portion 1740, the shortcircuiting circuit 1125 is cut and the circuit of the LC resonance tag 1100 becomes the closed circuit to function as the resonating circuit. Hence, the transmitting radio waves C having the frequency substantially the same as the resonating frequency of the resonating circuit is transmitted from the transmitter and the echo waves D reflected by the resonating circuit can be received by the receiver.

In the above-described embodiment, by constructing a constitution in which a projection or a projected streak extended upwardly from a bottom portion of the groove 1605 is formed, a front end of the projection or the projected streak is sharpened, and the engaging portion 1740 is provided with a recess at a position overlapping the projection or the projected streak when the engaging portion 1740 is contained in the groove portion 1605, the wiring 1014 is cut by fitting the projection or the projected streak to the recess via the wiring 1014 and therefore, the wiring 1014 can further firmly be cut.

Further, by constituting both of the engaging portion 1740 and the groove portion 1605 by insulating members, a state of electrically cutting the wiring 1014 is firmly ensured.

Meanwhile, before the panel 1601 and the panel 1602 are finished to fasten, the wiring 1014 is not cut and therefore, the circuit of the LC resonance tag 1100 does not become the closed circuit. In this case, even when the transmitting radio waves C is transmitted from the transmitter, the echo waves D is not generated from the LC resonance tag 1100 and therefore, the echo waves D is not received by the receiver. Therefore, by presence or absence of reception of the echo waves D, it can be confirmed whether the panel 1601 and the panel 1602 has been finished to fasten.

Figure 49:
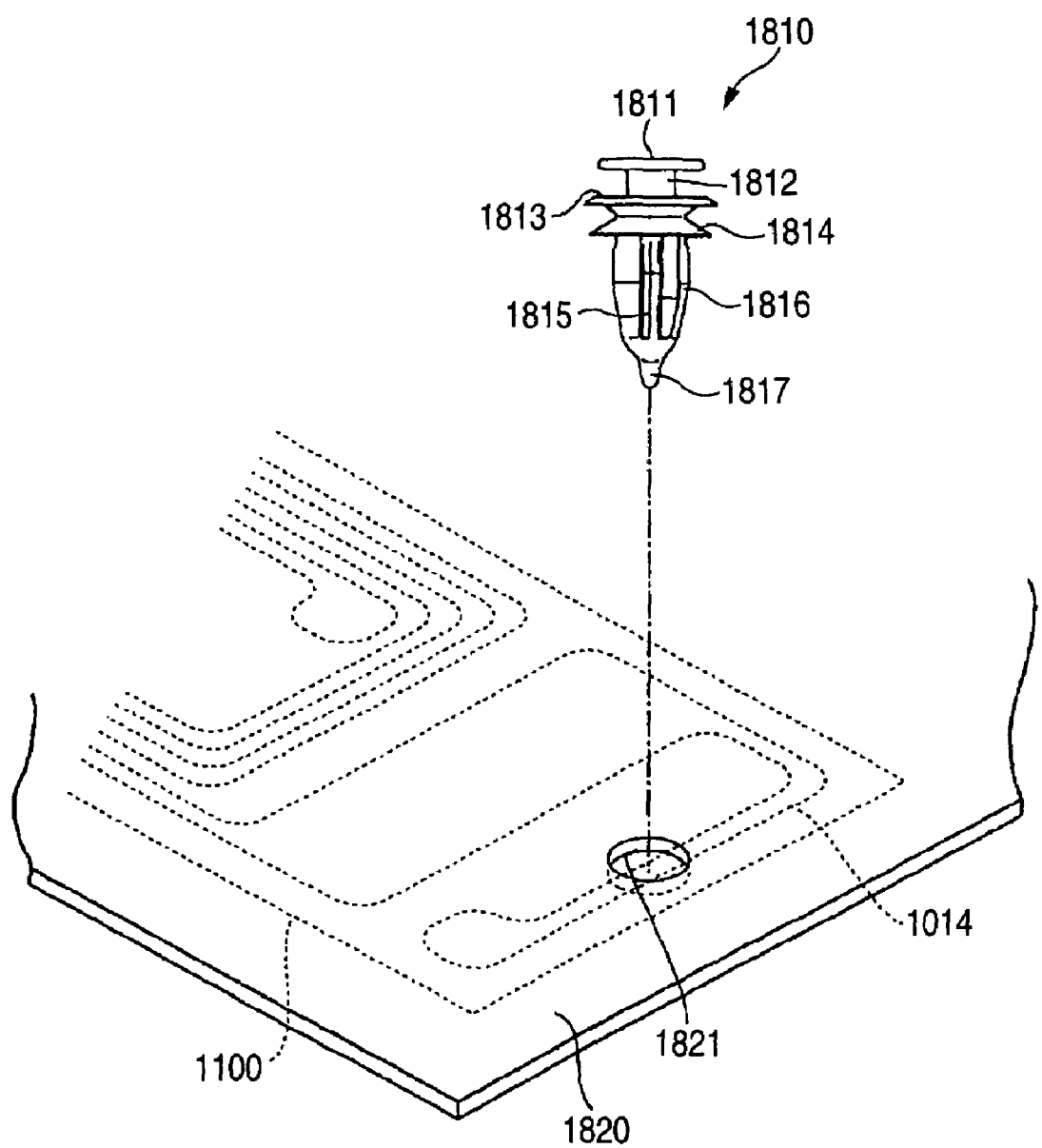
FIG. 49 is an explanatory view showing other embodiment of applying the invention to a clip.

FIG. 49 shows a clip 1810 used for fixing an attaching member, not illustrated, to an attached member 1820.

The clip 1810 includes a head portion 1811 in a circular disk shape, a shaft portion 1812 extended downwardly from a lower face of the head portion 1811, a middle flange portion 1813 formed at a middle of the shaft portion 1812, a pad-like flange portion 1814 formed therebelow and extended in a skirt-like shape, a columnar portion 1815 extended therebelow, and an elastic locking leg 1816 extended upwardly from a front end portion 1817 thereof to integrally form thereby. The attached member 1820 is formed with a through hole 1821 for inserting the clip 1810. Further, the attached member 1820 is pasted with the LC resonance tag 1100 in a mode in which the wiring 1014 covers the through hole 1821.

Figure 50A:
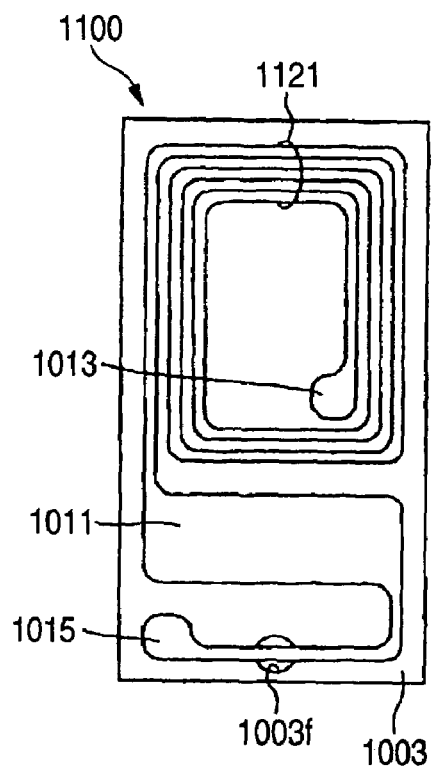
FIGS. 50A and 50B shows an LC resonance tag applied to the embodiment and FIGS. 50A and 50B are schematic views of a surface and a rear face.
Figure 50B:
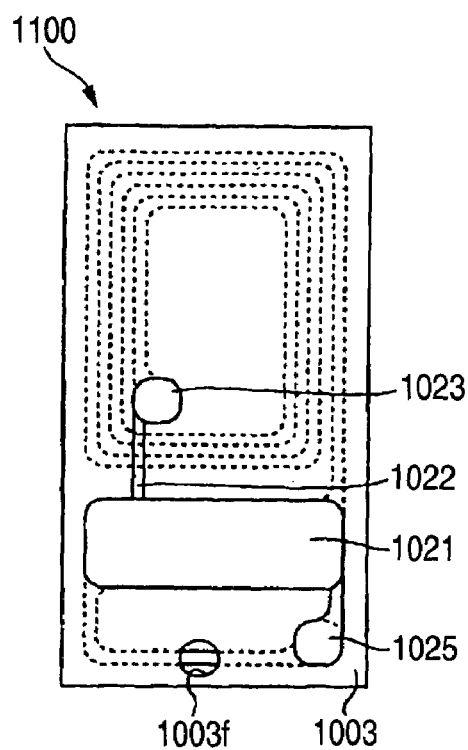

FIGS. 50A and 50B are schematic views of the LC resonance tag 1100 shown in FIG. 49. As shown by FIGS. 50A and 50B, the LC resonance tag 1100 is formed with a through hole 1003*f* in correspondence with the through hole 1821 at a portion of a portion of the insulating sheet 1003 at which the wiring 1014 is made to crawl. The LC resonance tag 1100 is pasted to the attached member 1820 in a state in which the through hole 1003*f* is positioned to the through hole 1821 of the attached member 1820.

In using the clip 1810, first, an attaching member, not illustrated, is pinched to fix between the head portion 1811 and the middle flange portion 1813 of the clip 1810. Specifically, for example, the attaching member is formed with a hole having an inner diameter capable of inserting the head portion 1811 and a slit extended from the hole, after inserting the head portion 1811 into the hole, the shaft portion 1812 is moved to the slit, and the attaching member is pinched to fix between the head portion 1811 and the middle flange portion 1813.

Thereafter, by inserting the elastic locking leg 1816 of the clip 1810 into the through hole 1821 of the attached member 1820 and engaging the elastic locking leg 1816 with a hole edge on a rear face side of the through hole 1821, the attaching member can be fixed to the attached member 1820. Further, the pad-like flange portion 1814 in the skirt-like shape is elastically brought into close contact with the attached member 1820 to prevent rattling and achieve seal performance.

Further, in inserting the elastic locking leg 1816 into the through hole 1821, the wiring 1014 is broken. When the wiring 1014 is broken in this way, the resonating circuit is made to function and therefore, when the transmitting radio waves C having the frequency substantially the same as the resonating frequency of the resonating circuit is transmitted from the transmitter, the echo waves D reflected by the resonating circuit can be received by the receiver. Meanwhile, in a state in which the elastic locking leg 1816 of the clip 1810 is not inserted into the through hole 1821, the wiring 1014 is not broken and therefore, the capacitor 1021 is shortcircuited by the wiring 1014 and therefore, the resonating function does not function, and even when the transmitting radio waves C having the frequency substantially the same as the resonating frequency of the resonating circuit is transmitted from the transmitter, the LC resonance tag 1100 does not function as the resonating circuit and therefore, the echo waves D is not reflected and cannot be received by the receiver. Therefore, by presence or absence of reception of the echo waves D, it can be confirmed whether the clip 1810 has been finished to fasten.

Figure 51A:
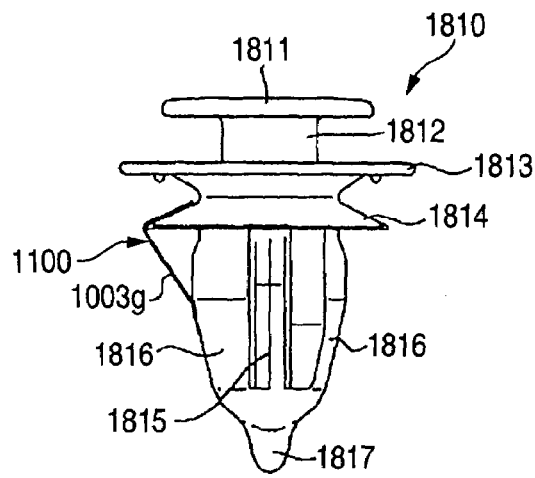
FIGS. 51A to 51C show still other embodiment of applying the invention to a clip.
Figure 52A:
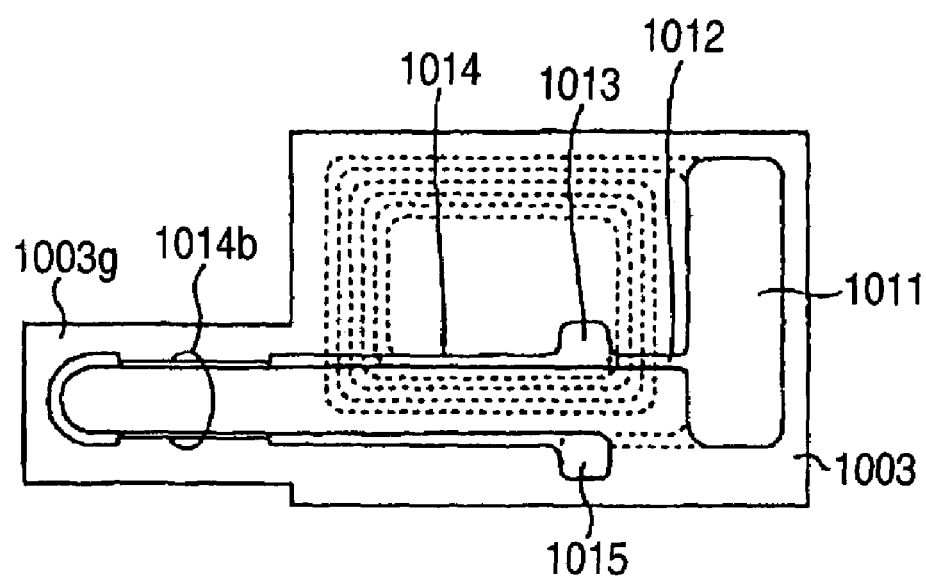
FIGS. 52A and 52B show an LC resonance tag applied to the respective clips shown in FIGS. 51A to 51C and FIGS. 52A and 52B are schematic views of a surface and a rear face.
Figure 52B:
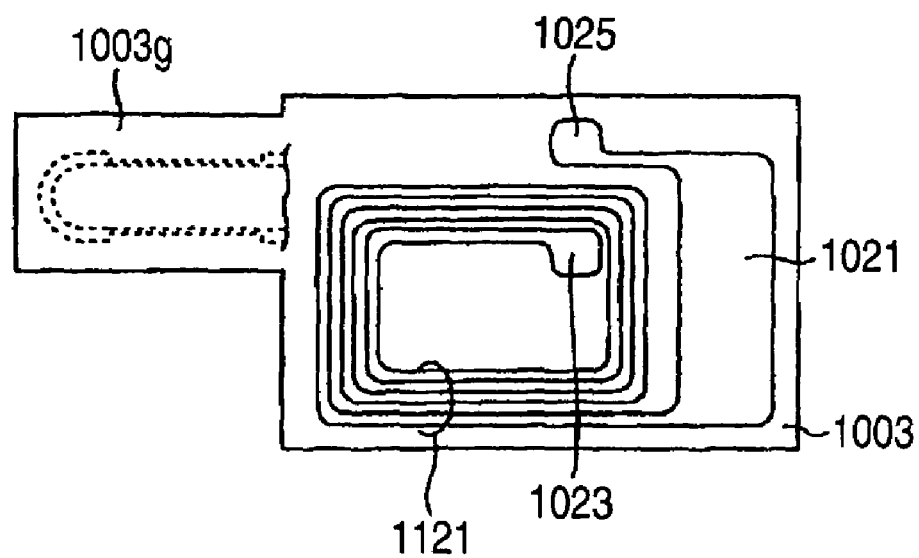

FIG. 51A shows the clip 1810 similar to that shown in FIG. 49. According to the example, the LC resonance tag 1100 shown in FIGS. 52A and 52B is used. The LC resonance tag 1100 is provided with the insulating sheet 1003 having a projected portion 1003*g* and the wiring 1014 provided with the slender portion 1014*b* is made to crawl on the projected portion 1003*g*. Further, the projected portion 1003*g* formed with the slender portion 1014*b* of the wiring 1014 is attached thereto in a mode of being extended from the pad-like flange portion 1814 in the skirt-like shape over to the elastic locking leg 1816.

Between the head portion 1811 of the clip 1810 and the middle flange portion 1813, an attaching member, not illustrated, is pinched to fix in the above-described mode. Further, by inserting the elastic locking leg 1816 of the clip 1810 to engage with the through hole of the attached member, the attaching member can be fixed to the attached member. At this occasion, the wiring 1014 of the LC resonance tag 1100 is cut by an edge of the through hole, the LC resonance tag 1100 functions as the resonating circuit and therefore, when the transmitting radio waves C having the frequency substantially the same as the resonating frequency of the resonating circuit is transmitted from the transmitter, the echo waves D reflected by the resonating circuit can be received by the receiver.

Figure 51B:
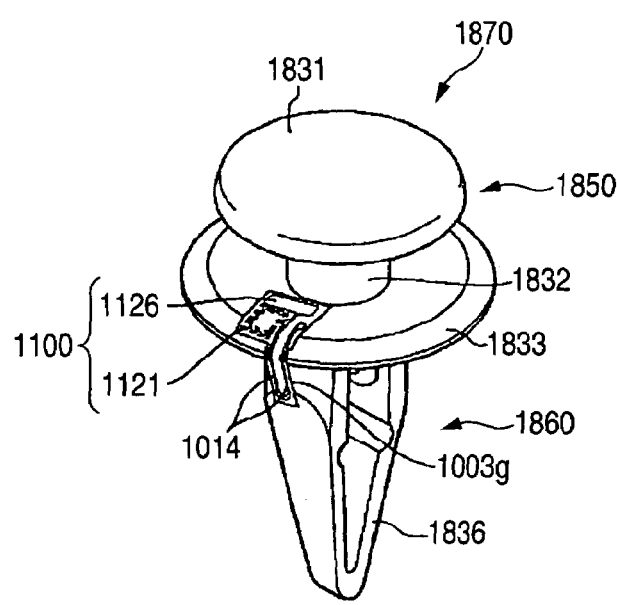

FIG. 51B shows a two pieces clip 1870 according to still other embodiment.

The two pieces clip 1870 is constituted by a male member 1850 and a female member 1860. The male member 1850 includes a head portion 1831 and a shaft portion 1832 in a cylindrical shape extended orthogonally from a center portion of a lower face of the head portion 1831. The shaft portion 1832 is constituted movably to a lower side, that is, to a side of the female member 1860. Further, the female member 1860 includes a pad-like flange portion 1833 having a hole inserted with the shaft portion 1832 at a center thereof, and an elastic leg portion 1836 in a V-like shape extended from a lower face of the pad-like flange portion 1833. Further, the projected portion 1003g formed with the slender portion 1014b of the wiring 1014 of the LC resonance tag 1100 shown in FIGS. 52A and 52B, mentioned above, is pasted thereto in a mode of being extended from the pad-like flange portion 1833 over to the elastic leg portion 1836.

When the elastic locking leg 1836 of the two pieces clip 1870 is inserted into an attaching hole provided at a fastened member, not illustrated, and the shaft portion 1822 is pressed to the side of the female member 1860 by pressing the head portion 1831, the elastic leg portion 1836 in the V-like shape inserted into the attaching hole is expanded by the shaft portion 1822 to engage with the attached member. At this occasion, the wiring 1014 of the LC resonance tag 1100 pasted to the two pieces clip 1870 is cut by an edge or the like of the attaching hole of the attached member and therefore, the LC resonance tag 1100 functions as the resonating circuit, and when the transmitting radio wave a having the frequency substantially the same as the resonating frequency of the resonating circuit is transmitted from the transmitter, the echo waves D reflected by the resonating circuit can be received by the receiver and therefore, fastening can be confirmed to finish.

Meanwhile, when the two pieces clip is not fixed to the attached member, the capacitor is shortcircuited by the wiring 1014 and therefore, the LC resonance tag 1100 does not function as the resonating circuit and even when the transmitting radio waves C having the frequency substantially the same as the resonating frequency of the resonating circuit is transmitted from the transmitter, the echo waves D is not reflected and cannot be received by the receiver and therefore, it can be confirmed that fastening has not been finished.

Figure 51C:
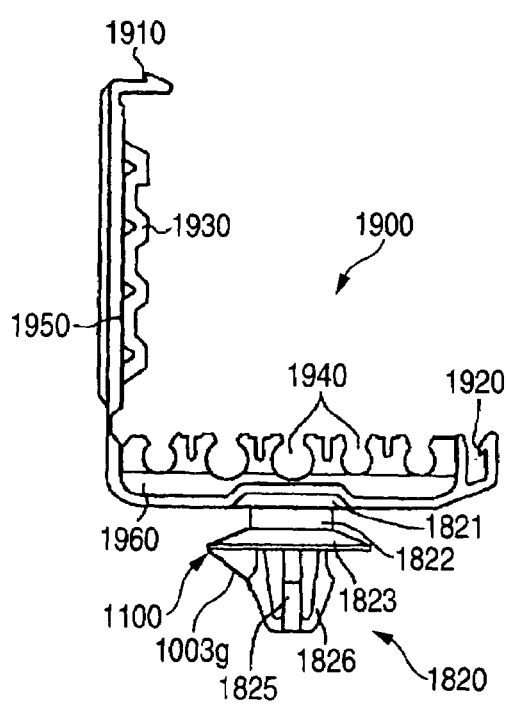

FIG. 51C shows a pipe clip 1900 according to still other embodiment.

The pipe clip 1900 is provided with a holding base member 1960 having an elongated longitudinal length and having a plurality of holding recess portions 1940, a holding cover 1950 similarly having an elongated longitudinal length and connected to one end of the holding base member 1960 via a hinge, and a clip 1820 provided continuously to the holding base member 1960.

The holding base member 1960 and the holding cover 1950 are made to be locked by locking mechanisms 1920 and 1910 including hooks engaged with each other at other ends thereof to thereby constitute a holding piece of a rod-like member of a pipe or the like. A total of the holding base member 1960, the holding cover 1950 and the clip 1820 is preferably molded integrally by a synthetic resin to thereby enable to constitute a product which is provided with a sufficient strength, rich in mass production performance and inexpensive. In the holding base member 1960, the plurality of holding recess portions 1940 for holding a rod-like member of a pipe or the like are provided to extend over a total of a width of the holding base member 1960 along an axial direction of a rod-like member to be held and arranged to be brought into a state of being aligned in parallel with each other.

Further, the holding cover 1950 is provided with a plurality of pressing portions 1930 in correspondence with the holding recess portions 1940 and by the pressing portion 1930, a rod-like member fixed by the holding recess portion 1940 is prevented from jumping out by vibration or the like. Therefore, by containing the rod-like members in the holding portions 1940, a positional relationship among the rod-like members is stably maintained, further, by aligning the plurality of holding portions 1940 in parallel with each other, the plurality of rod-like members can be fixed to the holding base member 1960 by being maintained at constant intervals from each other.

The clip 1820 is constituted by a head portion 1821 connected to the holding base member 1960, a shaft portion 1822 in a cylindrical shape extended orthogonally from a lower face of the head portion 1811, a pad-like flange portion 1823 in a skirt-like shape formed at a middle portion of the shaft portion 1822, a columnar portion 1825 extended from a center portion of a lower face thereof, and an elastic locking leg 1826 extended upwardly from a lower end of the columnar portion 1825. Further, the projected portion 1003g formed with the slender portion 1014b of the wiring 1014 of the LC resonance tag 1100 shown in FIGS. 52A and 52B, mentioned above, is pasted with the projected portion 1003g formed with the slender portion 1014b of the wiring 1014 in a mode of being extended from the pad-like flange portion 1823 over to the elastic leg portion 1826.

When the elastic locking leg 1826 of the pipe clip 1900 is inserted into an attaching hole of the attached member, the projected portion 1003g formed by the wiring 1014 of the LC resonance tag 1100 is cut by an edge of the attaching hole of the attached member. Since the slender portion 1014b of the wiring 1014 is broken in this way, the LC resonance tag 100 functions as the resonating circuit. When the transmitting radio waves C having the frequency substantially the same as the resonating frequency of the resonating circuit is transmitted from the transmitter under the state, the echo waves D reflected by the resonating circuit can be received by the receiver and therefore, fastening can be confirmed to finish.

On the other hand, when the pipe clip 1900 is not fixed to the attached member, the capacitor 1021 is shortcircuited by the wiring 1014 and does not function as the resonating circuit and therefore, even when the transmitting radio waves C having the frequency substantially the same as the resonating frequency of the resonating circuit is transmitted from the transmitter, the echo waves D is not reflected and cannot be received by the receiver and therefore, fastening can be confirmed not to finish.

FIGS. 28 and 29 are schematic views of a two pieces clip 1610 showing still other embodiment.

The two pieces clip 1610 is made of a resin which is an insulating member and is constituted by a pin member 1620 and a grommet 1640. The pin member 1620 is constituted by a head portion 1621 in a flange-like shape formed with a claw portion 1621a at a bottom portion thereof, a shaft portion 1622 having a section in a cross-like shape extended orthogonally from a center portion of a lower face of the head portion 1621, a first contracted diameter portion 1630 in a ring-like shape formed at a middle portion of the shaft portion 1622, a first enlarged diameter portion 1624 enlarging a diameter thereof in a taper shape from the first contracted diameter portion 1630 in the ring-like shape, a second contracted diameter portion 1625 contracting a diameter thereof in a taper shape from the first enlarged diameter portion 1624 to a front end of the shaft portion 1622, a second enlarged diameter portion 1629 contiguous to the second contracted diameter portion 1625, and a front end portion 1627 constituting a shape of a conversing taper. Between the second contracted diameter portion 1625 and the second enlarged diameter portion 1629, ribs 1628 formed along an axial direction at angles of substantially 90° are provided to divide in four sections along a peripheral direction.

Meanwhile, the grommet 1640 includes a flange portion 1641 and elastic leg portions 1642 constituting a shape of a cylinder as a whole and constituted by dividing the cylinder in four in a peripheral direction by slits along an axial direction. The flange portion 1641 includes a projected portion 1643 pasted with the LC resonance tag 1100 at an outer periphery thereof. Further, the LC resonance tag 1100 shown in FIGS. 52A and 52B, mentioned above, is pasted to extend over to a stepped difference portion 1643a on an inner peripheral side of the projected portion 1643 and an outer peripheral wall of the projected portion 1643, and the projected portion 1003g formed with the slender portion 1014b of the wiring 1014 is disposed on the stepped difference portion 1643a. A center of the flange portion 1641 is formed with a hole for inserting the pin member 1620 and the hole communicates with inner peripheries of the elastic leg portions 1642 as it is.

Figure 53:
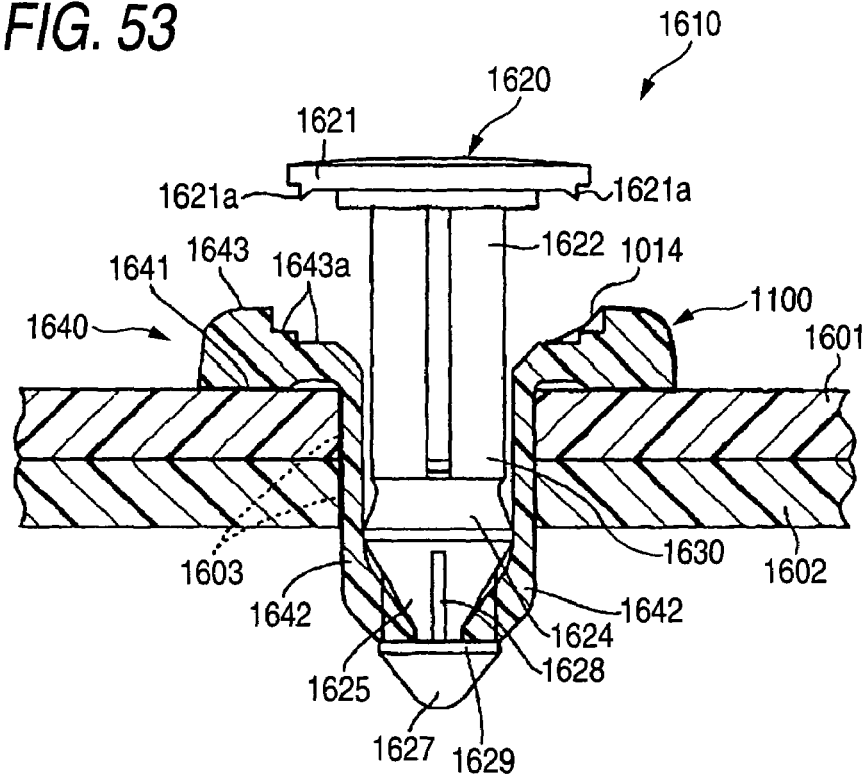
FIG. 53 is a sectional view showing still other embodiment of applying the invention to a two pieces clip and showing a state before being fastened.

A lower end portion of the elastic leg portion 1642 is projected to a direction of an axis center of the pin member 1620 and normally attached to the second contracted diameter portion 1625 of the pin member 1620 to integrate the pin member 1620 to the grommet 1640 as shown by FIG. 53.

Figure 54:
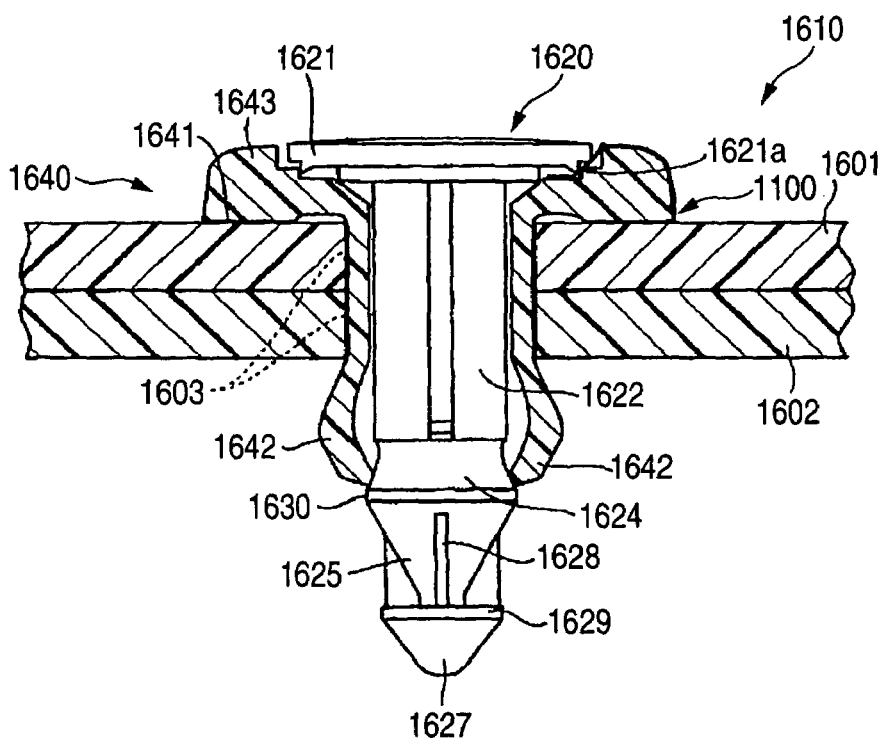
FIG. 54 is a sectional view showing a state after having been fastened according to the embodiment.

Further, in a state of pressing the pin member 1620 to the grommet 1640, as shown by FIG. 54, the lower end portion projected to the direction of the axis center of the elastic leg portion 1642 presses the first enlarged diameter portion 1624 in a state of being moved to the first enlarged diameter portion 1624 of the pin member 1620 and expanded and therefore, the pin member 1620 is exerted with a component of force in the axial direction and the head portion 1621 of the pin member 1620 is pressed by the flange portion 1641 of the grommet 1640.

The 2-piece clip 610 fastens the panels 601 and 602, for example, as follows: the panels 601 and 602 serving as members to be fastened are superposed; the insert holes 603 thereof are superposed thereon; as shown in FIG. 53, the 2-piece clip 610 is inserted into the insert holes 603 with the shaft section 622 being inserted in the elastic leg section 642; after the flange section 641 is brought into contact with the panel 601, the head section 621 of the pin member 620 is pressed in order to press the pin member into the grommet 640; and accordingly, the bottom end portion of the elastic leg section 642 is moved to the first larger-diameter section 624 of the pin member 620 as shown in FIG. 54. As a result, the elastic leg section 642, whose diameter is expanded, is engaged on the periphery of the insert hole 603 of the panel 602, and the pin member 620 and the elastic leg section 642 are prevented from slipping out of the insert holes 603 to thereby complete fastening of the panels 601 and 602.

In pressing the pin member 1620 to the grommet 1640, the claw portion 1621a of the pin member 1620 cuts the wiring 1014 of the LC resonance tag 1100 and therefore, the LC resonance tag 1100 functions as the resonating circuit. Therefore, when the transmitting radio waves C having the frequency substantially the same as the resonating frequency of the resonating circuit is transmitted from the transmitter, the echo waves D reflected by the resonating circuit can be received by the receiver and fastening can be confirmed to finish thereby.

On the other hand, before finishing fastening, that is, in a state in which the pin member 1620 is not pressed to the grommet 1640, the lower end portion of the elastic leg portion 1642 does not press the first enlarged diameter portion 1624 and therefore, the component of force in the axial line direction is not generated, also the head portion 1621 of the pin member 1620 is not pressed to the flange portion 1641 of the grommet 1640 and therefore, the claw portion 1621a of the pin member 1620 does not cut the wiring 1014 of the LC resonance tag 1100.

The same goes with a case in which although the two pieces clip 1610 is inserted into the inserting hole 1603 in a state in which the lower end portion of the elastic leg portion 1642 is engaged with the second contracted diameter portion 1625 of the pin member 1620, the pin member 1620 is not pressed to the grommet 1640. Therefore, even when the transmitting radio waves C is transmitted from the transmitter, the LC resonance tag 1100 does not function as the resonating circuit and therefore, the echo waves D is not generated, the echo waves D is not received by the receiver and therefore, the panel 1601 and the panel 1602 are not confirmed to finish fastening.

Further, when the pin member 1620 is pressed to the grommet 1640 in a state in which the flange portion 1641 of the two pieces clip 1610 is not brought into contact with the panel 1601, the elastic leg portion 1642 is brought into contact with a face of the inserting hole 1603 and cannot be expanded and therefore, by the reason similar to that in the above-described case, the claw portion 1621a of the pin member does not cut the wiring 1014 of the LC resonance tag 1100, the receiver does not receive the echo waves D and therefore, the panel 1601 and the panel 1602 are not confirmed to finish fastening.

Further, when the pin member 1622 is pressed to the grommet 1640 without inserting the two pieces clip 1610 into the inserting hole 1603, the lower end portion of the elastic leg portion 1642 is moved to the first enlarged diameter portion 1624 of the pin member 1620 to expand, the component of force in the axial line direction is exerted to the shaft portion 1622 and therefore, the claw portion 1621a of the pin member 1620 cuts the wiring 1014 of the LC resonance tag 1100 and the LC resonance tag 1100 functions as the resonating circuit. However, since a range at which the transmitting radio waves C and the echo waves D can arrive is limited as described above and therefore, when a unused clip is prevented from being arranged in a predetermined range from a transceiver made to be proximate to the inserting hole 1603, the transmitting radio waves C does not reach the resonating circuit, or the echo waves D cannot be received and therefore, the panel 1601 and the panel 1602 cannot be confirmed to finish fastening.

As described above, according to the various clips, it can be confirmed firmly, instantly, simply and in noncontact to finish to fasten the fastened members.

Particularly when an interior member or an exterior member of an automobile is fastened to a vehicle body panel, there is frequently a case in which the members are fastened by a plurality of fastening pieces and fastened portions are contiguous to each other.

In the case of fastening fastened members by a plurality of fastening pieces, as described above, when the different LC resonance tags 1100 having different capacities of the capacitor 1126 and shapes of the coil 1121 are used at respective fastening pieces or fastened pieces or fastening portions, or fastening pieces in which the capacities of the capacitors 1126 and the shapes of the coils 1121 of the circuits formed at the fastening pieces per se are used separately for the respective fastening portions, fastening of the respective portions can be confirmed to finish.

Figure 55:
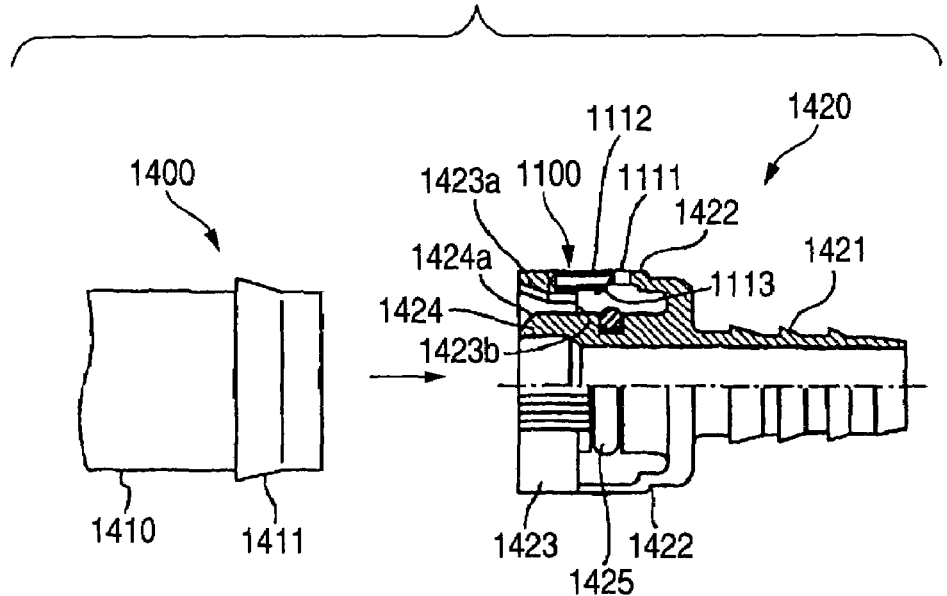
FIG. 55 is a sectional view showing still other embodiment of applying the invention to a piping connector.

FIG. 55 shows still other embodiment in which the invention is applied to a piping connector.

The two pieces piping connector 1400 is for connecting a tube 1410 and a hose, tube or the like and is formed with an enlarged diameter potion 1411 in a shape of a conversing taper at an end portion of the tube 1410. Further, a connector main body 1420 connected to the tube 1410 includes an insulating member and connects a hose or a tube by outwardly inserting the hose or the tube to a nipple 1421. A front end outer periphery 1424a of an end portion 1424 on a side opposed to the nipple 1421 is constituted by a shape of a conversing taper and inserted to an inner periphery of the tube 1410. Further, an O ring 1425 is mounted to an outer periphery of the end portion 1424. The connector main body 1420 includes a through hole along an axis line thereof.

Further, elastic pieces 1422 are extended from two portions of an outer periphery of the connector main body 1420 opposed to each other and extended to cover the end portion 1424. Further, an end portion of each of the elastic pieces 1422 is integrally connected with a strap 1423 in a ring-like shape, and an inner periphery 1423a of the strap 1423 constitutes a taper shape enlarging a diameter thereof gradually to an end portion thereof. Further, an enlarged diameter stepped portion 1423b is formed at a portion of an inner periphery of the strap 1423 connected to the elastic piece 422.

Therefore, by inserting the tube 1410 between the end portion 1424 of the connector main body 1420 and the strap 1423 and engaging the enlarged diameter portion 1411 of the tube 1410 by the enlarged diameter stepped portion 1423b of the strap 1423, the tube 1410 is prevented from being drawn and the tube 1410 is completely connected to the connector main body 1420.

Figure 56A:
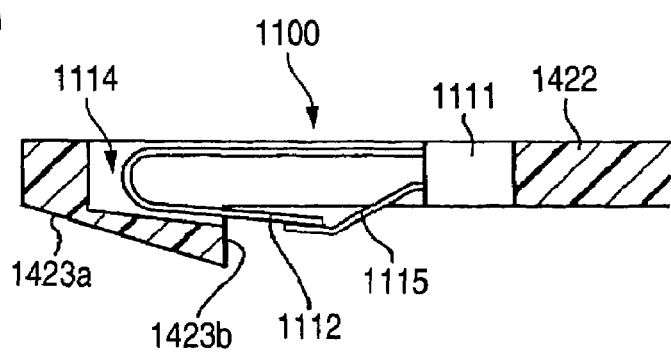
FIGS. 56A and 56B show an LC resonance tag attached to the piping connector.
Figure 56B:
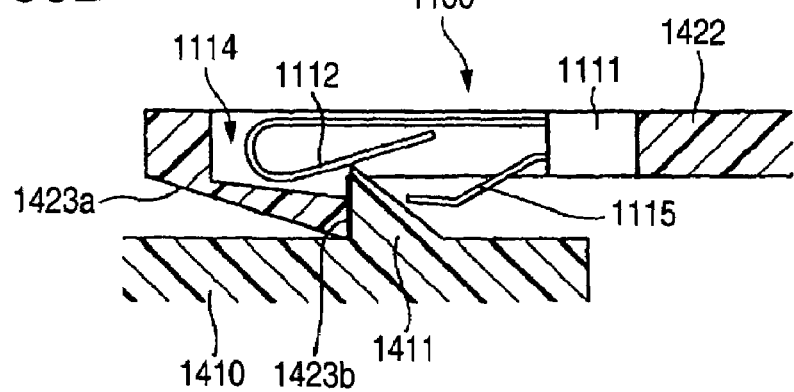
Figure 57:
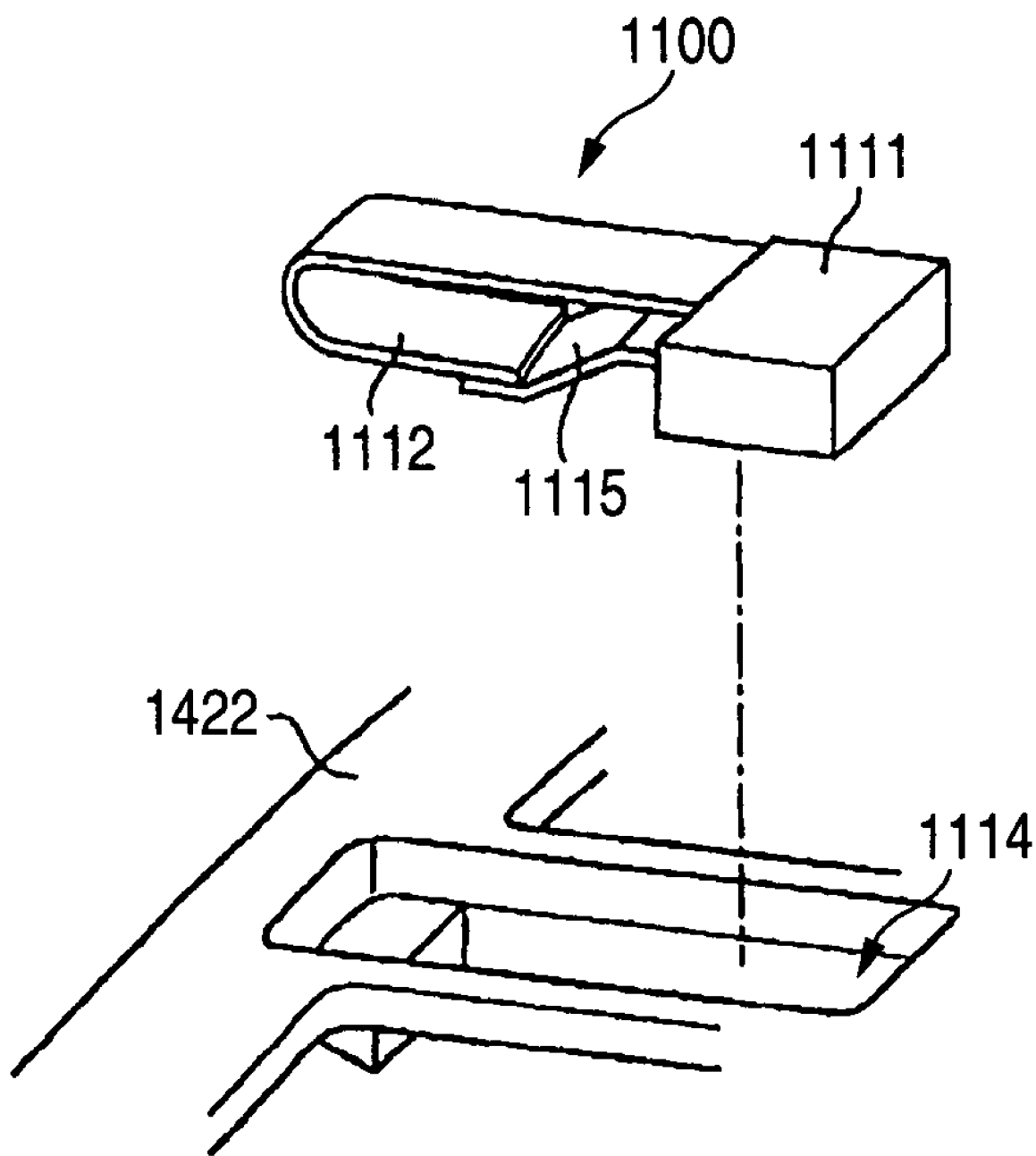
FIG. 57 is a partial perspective view showing a state of attaching an LC resonance tag to the piping connector.

Here, the elastic piece 1422 is mounted with the LC resonance tag 1100 of a type shown in FIGS. 56A and 56B and FIG. 57. The LC resonance tag 1100 includes the resonating circuit portion 1111 including the capacitor and the coil to be connected in parallel with each other, the wiring 1112 and the shortcircuiting portion 1115 constituting the shortcircuiting circuit for shortcircuiting the resonating circuit portion 1111. The elastic piece 1422 is formed with the containing portion 1114 for containing the LC resonance tag 1100. Further, the LC resonance tag 1100 is contained in a mode in which the resonating circuit portion 1111 is disposed on a base end side of the containing portion 1114 and a portion of bringing the wiring 1112 and the shortcircuiting portion 1115 into contact with each other is disposed on a lower side. Therefore, when the tube 1410 is completely connected to the connector main body 1420, the enlarged diameter portion 1411 presses up the wiring 1112, the enlarged diameter portion 1411 pushes up the wiring 1112, the contact between the wiring 1112 and the shortcircuiting portion 1115 is released and the resonating circuit portion 1111 functions as the resonating circuit.

Therefore, when the transmitting radio waves C having the frequency substantially the same as the resonating frequency of the resonating circuit is transmitted from the transmitter, the echo waves D be reflected by the resonating circuit can be received by the receiver and fastening can be confirmed to finish. Further, in the case in which the echo waves D is not generated even when the transmitting radio waves C is transmitted from the transmitter, it can be confirmed that fastening has not been finished.

Although an explanation has been given of the respective embodiments as described above by taking an example of a case of using the LC resonance tag 1100 in which the shortcircuiting circuit 1125 is cut by cutting the wiring 1014 when connection or the like of the connector is carried out precisely, there may be used the LC resonance tag 1100a in which the closed circuit including the coil 1121 and the capacitor 1126 is cut when connection or the like of the connector is carried out precisely as shown by FIGS. 27A to 27C.

The present invention can be used as means for ascertaining completion of fastening or connection in a non-contacting manner by utilization of radio waves when connection is realized by means of connectors or fastening realized is by means of clips.

What is claimed is:

1. A connection structure whose connection is confirmed by resonance of radio waves, comprising:
   a connector comprising a housing for receiving connecting members to be connected and a retainer for retaining the connecting members with respect to said housing;
   a first circuit having first contacts at both ends thereof; and
   a second circuit which forms a closed circuit functioning as a resonance circuit upon contacting the first contacts,
   wherein the first contacts and the second circuit contact each other simultaneously with connection of the connector, and
   wherein said retainer comprises said first circuit.

2. The connection structure according to claim 1, wherein said connection is confirmed by a presence or absence of echo waves generated by resonance.

3. The connection structure according to claim 1, wherein the first circuit comprises a resonance tag, and the second circuit comprises one of a short circuit line and a conductive member.

4. The connection structure according to claim 1, wherein the second circuit includes second contacts, and wherein the first contacts are configured to come into contact with the second contacts.

5. The connection structure according to claim 1, wherein the connector includes at least one of the first circuit and the second circuit.

6. The connection structure according to claim 1, further comprising:
   a plurality of connectors; and
   closed circuits which are equal in number to the connectors,
   wherein the respective closed circuits have different resonance frequencies.

7. The connection structure according to claim 1, wherein said connector and said first circuit are integrally formed.

8. The connection structure according to claim 1, wherein said retainer retains at least one member to be connected within said housing.

9. The connection structure according to claim 1, wherein said first contacts of said first circuit are fixably disposed with respect to each other.

10. The connection structure according to claim 1, wherein said first contacts of said first circuit are fixably disposed with respect to said connector.

11. The connection structure according to claim 1, wherein said first contacts project in a direction away from said first circuit and toward said housing when said connector is connected.

12. The connection structure according to claim 1, wherein said first circuit comprises a coil and a capacitor disposed in series with said coil, and functions as a resonance circuit.

* * * * *